United States Patent
Colombe et al.

(10) Patent No.: US 12,478,578 B2
(45) Date of Patent: Nov. 25, 2025

(54) INJECTABLE HYDROGELS FOR CELL DELIVERY TO THE VITREOUS

(71) Applicants: Massachusetts Eye and Ear Infirmary, Boston, MA (US); MASSACHUSETTS INSTITUTE OF TECHNOLOGY, Cambridge, MA (US); The Brigham and Women's Hospital, Inc., Boston, MA (US)

(72) Inventors: Pierre A. Colombe, Boston, MA (US); Deepti Singh, Boston, MA (US); Myron Spector, Boston, MA (US); Michael Young, Boston, MA (US)

(73) Assignees: Massachusetts Eye and Ear Infirmary, Boston, MA (US); The Brigham and Women's Hospital, Inc., Boston, MA (US); Massachusetts Institute of Technology, Cambridge, MA (US)

(*) Notice: Subject to any disclaimer, the term of this patent is extended or adjusted under 35 U.S.C. 154(b) by 738 days.

(21) Appl. No.: 17/781,076

(22) PCT Filed: Dec. 3, 2020

(86) PCT No.: PCT/US2020/063115
§ 371 (c)(1),
(2) Date: May 31, 2022

(87) PCT Pub. No.: WO2021/113515
PCT Pub. Date: Jun. 10, 2021

(65) Prior Publication Data
US 2023/0000762 A1 Jan. 5, 2023

Related U.S. Application Data

(60) Provisional application No. 62/942,928, filed on Dec. 3, 2019.

(51) Int. Cl.
*A61K 9/51* (2006.01)
*A61K 9/00* (2006.01)
*A61K 31/045* (2006.01)
*A61K 31/728* (2006.01)
*A61P 27/02* (2006.01)
*C08G 73/02* (2006.01)
*C08L 79/02* (2006.01)

(52) U.S. Cl.
CPC .......... *A61K 9/0051* (2013.01); *A61K 9/0024* (2013.01); *A61K 31/045* (2013.01); *A61K 31/728* (2013.01); *A61P 27/02* (2018.01); *C08G 73/02* (2013.01); *C08L 79/02* (2013.01)

(58) Field of Classification Search
CPC .................................................. A61K 9/0051
See application file for complete search history.

(56) References Cited

U.S. PATENT DOCUMENTS

| | | | |
|---|---|---|---|
| 2010/0074956 A1 | 3/2010 | Kurisawa et al. | |
| 2015/0313869 A1* | 11/2015 | Kurisawa | A61P 3/06 514/54 |
| 2016/0193255 A1* | 7/2016 | Mistry | A61K 35/51 424/93.7 |
| 2020/0131474 A1 | 4/2020 | Berenshteyn et al. | |

OTHER PUBLICATIONS

Dromel et al., "Injectable gelatin hydroxyphenyl propionic acid hydrogel protects human retinal progenitor cells (hRPCs) from shear stress applied during small-bore needle injection," Applied Materials, Jun. 2020, 19:100602, 13 pages.
Extended European Search Report in European Appln. No. 20896215.9, dated Oct. 30, 2023, 6 pages.
Lim et al., "The effect of injectable gelatin-hydroxyphenylpropionic acid hydrogel matrices on the proliferation, migration, differentiation and oxidative stress resistance of adult neural stem cells," Biomaterials, Apr. 2012, 33(12):3446-3455.
Liu et al., "The Application of Hyaluronic Acid Hydrogels to Retinal Progenitor Cell Transplantation," Tissue Engineering Part A, Jan. 2013, 19(1-2):135-142.
Park et al., "In Situ Cross-linking Hydrogel as a Vehicle for Retinal Progenitor Cell Transplantation," Cell Transplantation, Mar. 2019, 28(5):596-606.
Banerjee et al., "Interpreting Mammalian Target of Rapamycin and Cell Growth Inhibition in a Genetically-Engineered Mouse Model of Nf1-Deficient Astrocytes," Mol Cancer Ther., 2011, 10(2):279-291.
Banerjee et al., "Neurofibromatosis-1 regulates mTOR-mediated astrocyte growth and glioma formation in a TSC/Rheb-independent manner," Proceedings of the National Academy of Sciences of the United States of America, Sep. 2011, 108(38):15996-16001.
Darr and Calabro, "Synthesis and characterization of tyramine-based hyaluronan hydrogels," Journal of Materials Science: Materials in Medicine, 2009, 20(1):33-44.
Dromel et al., "Abstract 128: Hydrogels for Enhanced Transplanted Retinal Ganglion Cells Survival," Abstract, Presented at Proceedings of the TERMIS Americas Annual Conference and Exhibition, Orlando, FL, Dec. 2-5, 2019, 1 page.
International Preliminary Report on Patentability in International Appln. No. PCT/US2020/063115, mailed Jun. 16, 2022, 6 pages.

(Continued)

*Primary Examiner* — Paul V Ward
(74) *Attorney, Agent, or Firm* — Fish & Richardson P.C.

(57) ABSTRACT

The present disclosure presents hydrogel compositions for use in the treatment of an ocular disorder (e.g., a retinal disease) and methods of treating an ocular disorder in a subject in need thereof with the hydrogel compositions. The hydrogel compositions can include hydroxyphenylpropionic acid (gelatin-HPA), hyaluronic acid-tyramine (HA-Tyr), a catalyzer (e.g., horseradish peroxidase (HRP)), a cell, a crosslinker (e.g., hydrogen peroxide), or any combination thereof. The methods include administering a therapeutically effective amount of a composition into an eye of the subject, wherein the composition includes any of the hydrogel compositions of the disclosure.

20 Claims, 25 Drawing Sheets

(56) References Cited

OTHER PUBLICATIONS

International Search Report and Written Opinion in International Appln. No. PCT/US2020/063115, mailed Feb. 17, 2021, 8 pages.

Kim et al., "Injectable hyaluronic acid-tyramine hydrogels for the treatment of rheumatoid arthritis," Acta Biomater, Feb. 2011, 7(2):666-74.

Kurisawa et al., "Injectable biodegradable hydrogels composed of hyaluronic acid-tyramine conjugates for drug delivery and tissue engineering," Chemical Communications, Jul. 2005, 2005:4312-4314.

Extended European Search Report in European Appln. No. 24213735.4, mailed on Apr. 11, 2025, 7 pages.

\* cited by examiner

INJECTABLE HYDROGELS FOR CELL DELIVERY TO THE VITREOUS

CROSS-REFERENCE TO RELATED APPLICATIONS

This application is a National Stage Entry of PCT/US2020/063115, filed on Dec. 3, 2020, which claims the benefit of U.S. Provisional Application No. 62/942,928, filed on Dec. 3, 2019. The entire contents of the foregoing are incorporated herein by reference in their entireties.

TECHNICAL FIELD

The present disclosure presents hydrogel compositions for use in the treatment of an ocular disorder (e.g., a retinal disease) and methods of treating an ocular disorder in a subject in need thereof with the hydrogel compositions. The hydrogel compositions can include hydroxyphenylpropionic acid (gelatin-HPA), hyaluronic acid-tyramine (HA-Tyr), a catalyzer (e.g., horseradish peroxidase (HRP)), a cell, a crosslinker (e.g., hydrogen peroxide), or any combination thereof. The methods include administering a therapeutically effective amount of a composition into an eye of the subject, wherein the composition includes any of the hydrogel compositions of the disclosure.

BACKGROUND

Stem and differentiated cell therapies critically depend on viability, phenotype, and engraftment of injected cells in the targeted tissue. However, many of these therapies have failed to achieve desired outcomes, partly due to low cell viability and failure to attach to a site of injury.

While cell therapy is touted as one of the major advances that will occur in regenerative medicine in the future, there is a strong need for materials that are able to preserve and control the release and engraftment of stem cells in vivo. Without structural support, transplanted cells lack matrix protection and may undergo apoptosis. Of the cells that survive, most lack a matrix to be spatially retained and organized and typically leave the lesion for the surrounding viable host tissue.

In many cases, transplanting cells also indicate that a protecting gel matrix might be beneficial to match mechanical properties, maintain integrity and viability of cells during transplantation, and biodegrade within an acceptable time frame without triggering an inflammatory response from the host. In this respect, biomaterials have been shown to play a major role in maintaining cell phenotype, proliferation and viability ex-vivo, protecting cells from the most adverse stresses present in-vivo (e.g. shear, oxidative, chemical or mechanical stress).

SUMMARY

Certain aspects of the present disclosure are directed to methods of treating or preventing an ocular disorder in a subject in need thereof, the method including: administering a therapeutically effective amount of a composition into an eye of the subject; wherein the composition includes gelatin hydroxyphenylpropionic acid (gelatin-HPA), hyaluronic acid-tyramine (HA-Tyr), and an ocular cell, and wherein the composition attaches to an inner portion eye after administration into the eye.

In some embodiments, the ocular disorder includes congenital retinal disease, diabetic retinopathy, glaucoma, optic neuropathy, retinal neuron damage, or any combination thereof. In some embodiments, the composition includes water. In some embodiments, the composition includes water at a concentration of about 88% to 98%. In some embodiments, the composition is administered as a liquid. In some embodiments, the composition gels in situ. In some embodiments, the composition is administered via an intravitreal injection. In some embodiments, the composition is administered after a pars plana vitrectomy. In some embodiments, the composition has a polymer concentration of about at least 2 weight %. In some embodiments, the composition includes gelatin-HPA at a concentration of about 30% to 100%. In some embodiments, the composition includes HA-Tyr at a concentration of about 70% to about 0%. In some embodiments, the composition includes a concentration ratio of gelatin-HPA to HA-Tyr of about 50%:50%. In some embodiments, the composition includes a concentration ratio of gelatin-HPA to HA-Tyr of about 75%:25%.

In some embodiments, the gelatin-HPA, HA-Tyr, and ocular cell are mixed prior to administration into the eye of the subject. In some embodiments, the gelatin-HPA, HA-Tyr, and ocular cell are mixed during administration into the eye of the subject. In some embodiments, the ocular cell includes a human retinal progenitor cells (hRPGs), a human retinal ganglion cell, or any combination thereof. In some embodiments, the composition includes an ocular cell concentration of about 1,000 cells per milliliter to 1,000,000 cells per milliliter. In some embodiments, the methods further include enzymatically crosslinking the composition by contacting the composition with hydrogen peroxide and horseradish peroxidase and waiting for about 30 seconds to 240 seconds for the composition to gel. In some embodiments, the composition reaches the gel point after administration into the eye of the subject. In some embodiments, the composition is contacted with hydrogen peroxide at a concentration of about 0.5 mM to 2.5 mM.

In some embodiments, the composition is contacted with horseradish peroxidase at a concentration of about 0.1 units per milliliter (U/ml) to 0.2 U/ml. In some embodiments, the composition is enzymatically crosslinked in situ. In some embodiments, the enzymatically crosslinked composition has a stiffness ranging from about 500 Pa to 1500 Pa. In some embodiments, the enzymatically crosslinked composition has a Young's modulus ranging from about 2300 Pa to 7000 Pa. In some embodiments, the composition is administered into a vitreous of the eye of the subject. In some embodiments, the inner portion of the eye is the retina. In some embodiments, the inner portion of the eye is the inner limiting membrane of the retina. In some embodiments, the composition has a cell viability of about 85% to 95%.

The term "ocular disorder," as used herein, can include retinal diseases and optic nerve disorders (e.g., macular degeneration, retinal detachment, congenital retinal disease, diabetic retinopathy, glaucoma, optic neuropathy, retinal neuron damage, or any combination thereof).

The terms "subject" or "patient," as used herein, refer to any mammal (e.g., a human or a veterinary subject, e.g., a dog, cat, horse, cow, goat, sheep, mouse, rat, or rabbit) to which a composition or method of the present disclosure may be administered, e.g., for experimental, diagnostic, prophylactic, and/or therapeutic purposes. The subject may seek or need treatment, require treatment, is receiving treatment, will receive treatment, or is under care by a trained professional for a particular disease or condition.

The terms "interpenetrating polymer network," "IPN," "IPNs," "interpenetrating network," and "IPN hydrogel," as used herein, can be used interchangeably and refer to a hydrogel including two or more polymer networks, which are at least partially interlaced on a molecular scale but not covalently bonded to each other and cannot be separated unless chemical bonds are broken (e.g., a hydrogel including Gtn-HPA and HA-Tyr), as provided by the corresponding context of the disclosure.

Certain embodiments of the present disclosure include methods of using hydrogel compositions or formulations for the treatment of ocular disorders. There is currently a need for improved compositions that can meet the necessary requirements to successfully deliver cells into the eye and promote cell growth and engraftment of the delivered cells. The hydrogel compositions and methods of using the hydrogel compositions of the present disclosure address the above-mentioned necessary requirements. In some embodiments, the methods of using the hydrogel compositions described herein can prevent, treat, reduce and/or eliminate symptoms associated with ocular diseases (e.g., retinal and optic nerve diseases).

In some embodiments, the hydrogel compositions of the present disclosure are quick and easy to deliver into the eye. For example, the hydrogel compositions of the disclosure can be delivered using a syringe (e.g., a single barrel or a dual barrel syringe). An issue often encountered with delivery of cells is poor cell viability after delivery, which negatively affects the therapeutic outcome. In some embodiments, the hydrogel compositions have a high cell viability allowing for long-term survival (e.g., one month) of a majority of the delivered cells. In some embodiments, the hydrogel compositions have the ability to permit controlled and sustained release of cells over a defined period of time.

In some embodiments, the hydrogel compositions have biocompatibility with ocular tissue. In some embodiments, the hydrogel compositions promote engraftment and growth of encapsulated cells without eliciting an immune response from the patient. In some embodiments, the biomechanical properties of the hydrogel compositions are similar to the biomechanical properties of the native tissue (e.g., the vitreous). In some embodiments, the hydrogel compositions adhere to an inner portion of the eye (e.g., the retina), which is key for the long-term survival of the delivered cells. In some embodiments, key physical characteristics (e.g., stiffness and elasticity) of the hydrogel compositions can be fine-tuned by modulating the concentration of certain components (e.g., crosslinker and/or polymer concentrations).

Where values are described in the present disclosure in terms of ranges, endpoints are included. Furthermore, it should be understood that the description includes the disclosure of all possible sub-ranges within such ranges, as well as specific numerical values that fall within such ranges irrespective of whether a specific numerical value or specific sub-range is expressly stated.

Other features and advantages of the present disclosure will be apparent from the following detailed description and figures, and from the claims.

Various embodiments of the features of this disclosure are described herein. However, it should be understood that such embodiments are provided merely by way of example, and numerous variations, changes, and substitutions can occur according to those skilled in the art without departing from the scope of this disclosure. It should also be understood that various alternatives to the specific embodiments described herein are also within the scope of this disclosure.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

Other features and advantages of the invention will be apparent from the following detailed description and figures, and from the claims.

DESCRIPTION OF DRAWINGS

FIG. 17A shows a first example set of immunohistochemistry images of the center of the retina (usually the injected site), taken at 63× magnification and used as a learning data set for an image processing algorithm. The column labeled "Cell Size" shows sections of the retina labelled with its corresponding ellipse (for size and orientation). The column labeled "Image Processing" shows image processing of the center of each cell and their surface (for size). The column labeled "DAPI" shows cells stained with DAPI to show the structure of the retina with cells that were injected. The actual orientation of each cell corresponds to the angle difference between its body and the layer it is located in.

FIG. 17B shows a second example set of immunohistochemistry images of the center of the retina (usually the injected site), taken at 63× magnification and used as a learning data set for an image processing algorithm. The column labeled "Cell Size" shows sections of the retina labelled with its corresponding ellipse (for size and orientation). The column labeled "Image Processing" shows image processing of the center of each cell and their surface (for size). The column labeled "DAPI" shows cells stained with DAPI to show the structure of the retina with cells that were injected. The actual orientation of each cell corresponds to the angle difference between its body and the layer it is located in.

DETAILED DESCRIPTION

The ability of biomaterials to provide a required mechanical, chemical and environmental niche for cell proliferation, differentiation, and apoptosis is critical in eye diseases because the environment at degenerative sites in the eye is highly unfavorable for the introduction of most stem cells. The vitreous, being a large heterogeneous hydrogel, remains the typical injection site for many eye and retinal diseases, and targeting the retina requires control of cell release, migration, and viability, which could be regulated by an injectable polymeric network.

In some embodiments, the compositions of the present disclosure are suitable for vitreal injections. In some embodiments, the compositions are able to be injected, and once injected, the hydrogel compositions can support the growth and engraftment of encapsulated cells (e.g., human retinal ganglion cells) that can eventually start regenerating an axon along the optical nerve. In some embodiments, by precisely matching the chemical and mechanical properties of the hydrogel compositions of the disclosure with the chemical and mechanical properties of the vitreous, attachment of delivered cells to the retina and enhancement of cell migration, engraftment and retinal regeneration is provided.

Hydrogel Compositions

The present disclosure presents hydrogel compositions or formulations, which include biomaterials (e.g., one or more of Gtn-HPA and HA-Tyr), and a delivery payload (e.g., a cell). In some embodiments, the hydrogel composition includes Gtn-HPA, HA-Tyr, a catalyzer (e.g., horseradish peroxidase (HRP)), and a crosslinker (e.g., hydrogen peroxide). In some embodiments, the hydrogel composition includes Gtn-HPA, HA-Tyr, a catalyzer (e.g., horseradish peroxidase (HRP)), a crosslinker (e.g., hydrogen peroxide), and an ocular cell. In some embodiments, the hydrogel composition is an interpenetrating polymer network (IPN). In some embodiments, the hydrogel composition is not a random heteropolymer network. In some embodiments, the hydrogel composition is biocompatible. In some embodiments, the hydrogel composition is non-toxic to an ocular environment. In some embodiments, the hydrogel composition is a crosslinkable, viscoelastic, composite hydrogel. In some embodiments, the hydrogel composition includes a polymer network filled with an interstitial solvent (e.g., a fluid) which includes water.

Figure 1:
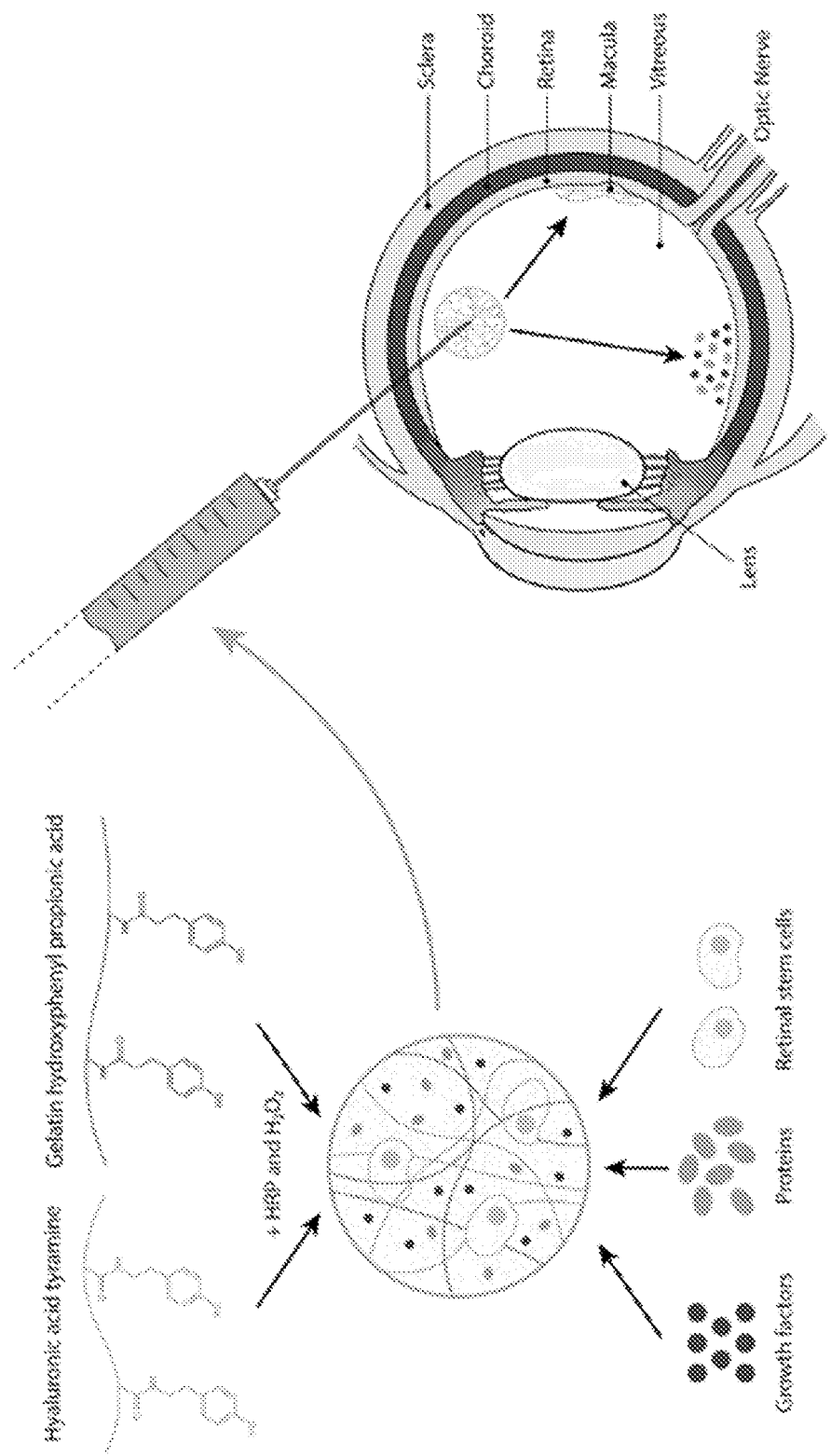
FIG. 1 is a schematic illustrating an example injectable hydrogel for ophthalmic application.

As shown in FIG. 1, hyaluronic acid-tyramine (HA-Tyr) and gelatin-hydroxyphenyl propionic acid (Gtn-HPA) can be mixed into a copolymeric network (CP), catalyzed with horseradish peroxidase (HRP). The copolymeric network can undergo a crosslinking process with hydrogen peroxide ($H_2O_2$) to form an injectable and biodegradable hydrogel. The hydrogel attaches to the retina and releases its payload (e.g., cells) within the interior of the eye (e.g., the macula) for a therapeutic effect.

In some embodiments, the hydrogel composition includes water. In some embodiments, the hydrogel composition includes water at a concentration of about 88% to 98%. In some embodiments, the hydrogel composition includes water and one or more of polymers, catalyzers, and/or crosslinkers. In some embodiments, the hydrogel composition includes a polymer concentration ranging from about 2% weight (% wt) to 12% wt. In some embodiments, the hydrogel composition includes a polymer concentration of about 2% wt. In some embodiments, the hydrogel composition includes a polymer concentration of about 3% wt. In some embodiments, the hydrogel composition includes a polymer concentration of about 4% wt. In some embodiments, the hydrogel composition includes a polymer concentration of about 5% wt. In some embodiments, the hydrogel composition includes a polymer concentration of about 6% wt. In some embodiments, the hydrogel composition includes a polymer concentration of about 7% wt. In some embodiments, the hydrogel composition includes a polymer concentration of about 8% wt. In some embodiments, the hydrogel composition includes a polymer concentration of about 9% wt. In some embodiments, the hydrogel composition includes a polymer concentration of about 10% wt. In some embodiments, the hydrogel composition includes a polymer concentration of about 11% wt. In some embodiments, the hydrogel composition includes a polymer concentration of about 12% wt. In some embodiments, the hydrogel composition includes a polymer concentration ranging from about 2% wt to 3% wt, about 3% wt to 4% wt, about 4% wt to 5% wt, about 5% wt to 6% wt, about 6% wt to 7% wt, about 7% wt to 8% wt, about 8% wt to 9% wt, about 9% wt to 10% wt, about 10% wt to 11% wt, about 11% wt to 12% wt, or more.

Hyaluronic acid (HA) is a viscoelastic and highly biocompatible glycosaminoglycan, that is naturally present in the vitreous or vitreous body. The vitreous serves as a mechanical damper for the eye, absorbing impacts and protecting the lens and retina. HA is further known to play a role in the regeneration and reconstruction of soft tissues. In some embodiments, a chemically modified HA can be included in the hydrogel compositions of the present disclosure. In some embodiments, the chemically modified HA can be hyaluronic acid-tyramine (HA-Tyr).

In some embodiments, the HA-Tyr is present at a specific ratio in the polymer concentration (e.g., ranging from about 2% wt to about 12% wt) of the hydrogel composition. In some embodiments, the HA-Tyr is present at a concentration between about 0% and about 70% in the hydrogel composition. In some embodiments, the HA-Tyr is present at a concentration between about 1% and about 70% in the hydrogel composition. In some embodiments, the hydrogel composition includes HA-Tyr at a concentration of about 50%. In some embodiments, the hydrogel composition includes HA-Tyr at a concentration of about 25%. In some embodiments, the hydrogel composition includes HA-Tyr at a concentration of about 70%. In some embodiments, the hydrogel composition includes HA-Tyr at a concentration of about 60%. In some embodiments, the hydrogel composition includes HA-Tyr at a concentration of about 40%. In some embodiments, the hydrogel composition includes HA-Tyr at a concentration of about 30%. In some embodiments, the hydrogel composition includes HA-Tyr at a concentration of about 20%. In some embodiments, the hydrogel composition includes HA-Tyr at a concentration of about 1%. In some embodiments, the hydrogel composition includes methacrylated hyaluronic acid at a concentration ranging from about 0% to about 20%, about 20% to about 30%, about 30% to about 40%, about 40% to about 50%, about 50% to about 60%, or about 60% to about 70% or more.

Gelatin is a derivative from collagen, which is naturally present in the vitreous in the form of collagen type II and collagen type IX. Gelatin has strong adhesive properties to cells and tissue due to the presence of RGD motifs that facilitate integrin binding. In some embodiments, a chemically modified gelatin can be included in the hydrogel compositions of the present disclosure. In some embodiments, the chemically modified gelatin can be modified with hydroxyphenylpropionic acid (HPA) to form Gtn-HPA, a crosslinkable derivative of gelatin.

In some embodiments, the Gtn-HPA is present at a specific ratio in the polymer concentration (e.g., ranging from about 2% wt to about 12% wt) of the hydrogel composition. In some embodiments, the concentration of Gtn-HPA in the hydrogel composition can range from about 30% to about 100%. In some embodiments, the hydrogel composition includes Gtn-HPA at a concentration of about 50%. In some embodiments, the hydrogel composition includes Gtn-HPA at a concentration of about 75%. In some embodiments, the hydrogel composition includes Gtn-HPA at a concentration of about 30%. In some embodiments, the hydrogel composition includes Gtn-HPA at a concentration of about 40%. In some embodiments, the hydrogel composition includes Gtn-HPA at a concentration of about 60%. In some embodiments, the hydrogel composition includes Gtn-HPA at a concentration of about 70%. In some embodiments, the hydrogel composition includes Gtn-HPA at a concentration of about 80%. In some embodiments, the hydrogel composition includes Gtn-HPA at a concentration of about 90%. In some embodiments, the hydrogel composition includes Gtn-HPA at a concentration of about 100%. In some embodiments, the hydrogel composition includes methacrylated hyaluronic acid at a concentration ranging from about 30% to about 40%, about 40% to about 50%, about 50% to about 60%, about 60% to about 70%, about 70% to about 80%, about 80% to about 90%, or about 90% to about 100%.

In some embodiments, the hydrogel composition includes a concentration ratio of Gtn-HPA to HA-Tyr of about 50%:50%. In some embodiments, the hydrogel composition includes a concentration ratio of Gtn-HPA to HA-Tyr of about 75%:25%. In some embodiments, the hydrogel composition can consist essentially of Gtn-HPA and HA-Tyr. In some embodiments, the hydrogel composition includes about 75% Gtn-HPA and about 25% HA-Tyr totaling about 2% wt of the total hydrogel composition. In some embodiments, the hydrogel composition includes about 50% Gtn-HPA and about 50% HA-Tyr totaling about 2% wt of the total hydrogel composition.

In some embodiments, the hydrogel composition can consist essentially of water, Gtn-HPA, and HA-Tyr. In some embodiments, the hydrogel composition includes about 98% wt water and about 2% wt of Gtn-HPA and HA-Tyr. In some embodiments, the hydrogel composition includes about 97% wt water and about 3% wt of Gtn-HPA and HA-Tyr. In some embodiments, the hydrogel composition includes about 96% wt water and about 4% wt of Gtn-HPA and HA-Tyr. In some embodiments, the hydrogel composition includes about 95% wt water and about 5% wt of Gtn-HPA and HA-Tyr. In some embodiments, the hydrogel composition includes about 94% wt water and about 6% wt of Gtn-HPA and HA-Tyr. In some embodiments, the hydrogel composition includes about 93% wt water and about 7% wt of Gtn-HPA and HA-Tyr. In some embodiments, the hydrogel composition includes about 92% wt water and about 8% wt of Gtn-HPA and HA-Tyr. In some embodiments, the hydrogel composition includes about 91% wt water and about 9% wt of Gtn-HPA and HA-Tyr. In some embodiments, the hydrogel composition includes about 90% wt water and about 10% wt of Gtn-HPA and HA-Tyr. In some embodiments, the hydrogel composition includes about 89% wt water and about 11% wt of Gtn-HPA and HA-Tyr. In some embodiments, the hydrogel composition includes about 88% wt water and about 12% wt of Gtn-HPA and HA-Tyr.

In some embodiments, the hydrogel compositions can include a crosslinker that can be used to activate polymerization and solidification or gelation of the hydrogel composition when it is in a non-solid (e.g., viscous liquid, gel, or liquid) state. In some embodiments, the crosslinker is an enzymatic crosslinker. In some embodiments, the crosslinker is hydrogen peroxide. In some embodiments, the hydrogel composition is contacted with hydrogen peroxide at a concentration of about 0.5 mM to 5 mM. In some embodiments, the hydrogel composition is contacted with hydrogen peroxide at a concentration of about 1 mM. In some embodiments, the hydrogel composition is contacted with hydrogen peroxide at a concentration ranging from about at least 0.5 mM to about 1 mM, about 1 mM to about 2 mM, about 2 mM to about 3 mM, about 3 mM to about 4 mM, about 4 mM to about 5 mM, or more. In some embodiments, the crosslinker is a photo-crosslinker. In some embodiments, the photo-crosslinker is a visible light photo-crosslinker.

In some embodiments, the hydrogel compositions can include a catalyzer that can be used to activate and/or catalyze the crosslinking reaction of the hydrogel composition. In some embodiments, the catalyzer is an enzymatic crosslinker. In some embodiments, the catalyzer is horseradish peroxidase (HRP). In some embodiments, the hydrogel composition is contacted with HRP at a concentration of about 0.1 units per milliliter (U/ml) to 0.2 U/ml. In some embodiments, the hydrogel composition is contacted with HRP at a concentration of about 0.1 U/ml. In some embodiments, the hydrogel composition is contacted with HRP at a concentration of about 0.2 U/ml. In some embodiments, the hydrogel composition is contacted with HRP at a concentration ranging from about at least 0.1 U/ml to 0.2 U/ml, about 0.2 U/ml to 0.3 U/ml, about 0.3 m U/ml M to 0.4 U/ml, about 0.4 U/ml to 0.5 U/ml, 0.5 U/ml to 0.6 U/ml, about 0.6 m U/ml M to 0.7 U/ml, about 0.7 U/ml to 0.8 U/ml, about 0.8 U/ml to 0.9 U/ml, about 0.9 m U/ml M to 1 U/ml, about 1 U/ml to 1.5 U/ml, about 1.5 U/ml to 2 U/ml or more.

In some embodiments, the hydrogel composition can consist essentially of Gtn-HPA. In some embodiments, the hydrogel composition can consist essentially of Gtn-HPA, a crosslinker (e.g., hydrogen peroxide), a catalyzer (e.g., horseradish peroxidase), and water. In some embodiments, the hydrogel composition can consist essentially of HA-Tyr, a crosslinker (e.g., hydrogen peroxide), a catalyzer (e.g., horseradish peroxidase), and water.

Physical Properties of Hydrogel Composition

The physical properties of the hydrogel compositions of the disclosure, including but not limited to stiffness, elasticity, degradation rate, adhesion, and swelling, can be finely tuned by modulating the concentration of one or more of the polymers (e.g., Gtn-HPA, HA-Tyr, crosslinker, and/or catalyzer). Table 1 below shows how modulation of the concentrations of Gtn-HPA, HA-Tyr, and crosslinker, and overall polymer weight of the hydrogel compositions can be used to fine tune key physical properties (e.g., stiffness, elasticity, and degradation rate). IPN100 corresponds to a hydrogel composition including 100% Gtn-HPA and 0% HA-Tyr. IPN75 corresponds to a hydrogel composition including 75% Gtn-HPA and 25% HA-Tyr. IPN75 corresponds to a hydrogel composition including 5% Gtn-HPA and 50% HA-Tyr. IPN30 corresponds to a hydrogel composition including 30% Gtn-HPA and 70% HA-Tyr. IPN0 corresponds to a hydrogel composition including 0% Gtn-HPA and 100% HA-Tyr.

TABLE 1

| Type of IPN | Polymer weight | Crosslinker Concentration | Stiffness (Pa) | Young's Modulus (Pa) | Degradation (Days) |
|---|---|---|---|---|---|
| IPN100 | 2% | 1 mM | 578 | 2532 | ~7 |
| IPN75 | 2% | 1 mM | 835 | 3101 | ~5 |
| IPN50 | 2% | 1 mM | 1072 | 4316 | ~10 |
| IPN30 | 2% | 1 mM | 1150 | 5216 | ~14 |
| IPN0 | 2% | 1 mM | 1438 | 6818 | ~20 |
| IPN100 | 2% | 1.5 mM | 746 | 3896 | ~7 |
| IPN50 | 2% | 1.5 mM | 1600 | 6120 | ~10 |
| IPN100 | 2% | 2 mM | 1000 | 5120 | ~7 |
| IPN50 | 2% | 2 mM | 2150 | 8150 | ~10 |
| IPN100 | 2% | 2.5 mM | 1356 | 6000 | ~7 |
| IPN50 | 2% | 2.5 mM | 2840 | 10000 | ~10 |

Figure 2A:
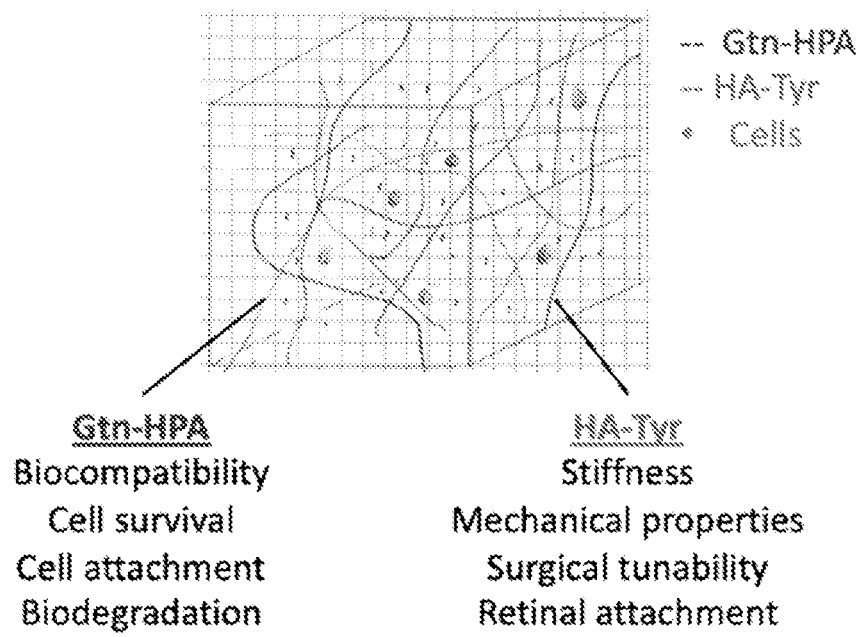
FIG. 2A is a schematic illustrating an example interpenetrating polymer network (IPN) hydrogel including gelatin hydroxyphenyl propionic acid (Gtn-HPA) and hyaluronic acid tyramine (HA-Tyr).
Figure 2B:
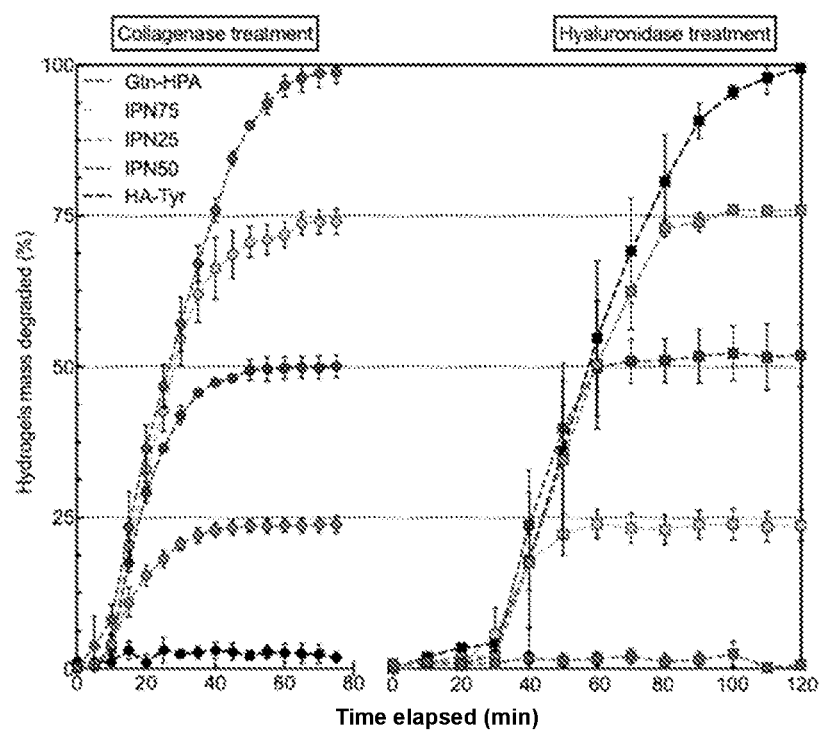
FIG. 2B shows the enzymatically degraded mass of example IPN hydrogels (IPN25, IPN75, and IPN50) and control hydrogels (Gtn-HPA and HA-Tyr) as a function of time.
Figure 2C:
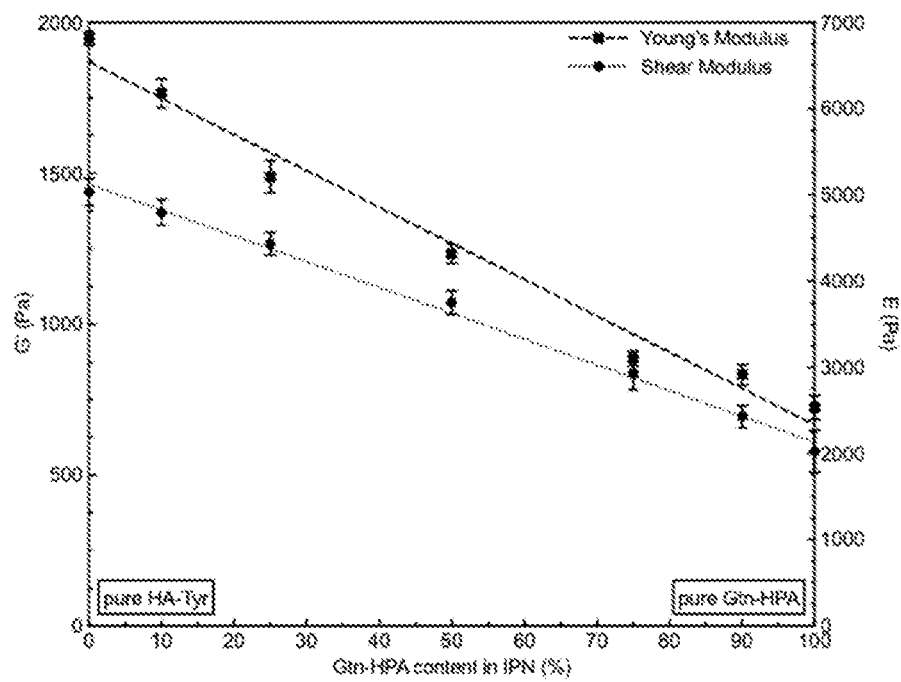
FIG. 2C shows the shear G') and Young's (E) moduli decrease monotonically over the amount of Gtn-HPA in the example IPN hydrogels.

FIG. 2C shows the calculated Young's moduli of hydrogel compositions as a function of the concentration of Gtn-HPA in the compositions. In some embodiments, the hydrogel composition has a Young's modulus ranging from about 2300 Pa to 7000 Pa. Young's modulus, also known as the modulus of elasticity in tension or compressive, is a mechanical property that measures the response of a material to uniaxial stress in the direction of this stress. Young's modulus quantifies the relationship between tensile stress a (i.e., force per unit area) and axial strain F (i.e., the proportional deformation of a material) in the linear elastic region of a material. Young's modulus is determined using the formula shown below.

$$E = \frac{\sigma}{\varepsilon}$$

The Young's modulus of the hydrogel compositions can be determined by calculating the slope of the stress vs. strain curve, which is generated by performing compression tests on the hydrogel compositions at a constant strain rate (see, e.g., Example 1; section titled "Hydrogel compression test"). In some embodiments, the hydrogel composition has a Young's modulus ranging from about 2900 Pa to 4500 Pa. In some embodiments, the hydrogel composition has a Young's modulus of about 3100 Pa. In some embodiments, the hydrogel composition has a Young's modulus of about 4300 Pa. In some embodiments, the hydrogel composition has a Young's modulus ranging from at least about 2300 Pa to 2500 Pa, about 2500 Pa to 2700 Pa, about 2700 Pa to 2900 Pa, about 2900 Pa to 3100 Pa, about 3100 Pa to 3300 Pa, about 3300 Pa to 3500 Pa, about 3500 Pa to 3700 Pa, about 3700 Pa to 3900 Pa, about 4100 Pa to 4300 Pa, about 4300 Pa to 4300 Pa, or more.

FIG. 2C shows the calculated storage or elastic moduli (i.e., G') of hydrogel compositions as a function of the concentration of Gtn-HPA in the compositions. In some embodiments, the hydrogel composition has a storage or elastic modulus (i.e., G'), ranging from about 500 Pa to 6000 Pa. The term "stiffness," as used herein, is defined as the storage or elastic modulus (i.e., G') of a composition. The storage or elastic modulus (G') is a mechanical property that measures the elasticity of a material. The storage or elastic modulus (G') of the hydrogel compositions can be determined by performing oscillatory rheology measurements at a constant strain. Alternatively, storage or elastic modulus (G') of the hydrogel compositions can be determined by performing passive micro-rheology measurements of microbeads immersed in the compositions of the disclosure (see, e.g., Example 1; section titled "Passive micro-rheology measurements and PLGA microbeads tracking").

In some embodiments, the hydrogel composition has a stiffness ranging from about 500 Pa to 1500 Pa. In some embodiments, the hydrogel composition has a stiffness of about 800 Pa. In some embodiments, the hydrogel composition has a stiffness of about 1000 Pa. In some embodiments, the hydrogel composition has a stiffness ranging from at least about 500 Pa to 600 Pa, about 600 Pa to 700 Pa, about 700 Pa to 800 Pa, about 800 Pa to 900 Pa, about 900 Pa to 1000 Pa, about 1000 Pa to 1100 Pa, about 1100 Pa to 1200 Pa, about 1200 Pa to 1300 Pa, about 1300 Pa to 1400 Pa, about 1400 Pa to 1500 Pa, or more.

The degradation rate of the hydrogel composition can be controlled based on the concentration of one or more polymers (e.g., Gtn-HPA and/or HA-Tyr) and/or concentration of crosslinker added as well as the total polymer weight. In some embodiments, the degradation rate of they hydrogel composition can be quantified in vitro and in vivo (see, e.g., Example 1; section titled "In vitro degradation assays for IPNs" and Example 3; section titled "Hydrogels-retina interface and OCT analysis algorithms"). In some embodiments, the hydrogel composition has a degradation rate of about 5 to 7 days. In some embodiments, the hydrogel composition has a degradation rate of about 5 days. In some embodiments, the hydrogel composition has a degradation rate of about 6 days. In some embodiments, the hydrogel composition has a degradation rate of about 7 days. In some embodiments, the hydrogel composition has a degradation rate ranging from about 5 to 20 days. In some embodiments, the hydrogel composition has a degradation rate ranging from about 5 to about 6 days, about 6 to about 7 days, about 7 to about 8 days, about 8 to about 9 days, about 9 to about 10 days, about 10 to about 15 days, about 15 to about 20 days. In some embodiments, the hydrogel composition has a degradation rate of less than about 20, about 15, about 10, or about 7 days. In some embodiments, the hydrogel composition has a degradation rate of more than about 1, about 5, about 7, about 10, about 14, about 21.

In some embodiments, a hydrogel composition having a volume of about 200 µl has a degradation rate of about 5 to 7 days. In some embodiments, the hydrogel composition having a volume of about 200 µl has a degradation rate of about 5 days. In some embodiments, a hydrogel composition having a volume of about 200 µl has a degradation rate of about 6 days. In some embodiments, a hydrogel composition having a volume of about 200 µl has a degradation rate of about 7 days. In some embodiments, a hydrogel composition having a volume of about 200 µl has a degradation rate ranging from about 5 to 20 days. In some embodiments, a hydrogel composition having a volume of about 200 µl has a degradation rate ranging from about 5 to about 6 days, about 6 to about 7 days, about 7 to about 8 days, about 8 to about 9 days, about 9 to about 10 days, about 10 to about 15 days, about 15 to about 20 days. In some embodiments, a hydrogel composition having a volume of about 200 µl has a degradation rate of less than about 20, about 15, about 10, or about 7 days. In some embodiments, a hydrogel composition having a volume of about 200 µl has a degradation rate of more than about 1, about 5, about 7, about 10, about 14, about 21.

In some embodiments, a hydrogel composition having a volume of about 1.5 cubed centimeters ($cm^3$) has a degradation rate of about 5 to 7 days. In some embodiments, the hydrogel composition having a volume of about 1.5 $cm^3$ has a degradation rate of about 5 days. In some embodiments, a hydrogel composition having a volume of about 1.5 $cm^3$ has a degradation rate of about 6 days. In some embodiments, a hydrogel composition having a volume of about 1.5 $cm^3$ has a degradation rate of about 7 days. In some embodiments, a hydrogel composition having a volume of about 1.5 $cm^3$ has a degradation rate ranging from about 5 to 20 days. In some embodiments, a hydrogel composition having a volume of about 1.5 $cm^3$ has a degradation rate ranging from about 5 to about 6 days, about 6 to about 7 days, about 7 to about 8 days, about 8 to about 9 days, about 9 to about 10 days, about 10 to about 15 days, about 15 to about 20. In some embodiments, a hydrogel composition having a volume of about 1.5 $cm^3$ has a degradation rate of less about 20, about 15, about 10, or about 7 days. In some embodiments, a hydrogel composition having a volume of about 1.5 $cm^3$ has a degradation rate of more than about 1, about 5, about 7, about 10, about 14, about 21.

In some embodiments, the hydrogel compositions of the present disclosure can include a plurality of cells as a delivery payload. For example, the plurality of cells can be mixed in with the polymers (e.g., Gtn-HPA and/or HA-Tyr) in a liquid state prior to crosslinking. After crosslinking the polymeric composition with the cells mixed in it, the cells can thus become encapsulated within the hydrogel composition. In some embodiments, the hydrogel composition has a cell viability of about 85% to 95%. In some embodiments, the hydrogel composition has a cell viability of about 85% to 95% after at least about 1 day of encapsulation to about 30 days of encapsulation or more. In some embodiments, the hydrogel composition has a cell viability of about 85% to 95% after 5 days of encapsulation. In some embodiments, the hydrogel composition has a cell viability of about 85% to 95% after 7 days of encapsulation. In some embodiments, the hydrogel composition has a cell viability of about 85% to 95% after 15 days of encapsulation. In some embodiments, the hydrogel composition has a cell viability of about 85% to 95% after 30 days of encapsulation.

In some embodiments, the hydrogel composition can include a plurality of ocular cells. The term "ocular cells" or "ocular cell," as used herein, can include one or more cells that are native to the eye and/or are part of the ocular cell system. In some embodiments, the plurality of ocular cells is a plurality of human retinal progenitor cells (hRPGs), human retinal ganglion cells, or any combination thereof. In some embodiments, the plurality of ocular cells is a plurality of autologous stem cells that can differentiate into cells that are part of the ocular cell system. In some embodiments, the plurality of ocular cells is a plurality of allogeneic stem cells that can differentiate into cells that are part of the ocular cell system. In some embodiments, the plurality of ocular cells encapsulated in hydrogel compositions of the disclosure does not elicit an immune response when delivered to a subject (e.g., into an eye of the subject). In some embodiments, the plurality of ocular cells is human-derived ocular cells. In some embodiments, the plurality of ocular cells is a plurality of ocular cells derived from induced pluripotent stem cells (iPSCs). In some embodiments, the plurality of ocular cells is a plurality of ocular cells derived from mesenchymal stem cells (MSCs).

In some embodiments, the hydrogel composition can include a plurality of cells at a concentration ranging from about at least about 1,000 cells per milliliter (cells/ml) to 1,000,000 cells/ml or more. In some embodiments, the hydrogel composition can include a plurality of cells at a concentration of about 1,000 cells/ml. In some embodiments, the hydrogel composition can include a plurality of cells at a concentration of about 10,000 cells/ml. In some embodiments, the hydrogel composition can include a plurality of cells at a concentration of about 100,000 cells/ml. In some embodiments, the hydrogel composition can include a plurality of cells at a concentration of about 1,000,000 cells/ml.

In some embodiments, the cells delivered by the hydrogel composition have a cell viability of greater than about 50% after 1 day post-delivery to the eye of the subject. In some embodiments, the cells delivered by the hydrogel composition have a cell viability of greater than about 60% after 1 day post-delivery to the eye of the subject. In some embodiments, the cells delivered by the hydrogel composition have a cell viability of greater than about 70% after 1 day post-delivery to the eye of the subject. In some embodiments, the cells delivered by the hydrogel composition have a cell viability of greater than about 80% after 1 day post-delivery to the eye of the subject. In some embodiments, the cells delivered by the hydrogel composition have a cell viability of greater than about 90% after 1 day post-delivery to the eye of the subject. In some embodiments, the cells delivered by the hydrogel composition have a cell viability of greater than about 95% after 1 day post-delivery to the eye of the subject. In some embodiments, the cells delivered by the hydrogel composition have a cell viability of greater than about 98% after 1 day post-delivery to the eye of the subject.

In some embodiments, the cells delivered by the hydrogel composition have a cell viability of greater than about 50% after 3 days post-delivery to the eye of the subject. In some embodiments, the cells delivered by the hydrogel composition have a cell viability of greater than about 60% after 3 days post-delivery to the eye of the subject. In some embodiments, the cells delivered by the hydrogel composition have a cell viability of greater than about 70% after 3 days post-delivery to the eye of the subject. In some embodiments, the cells delivered by the hydrogel composition have a cell viability of greater than about 80% after 3 days post-delivery to the eye of the subject. In some embodiments, the cells delivered by the hydrogel composition have a cell viability of greater than about 90% after 3 days post-delivery to the eye of the subject. In some embodiments, the cells delivered by the hydrogel composition have a cell viability of greater than about 95% after 3 days post-delivery to the eye of the subject. In some embodiments, the cells delivered by the hydrogel composition have a cell viability of greater than about 98% after 3 days post-delivery to the eye of the subject.

In some embodiments, the cells delivered by the hydrogel composition have a cell viability of greater than about 50% after 5 days post-delivery to the eye of the subject. In some embodiments, the cells delivered by the hydrogel composition have a cell viability of greater than about 60% after 5 days post-delivery to the eye of the subject. In some embodiments, the cells delivered by the hydrogel composition have a cell viability of greater than about 70% after 5 days post-delivery to the eye of the subject. In some embodiments, the cells delivered by the hydrogel composition have a cell viability of greater than about 80% after 5 days post-delivery to the eye of the subject. In some embodiments, the cells delivered by the hydrogel composition have a cell viability of greater than about 90% after 5 days post-delivery to the eye of the subject. In some embodiments, the cells delivered by the hydrogel composition have a cell viability of greater than about 95% after 5 days post-delivery to the eye of the subject. In some embodiments, the cells delivered by the hydrogel composition have a cell viability of greater than about 98% after 5 days post-delivery to the eye of the subject.

In some embodiments, the cells delivered by the hydrogel composition have a cell viability of greater than about 50% after 7 days post-delivery to the eye of the subject. In some embodiments, the cells delivered by the hydrogel composition have a cell viability of greater than about 60% after 7 days post-delivery to the eye of the subject. In some embodiments, the cells delivered by the hydrogel composition have a cell viability of greater than about 70% after 7 days post-delivery to the eye of the subject. In some embodiments, the cells delivered by the hydrogel composition have a cell viability of greater than about 80% after 7 days post-delivery to the eye of the subject. In some embodiments, the cells delivered by the hydrogel composition have a cell viability of greater than about 90% after 7 days post-delivery to the eye of the subject. In some embodiments, the cells delivered by the hydrogel composition have a cell viability of greater than about 95% after 7 days post-delivery to the eye of the subject. In some embodiments, the cells delivered by the hydrogel composition have a cell viability of greater than about 98% after 7 days post-delivery to the eye of the subject.

In some embodiments, the cells delivered by the hydrogel composition have a cell viability of greater than about 50% after 10 days post-delivery to the eye of the subject. In some embodiments, the cells delivered by the hydrogel composition have a cell viability of greater than about 60% after 10 days post-delivery to the eye of the subject. In some embodiments, the cells delivered by the hydrogel composition have a cell viability of greater than about 70% after 10 days post-delivery to the eye of the subject. In some embodiments, the cells delivered by the hydrogel composition have a cell viability of greater than about 80% after 10 days post-delivery to the eye of the subject. In some embodiments, the cells delivered by the hydrogel composition have a cell viability of greater than about 90% after 10 days post-delivery to the eye of the subject. In some embodiments, the cells delivered by the hydrogel composition have a cell viability of greater than about 95% after 10 days post-delivery to the eye of the subject.

In some embodiments, the cells delivered by the hydrogel composition have a cell viability of greater than about 98% after 10 days post-delivery to the eye of the subject. In some embodiments, the cells delivered by the hydrogel composition have a cell viability of greater than about 50% after 15 days post-delivery to the eye of the subject. In some embodiments, the cells delivered by the hydrogel composition have a cell viability of greater than about 60% after 15 days post-delivery to the eye of the subject. In some embodiments, the cells delivered by the hydrogel composition have a cell viability of greater than about 70% after 15 days post-delivery to the eye of the subject. In some embodiments, the cells delivered by the hydrogel composition have a cell viability of greater than about 80% after 15 days post-delivery to the eye of the subject. In some embodiments, the cells delivered by the hydrogel composition have a cell viability of greater than about 90% after 15 days post-delivery to the eye of the subject. In some embodiments, the cells delivered by the hydrogel composition have a cell viability of greater than about 95% after 15 days post-delivery to the eye of the subject. In some embodiments, the cells delivered by the hydrogel composition have a cell viability of greater than about 98% after 15 days post-delivery to the eye of the subject.

In some embodiments, the cells delivered by the hydrogel composition have a cell viability of greater than about 50% after 20 days post-delivery to the eye of the subject. In some embodiments, the cells delivered by the hydrogel composition have a cell viability of greater than about 60% after 20 days post-delivery to the eye of the subject. In some embodiments, the cells delivered by the hydrogel composition have a cell viability of greater than about 70% after 20 days post-delivery to the eye of the subject. In some embodiments, the cells delivered by the hydrogel composition have a cell viability of greater than about 80% after 20 days post-delivery to the eye of the subject. In some embodiments, the cells delivered by the hydrogel composition have a cell viability of greater than about 90% after 20 days post-delivery to the eye of the subject. In some embodiments, the cells delivered by the hydrogel composition have a cell viability of greater than about 95% after 20 days post-delivery to the eye of the subject. In some embodiments, the cells delivered by the hydrogel composition have a cell viability of greater than about 98% after 20 days post-delivery to the eye of the subject.

In some embodiments, the cells delivered by the hydrogel composition have a cell viability of greater than about 50% after 30 days or more post-delivery to the eye of the subject. In some embodiments, the cells delivered by the hydrogel composition have a cell viability of greater than about 60% after 30 days or more post-delivery to the eye of the subject. In some embodiments, the cells delivered by the hydrogel composition have a cell viability of greater than about 70% after 30 days or more post-delivery to the eye of the subject. In some embodiments, the cells delivered by the hydrogel composition have a cell viability of greater than about 80% after 30 days or more post-delivery to the eye of the subject. In some embodiments, the cells delivered by the hydrogel composition have a cell viability of greater than about 90% after 30 days or more post-delivery to the eye of the subject. In some embodiments, the cells delivered by the hydrogel composition have a cell viability of greater than about 95% after 30 days or more post-delivery to the eye of the subject. In some embodiments, the cells delivered by the hydrogel composition have a cell viability of greater than about 98% after 30 days or more post-delivery to the eye of the subject.

In some embodiments, about 50% of the cells delivered by the hydrogel composition survive after delivery to the eye of the subject. In some embodiments, about 60% of the cells delivered by the hydrogel composition survive after delivery to the eye of the subject. In some embodiments, about 70% of the cells delivered by the hydrogel composition survive after delivery to the eye of the subject. In some embodiments, about 80% of the cells delivered by the hydrogel composition survive after delivery to the eye of the subject. In some embodiments, about 90% of the cells delivered by the hydrogel composition survive after delivery to the eye of the subject. In some embodiments, about 95% of the cells delivered by the hydrogel composition survive after delivery to the eye of the subject. In some embodiments, about 96% of the cells delivered by the hydrogel composition survive after delivery to the eye of the subject. In some embodiments, about 97% of the cells delivered by the hydrogel composition survive after delivery to the eye of the subject. In some embodiments, about 98% of the cells delivered by the hydrogel composition survive after delivery to the eye of the subject. In some embodiments, about 99% of the cells delivered by the hydrogel composition survive after delivery to the eye of the subject.

Methods of Treatment

The present disclosure presents methods of treating or preventing (i.e., reducing risk of) an ocular disorder (e.g., a retinal disease or a disorder affecting the optic nerve) in an eye of a subject. In some embodiments, the present disclosure presents compositions for use in the treatment or prevention of an ocular disorder (e.g., a retinal disease or a disorder affecting the optic nerve) in an eye of a subject. In some embodiments, the eye disorder includes congenital retinal disease, diabetic retinopathy, glaucoma, optic neuropathy, retinal neuron damage, neurofibromatosis type 1 optic nerve glioma, or any combination thereof. Treating can include improving one or more clinical parameters of the disorder, e.g., visual acuity, or delaying or reducing risk of progression of the disorder.

The methods of treatment or prevention can include the steps of administering a therapeutically effective amount of the composition into an eye of the subject. In some embodiments, the composition attaches to an inner portion of the eye after administration into the eye. In some embodiments, the inner portion of the eye is the retina. In some embodiments, the inner portion of the eye is the inner limiting membrane of the retina.

In some embodiments, the composition is administered as a liquid. In some embodiments, the Gtn-HPA, HA-Tyr, and ocular cells are mixed prior to administration into the eye of the subject. In some embodiments, the Gtn-HPA, HA-Tyr, ocular cell, crosslinker (e.g., hydrogen peroxide), and catalyst (e.g., HRP) are mixed prior to administration into the eye of the subject. For example, these components can be mixed prior to administration and then loaded into an applicator (e.g., a syringe). The user (e.g., clinician or healthcare practitioner) can then inject the composition into the eye in a liquid or semi-liquid (e.g., viscous) state prior to gelation or crosslinking. In some embodiments, the composition gelates in situ (i.e., inside the eye of the subject after injection) to the eye (e.g., via an intravitreal injection). In some embodiments, the composition is enzymatically crosslinked in situ.

In some embodiments, the gelatin-HPA, HA-Tyr, and ocular cell are mixed during administration into the eye of the subject. In some embodiments, the Gtn-HPA, HA-Tyr, ocular cells, crosslinker (e.g., hydrogen peroxide), and catalyst (e.g., HRP) are mixed during administration into the eye of the subject. For example, these components can be mixed loaded into an applicator (e.g., a syringe) without any previous mixing. In another example, the components of the composition can be loaded into an applicator having separate compartments (e.g., a dual barrel syringe). In some embodiments, the composition is injected into an eye of the subject by using a dual barrel syringe where a first compartment of the dual barrel syringe houses the polymers (e.g., Gtn-HPA and/or HA-Tyr) and optionally the cells, and the second compartment of the dual barrel syringe contains the crosslinker (e.g., hydrogen peroxide) and/or the catalyzer (e.g., HRP). In this manner, the user (e.g., clinician or healthcare practitioner) can then inject the composition into the eye in a liquid state and prevent gelation or crosslinking from starting until the contents of both compartments mix in situ (e.g., in the vitreous of the eye of the subject). In some embodiments, the composition gelates in situ (i.e., inside the eye of the subject) after injection into the eye (e.g., via an intravitreal injection). In some embodiments, the composition is enzymatically crosslinked in situ.

In some embodiments, about 200 microliters (μL) of the composition (e.g., precursor hydrogel composition) is injected into the eye. In some embodiments, between about 50 and 250 microliters (μL) of the composition (e.g., precursor hydrogel composition) is injected into the eye.

In some embodiments, the methods of treating and/or preventing an ocular disorder further include enzymatically crosslinking the composition by contacting the composition with hydrogen peroxide and horseradish peroxidase and waiting for about 30 seconds to 240 seconds for the composition to reach a gel point. In some embodiments, the hydrogel composition transitions from a liquid to a gel state within about 240 seconds after adding a crosslinker. In some embodiments, the hydrogel composition transitions from a liquid to a gel state within about 200 seconds after adding a crosslinker. In some embodiments, the hydrogel composition transitions from a liquid to a gel state within about 300 seconds after adding a crosslinker. In some embodiments, the hydrogel composition transitions from a liquid to a gel state within about 150 seconds after adding a crosslinker. In some embodiments, the hydrogel composition transitions from a liquid to a gel state within about 100 seconds after adding a crosslinker.

In some embodiments, the composition is administered via a pars plana vitrectomy. In some embodiments, the composition is administered into a vitreous of the eye of the subject. In some embodiments, the composition is administered into the inner portion of the eye is the retina.

In summary, a new biomaterial design that can protect and catalyze the in vivo regeneration of retinal ganglion cells in the eye to potentially regenerate vision lost during diseases such as NF1-OPG is disclosed herein. The interpenetrating polymer network hydrogels developed can be ideal candidates for encapsulating nutrients and cells.

SD-OCT was introduced for the first time in eye stem cell therapy studies as a tool to examine and show the live presence of IPN hydrogels onto the inner limiting membrane of the retina. The IPN hydrogels of the disclosure enabled a uniform release of stem cells throughout time and enhanced their evolution into an elongated axon-like morphology.

Furthermore, the mechanical properties of hydrogels, not just the composition, can surprisingly trigger the IPN hydrogels to graft to the correct surface (e.g., a retinal surface) by having an increased stiffness while maintaining high biocompatibility and biodegradability. This phenomenon might be due to the continuous shear forces present in the eye due to its movement and the dual interaction of the inner limiting membrane (e.g., integrin bonding and collagen fiber entanglement).

The IPN hydrogels of the disclosure can provide design principles for and stem cell therapies in the eye and other organs, which depend critically on viability and stability of cells during injection and development.

EXAMPLES

Certain embodiments of the present disclosure are further described in the following examples, which do not limit the scope of any embodiments described in the claims.

Example 1—IPN Tunability Properties and Characterization Materials and Methods—Materials Characterization Hydrogel Preparation Gtn-HPA and HA-Tyr conjugate were prepared via a general carbodiimide/active ester-mediated coupling reaction (in PBS) that conjugated hydroxyphenylpropionic acid (HPA) to gelatin (MW 20-80 kDA) and Tyramine (Tyr) to Hyaluronidase (HA) (MW 80-150 kDa). 90% of the amine groups were conjugated with HPA or Tyramine. For the control hydrogels, 0.1 U/mL of horseradish peroxidase HRP (Wako USA), and 1 mM of $H_2O_2$ (Sigma-Aldrich) with or without hRGC, were mixed into Gtn-HPA or HA-Tyr hydrogel prepared using 2 weight percent (wt %) solution of Gtn-HPA or 0.25, 0.5 and 2 wt % solution of HA-Tyr. Other concentrations of crosslinker $H_2O_2$ (0.5, 0.8, 0.9, 1, 1.3, 2.5, and 5 mM) were used to investigate the effect of hydrogels on cell viability and storage modulus, which was measured with oscillatory rheology.

Hybrid interpenetrating networks (IPN10, 25, 50, 75 and IPN90) were prepared by mixing the corresponding amounts of Gtn-HPA and HA-Tyr at 2 wt % solution (e.g. IPN75 corresponds to 75% of Gtn-HPA and 25% of HA-Tyr both at 2 wt % solution). To create IPN hydrogels, 0.1 U/mL of HRP and different concentrations of $H_2O_2$ (0.8, 0.9, 1 and 1.3 mM) with or without cells were mixed into the solution. Hydrogels were formed after less than 5 minutes and incubated at 37° C. to reach stability.

Hyaluronic acid with high molecular weight (HHA) (MW 1200 kDA, Sigma-Aldrich) was dissolved in PBS at 2, 3 and 5% wt solution with hRGCs by thoroughly mixing the samples with a vortex throughout the experiment. No chemical reagent was added, and physical crosslinking was seen in less than a minute.

Collagen-Genipin (CG) hydrogels were prepared by dissolving collagen type I from calf skin (Sigma-Aldrich) in a 2% wt solution and mixing it with hRGCs. Genipin 98%-HPCL (Sigma-Aldrich) at concentrations of 0.5, 1, 5, and 10 mM were then added to the solution containing polymer and cells. Hydrogels were incubated at 37° C. and reached stability after 20 min.

Oscillatory Rheology

Oscillatory rheology was performed with a TA instruments AR-G2 rheometer using cone and plate geometry of 40 mm diameter and 2° angle. For each measurement, 200 µl of each sample (Gtn-HPA, IPN90, IPN75, IPN50, IPN25, IPN10, and HA-Tyr) at 2% wt/vol, containing 0.1 U/ml of HRP and varying concentrations of $H_2O_2$ (ranging from 0.8-1.3 mM) was applied to the bottom plate immediately after mixing. All hydrogels having a gelation time comprised between 30 s-3 min samples were still liquid when applied onto the bottom plate. The upper cone was lowered to a measurement gap of 51 µm. As soon as the layer of silicone oil was applied during the experiment, to prevent evaporation, the rheometer was started. All measurements were taken at 37° C. in the oscillation mode with a constant strain of 1% and frequency of 1 Hertz (Hz). To estimate the gelation rate, i.e., the time at which the gel point (as defined by the crossover between storage modulus, G' and loss modulus, G") occurred, G' (storage modulus) and G" (loss modulus) were measured every 2 seconds. Final plateau value of G' and time to reach this plateau were then recorded for each sample. Due to the fast gelation of all samples and the time it took to place the sample onto the bottom plate and the start of experiment, gel point was not measured with oscillatory rheology. Gel point measurement was performed separately by micro-rheology.

Differential Scanning Calorimetry (DSC) and Gel Permeation Chromatography (GPC)

All the materials were analyzed using a differential scanning calorimeter (DSC 250) (TA Instruments, New Castle, USA). Polymer powders (Gtn-HPA and HA-Tyr) were analyzed from 20 to 250° C. at a heating speed of 10° C./min. Glass transition was observed by measuring the derivative of heat flow and melting temperature was seen as a peak above the glass temperature.

Gel permeation chromatography was performed at 35° C. with a Malvern Viscotek VE 2001 GPC max UV 2501 detector, a TDA 301 chromatography system and a PL aquagel-OH MIXED-M column (Agilent). Samples were run at 1 mg/mL through a mobile phase comprised of 10 mM sodium phosphate monobasic (Macron Chemicals), 100 mM sodium nitrate (Sigma Aldrich), 20% wt/mL methanol (Sigma Aldrich), adjusted to pH 7.4. HA-Tyr and Gtn-HPA were dissolved in 2 mL of the mobile phase, at a concentration of 10% wt/mL, by thoroughly mixing and incubating samples for 1 h at 37° C. Molecular weights were then referenced against polyethylene glycol standards (Waters). Molecular weight parameters (Mw, Mn, P, and MWD) were calculated for standards and samples using the respective GPC calibration equation: $Log(Mn)=Ao+A1*Vp$, where Mn is the molecular weight, Vp is the eluded volume, $Ao=10.2086$ and $A1=-0.7604$. Chromatogram heights were measured at retention times of interval 0.5 minutes.

Hydrogel Compression Test

Unconfined compression tests were performed using a Zwick/Roell Z2.5 static materials tester (Zwick GmbH & Co., Ulm, Germany) with integrated testing software (testXpert, Zwick). 1 mL of Gtn-HPA, IPN50, IPN75, and HA-Tyr were disposed into 24-well plates to create samples about 16 mm in diameter and about 3-4 mm in thickness. All hydrogels were left to fully crosslink and stabilize for 2 hours at 37° C. before performing compression testing. All gels were swelled in PBS for 1 hour before compression testing.

Mechanical tests were performed at a constant strain rate of 0.5%/s to a maximum strain of 10% using a 20 N load cell (Part No. BTC-LC0020N.P01, Zwick) sampling at a frequency of 2 Hz. The diameter of the samples at the start of the testing was measured using digital calipers. The compressive modulus was determined by the slope of the true stress-strain curve within the linear regime of the material (~0-7%).

Fourier Transform Infrared (FTIR) Spectroscopy Analysis

Fourier transform infrared (FTIR) spectrum was recorded to detect the chemical and structural nature of Gtn-HPA powder, HA-Tyr powder and dried hydrogels (Gtn-HPA, IPN75, IPN50, HA-Tyr), using a Thermo Fisher FTIR6700 spectrometer. Samples were characterized using attenuated total reflection (ATR) mode for a total of 32 scans in the range of 500-4000 cm$^{-1}$. FTIR baseline was applied and normalization was performed with respect to the characteristic backbone peak (around 1600 cm$^{-1}$ for Gtn-HPA and 1000 cm$^{-1}$ for HA-Tyr). For dried hydrogels spectra, 10 mL of each sample was prepared at a concentration of 10 wt %/mL, casted into a 5 cm petri dish. Samples were left to dry overnight in a low oxygen incubator (37° C., 5% 02 and 5% $CO_2$).

In Vitro Degradation Assays for IPNs

200 µl gels (Gtn-HPA, IPN75, IPN50, IPN25 and HA-Tyr) were prepared as previously described in the section titled "Hydrogel Preparation." Hydrogels were prepared and incubated for 30 min at 37° C. to reach stability. Samples were then combined with 200 µl of phosphate-buffered saline (PBS) containing 1000 U/ml type IV collagenase (Invitrogen) or containing 500 U/mL hyaluronidase type I-S(Sigma-Aldrich) and incubated at 37° C. on an orbital shaker at 150 revolutions per minute (rpm). Samples were collected every 5 or 10 minutes for 1 or 2 hours, for collagenase or hyaluronidase treatments, respectively, and analyzed for degradation products using the bicinchoninic assay (Thermo Fisher Scientific).

In order to model and replicate the in vivo conditions, slow degradation assays were also performed. 200 µl of the injected hydrogels (Gtn-HPA, IPN75, and IPN50) were prepared and incubated for 1 h at 37° C. to reach stability. The actual concentrations of collagenase (coming from MMPs) and hyaluronidase (which is intrinsic in the vitreous) are about 0.5 U/ml and about 0.3 U/ml in vivo, respectively. 5 ml of the enzymes with these concentrations were mixed together and added to the hydrogel samples. Samples were kept in incubators, collected every day for 9 days, and analyzed for degradation products using the bicinchoninic assay. Degradation rate constants were derived by fitting the data for mass loss into an inverse exponential model.

Passive Micro-Rheology Measurements and PLGA Microbeads Tracking.

All samples had an extremely short gelation time; thus, common oscillatory rheology was not able to capture their gel point. Hence, to characterize this specific viscoelastic characteristic, passive micro-rheology was performed. A volume of 10 µl of 10-20 µm PLGA microbeads (Sigma-Aldrich), at a concentration of $10^5$ microbeads/mL, were thoroughly added and mixed with all polymers. Then, after the addition of the catalyst (HRP) and the crosslinker ($H_2O_2$), 200 µl of each sample was pipetted as fast as possible onto a microscope slide and particles movement were tracked for a period of approximately 4 minutes by taking a video to record their Brownian motion inside the hydrogel in process of gelation.

ImageJ (Fiji, NIH) was used to track the center of (n=15-17) particles for each sample during 6 minutes. A MATLAB program was then used to calculate the mean square displacement and fit the data with an exponential function. This fit function was then used to calculate the complex modulus by feeding the fit function data into a MATLAB function that fits this data with a second-order polynomial function from which the first- and second-time derivatives are computed and from that the complex modulus. Finally, the storage modulus (elastic) G' and loss modulus (viscous) G" were measured in order to calculate the gel point (defined by the crossing of G' and G").

Results

IPN Tunability Properties and Characterization

It is desirable for a biomaterial to have optimal characteristics (FIG. 2A) and tunability as well as biocompatibility and biodegradability. A short-term viability study, corresponding to the encapsulation of retinal stem cells in different example hydrogels, was performed for 3 days. The results suggested that only networks incorporating Gelatin Hydroxyphenyl propionic acid (Gtn-HPA) and Hyaluronic acid tyramine (HA-Tyr) have a sufficient biocompatibility (hence cell viability) to be considered as candidate for enhancing retinal regeneration (see FIG. 6E). These might have been anticipated because the vitreous is the only part of the body that contains both of these biopolymers. However, their particular structure is not the same as that of the hybrid gels.

For the IPN hydrogel system, both networks were in-situ enzymatically crosslinked with Horseradish peroxidase (HRP) and $H_2O_2$ (see details in Example 1; section titled "Hydrogel Preparation"). The results showed that the crosslinking is very specific, having observable selectivity and thus, yielding a hybrid interpenetrating network (IPN) and not a random heteropolymer network. Networks with different contents (ranging from pure Gtn-HPA to pure HA-Tyr) were prepared and enzymatically degraded while their mass loss was checked throughout time. As seen in FIG. 2B, applying either collagenase or hyaluronidase treatment degraded the exact proportion of respectively Gtn-HPA or HA-Tyr that was included in the preparation of networks: e.g. IPN75 (containing 75% of Gtn-HPA and 25% of HA-Tyr) possessed a mass loss of 75% when mixed with collagenase and a mass loss of 25% when mixed with hyaluronidase. Complete degradation was observed on homopolymeric networks mixed with their respective enzymes. A difference in degradation time was seen, where HA-Tyr possesses a degradation time constant that doubles the one for Gtn-HPA with a delay of 30-40 min. This, along with the Fourier transform infrared spectroscopy (FIGS. 7A and 7B), confirms the formation of a hybrid IPN.

To assess whether mechanical tunability of these IPN can be controlled by their content (amount of Gtn-HPA) oscillatory rheology and unconfined compression testing were performed. As seen in FIG. 2C, the shear (G') and Young's (E) modulus decreased monotonically over the amount of Gtn-HPA in the IPN, ranging respectively from 1438 Pa and 6828 Pa for pure HA-Tyr to 578 Pa and 2532 Pa for pure Gtn-HPA. This tendency can be explained by the measurement of G' for both homo-polymeric networks (FIGS. 8A-C), which shows that HA-Tyr possesses a shear modulus 2-5 times larger than Gtn-HPA (depending on the amount of crosslink added). Mechanical and stiffness tunability can therefore be controlled by the IPN content.

Figure 8A:
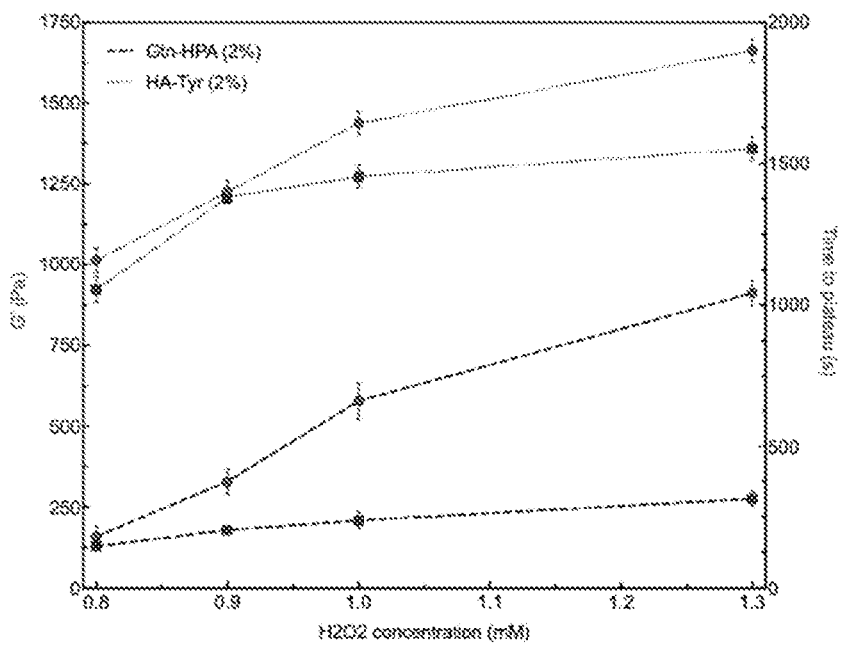
FIG. 8A shows the shear (G') modulus of example hydrogels as a function of hydrogen peroxide concentration.
Figure 8B:
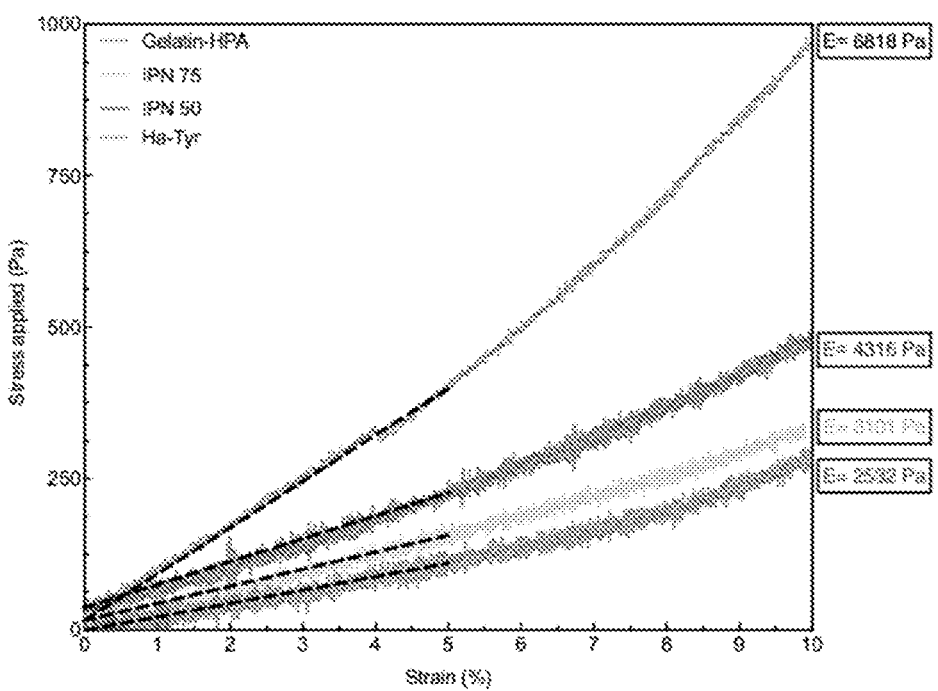
FIG. 8B shows the Young's (E) modulus of example hydrogels of example hydrogels.
Figure 8C:
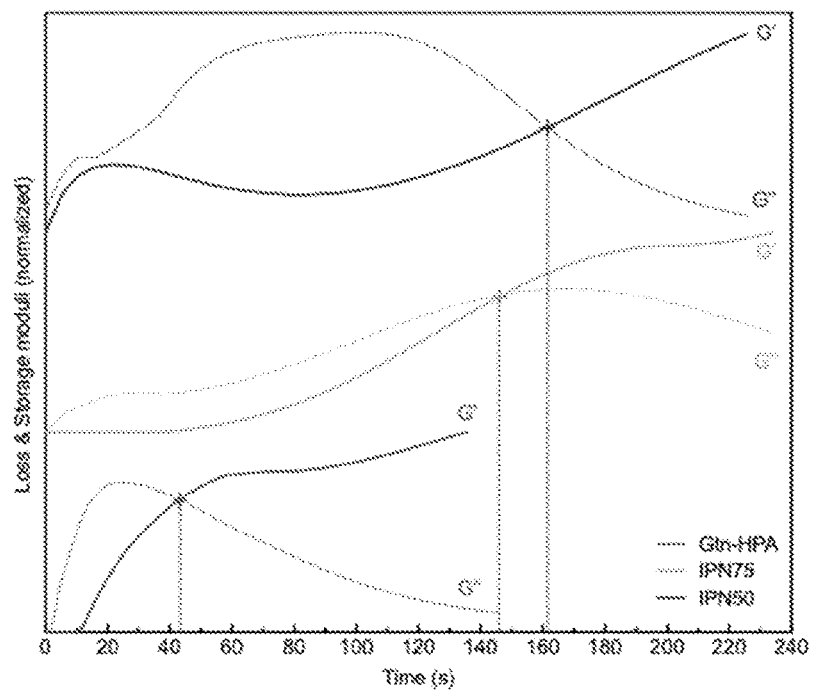
FIG. 8C shows the storage modulus (elastic) G' and loss modulus (viscous) G" of example hydrogels as a function of time after mixing and adding crosslinker (e.g., hydrogen peroxide) to Gtn-HPA and HA-Tyr.

For in-situ crosslinking hydrogels, controlling the gel point is critical in terms of surgical performance: networks must crosslink after injection to avoid needle clogging. To measure the gel points of the samples, micro-rheology was used due to the extremely fast gelation of these IPN which prevented the possibility to measure it during common oscillatory rheology. As explained in Example 1; section titled "Passive micro-rheology measurements and PLGA microbeads tracking," PLGA microbeads were mixed with the networks and their mean square displacement (MSD), due to Brownian motion, was measured over time. All studied samples (Gtn-HPA, IPN75 and IPN50) presented double exponential decay of microbeads MSD (FIG. 2D); however, different characteristic times were observed. The higher the HA-Tyr content in the IPN and the longer the microbeads moves corresponded to a longer gel point time. FIGS. 8A-8C show the time evolution of loss and storage modulus, calculated from microbeads' MSD, which corresponded to the MSD being null. Gel point ranged from 42 seconds (s) for Gtn-HPA to 2 minutes 47 seconds for IPN50, which conveyed the fact that gelation time is tunable by controlling the Gtn-HPA content of IPN. The PLGA microparticles are bigger than the pore size of the IPN and, while they showed what the gel point is, they did not present the crosslinking kinetics of these hydrogels. By measuring the time for G' to reach plateau in oscillatory rheology (inset in FIG. 2D), the time needed for hydrogels to reach steady-state equilibrium (stability of IPN) was detected and was shown to increase with the amount of HA-Tyr.

Complete characterization of solid polymers (FIGS. 9A-9C), homo-polymeric networks, and IPN was performed and is summarized in Table 2 shown below. These findings established hybrid IPN, made of Gtn-HPA and HA-Tyr, as a suitable candidate for cell encapsulation, in vivo injection, and enhancement of retinal regeneration.

TABLE 2

| Polymer | (wt %) | G' (Pa) | E (Pa) | Gel Point(s) | Time to plateau(s) | Mn (kg/mol) | Mw (g/mol) | Tg (C) | Tm (C) |
|---|---|---|---|---|---|---|---|---|---|
| Gtn-HPA | 2 | 578 ± 32 | 2532 ± 20 | 42.5 | 220 ± 18 | 18,000 ± 40 | 64,500 ± 75 | 140 ± 1 | 167 ± 2 |
| IPN75 | 2 | 835 ± 26 | 3101 ± 24 | 151 | 479 ± 10 | | | | |
| IPN50 | 2 | 1072 ± 29 | 4316 ± 39 | 167 | 888 ± 9 | | | | |
| HA-Tyr | 2 | 1438 ± 13 | 6818 ± 76 | 273 | 1463 ± 5 | 68,000 ± 55 | 153,70 ± 20 | 148 ± 2 | 188 ± 1 |

Example 2—Optimal IPN for Cell Encapsulation and In Vivo Injection Materials and Methods—hRGC Characterization Assays and In Vivo Experiments Source and Viability of hRGC Human retinal ganglion cells (hRGCs) Brn3b-TdTomato positive were gifted from Dr. Donald Zack laboratory. Cells at $1\times10^5$/mL, in 1 mL of the different carriers, different catalyst and crosslinker compositions was used, listed in section 2.1.1 Hydrogels preparation were pipetted onto fibronectin-coated round coverslips glass (thickness 5 mm, diameter 1 cm, VWR). After 1, 3, and 7 days of incubation with media or PBS, they were incubated with 2.5 µM calcein AM (FITC) and 10 µM ethidium homodimer-1 (Cy3) in PBS for 15 min at 37° C. and 5% $CO_2$. Samples were then washed three times with PBS for 10 min, at room temperature. Coverslips with cells encapsulated in hydrogels were mounted on poly-l-lysine microscope slides (thickness 1 mm, L×W 75×25 mm, Thermo Scientific Shandon) with low viscosity slide mounting medium (Fisher Scientific) before imaging with an epifluorescence confocal microscope (Leica SP8, USA), in order to capture the 3D configuration of cell distribution through the different hydrogels.

Harvesting hRGC for Flow Cytometry hRGCs [($3\times10^5$ cells/mL in PBS or in 1 mL of Gtn-HPA, IPN75 and IPN50 hydrogels, in 6-well plates (3.5 cm diameter, polystyrene, flat bottom, sterile, fisher scientific)] were maintained in PBS for 5 days (replicating the in vivo conditions). 1000 U/mL collagenase-type IV (Invitrogen) was then added to degrade the Gtn-HPA hydrogels and 500 U/mL hyaluronidase type I-S(Sigma-Aldrich) was added to degrade the HA-Tyr part of the IPN; after 20 minutes of incubation, Gtn-HPA, IPN75 and IPN50 gels were fully dissolved. Samples were centrifuged, and the hRGCs were harvested. The phenotype of hRGCs was analyzed using flow cytometry with the MACSQuant flow cytometer (Miltenyi, San Diego). hRGCs, from the 4 different conditions—in PBS, in Gtn-HPA, IPN75 and IPN50 were collected and fixed with a Perm/Fix buffer (BD Biosciences) at 4° C. for 15 min. Cells were then washed in a wash buffer (BD Biosciences) and incubated, at room temperature, in a blocking buffer (Pharmingen staining buffer with 2% goat serum) for 30 min. Blocked cells were seeded onto a flat bottom 96-well plate (treated, sterile, polystyrene, Thomas Scientific) and stained overnight at 4° C. with the following primary antibodies: Brn3a, RBPMS, Thy1.1 (ganglion cell marker), Caspase9 (apoptosis marker), Ki67 (proliferation marker), Cmyc, Oct4 (sternness markers) and NeuN (neuronal marker). Primary antibodies were diluted in 200 µL of antibody buffer (TBS, 0.3% Triton X-100 and 1% goat serum). After overnight incubation cells were washed three times for 15 min and incubated in secondary antibodies and left at room temperature for 3 h; secondary antibodies (goat-derived anti-rabbit *FITC and anti-mouse* APC, DAPI-VioBlue) were diluted 1:200 in antibody buffer (Jackson Immunoresearch Laboratory). Light scatter and fluorescence signals from each sample were measured using the MACSQuant (Miltenyi Biotech, Germany) flow cytometer ($2\times10^5$ events were recorded). The results were analyzed using the MACSQuantify software. For each primary antibody the DAPI-positive single cell population was gated. The ratio of positive cells in the gated population was estimated in comparison with blank and species-specific isotype controls. Primary antibodies and their dilutions are listed in Table 3 shown below. Multiple antibodies were used for flow cytometry and immunohistochemistry of in vitro samples of hRGC encapsulated in hydrogels and in vivo sections of rats' retina. Name, isotype, working dilution and source can be seen in Table 3.

TABLE 3

| Antibody | Isotype | Working Dilution | Source |
|---|---|---|---|
| DAPI-Vioblue | IgG2a | 1:1000 | BD Biosciences |
| Caspase9-FITC | IgG1 | 1:50 | Santa Cruz |
| CMYC-FITC | IgG1 | 1:200 | BD Biosciences |
| STEM121-FITC | IgG1 | 1:50 | TakaraBio |
| Brn3a-FITC | IgG1 | 1:100 | ThermoFisher |
| IBA1-FITC | IgG1 | 1:100 | Abcam |
| KI67-APC | IgG2a | 1:50 | Santa Cruz |
| RBPMS-APC | IgG2a | 1:100 | EMD Millipore |
| THY1.1-APC | IgG2a | 1:100 | Miltenyi Biotec |
| NeuN-APC | IgG2a | 1:100 | Abcam |
| Oct4-APC | IgG2a | 1:200 | BD Biosciences |
| CD45-PE | IgG H&L | 1:100 | Abcam |
| GFAP-PE | IgG H&L | 1:50 | TakaraBio |
| Rb Control | IgG1 | 1:100 | Abcam |
| Ms Control | IgG2a | 1:100 | Abcam |

In vivo xenograft study-animals, surgery and tissue processing

The research protocol was reviewed and approved by the Schepens Eye Research Institute Animal Facility and was in accordance with the Association for Research in Vision Ophthalmology Statement for the Use of Animals in Ophthalmic and Vision Research. Twenty-seven female Long Evans rats (age 12 weeks, approximate weight 200 g, Charles River. Wilmington, MA) were used in the experiments. Transplantations were performed on Cyclosporine (Atopica, oral solution 100 mg/mL, Novartis, USA) immunosuppressed rats. Animals were sedated using 20%-3‰ isoflurane (Abbott, Solna, Sweden) in combination with oxygen by placing the rats in an inhalation chamber, followed by intraperitoneal injection of ketamine (40-80 mg/kg) and xylazine (10 mg/kg) for anesthesia. Eyes were first anesthetized using topical ophthalmic proparacacome (0.50%) followed by Genteal to keep the lens moist during the surgery.

A conjunctival incision and a small sclerotomy were performed using a fine disposal scalpel in all rats. A 2% wt Gtn-HIPA/hRGC hydrogel (n=5), 2% wt IPN75/hRGC (n=5), 2% wt IPN50/hRGC (n=5) or a cell suspension in PBS (n=5), were injected into the vitreous of the rats. 3 rats were taken as control and n=4 rats were subjected to only SHAM injection. All injections were performed using a glass pipette (internal diameter, 150 µm) attached to a 10 µL Hamilton syringe via a polyethylene tubing. Approximately $1 \times 10^4$ cells in an injection volume of 3 µL were used in each of the 4 groups. The presence of islands of gels onto the back of the eye was checked using a glass coverslip applied to the eye. Vitreal injection was considered successful if shiny islands were seen under the dissection surgical microscope (Alcon Vitreoretinal, Constellation Vision System). Triple antibiotic (Bac/Neo/Poly) was given locally at the end of the surgery to prevent infection. The rats were then placed in their cages for 4 weeks. 100 mg/L of Cyclosporine was added to the water container of all cages and was changed every 3 days.

Four weeks post transplantation, immunosuppressed rats were sacrificed by $CO_2$ inhalation for 5 min. Cervical dislocation was performed to certify death. Eyes were enucleated and placed in 4% paraformaldehyde for 24 hours. Tissues were subsequently saturated with increased concentrations of sucrose (5%, 10%, 20%) containing Sorensen phosphate buffer. Eyes were immersed in 30% sucrose overnight or until dissection. The tissues were embedded in cryosection gelatin medium overnight and sectioned at 15 µm thickness on a cryostat. During the sectioning process, every $4^{th}$ section was stained and examined by epifluorescence for hRGCs presenting with STEM121-FITC (human cell marker) and DAPI-Vioblue (cell nucleus). Every $5^{th}$ section was stained with CD45-PE, IBA1-FITC (immune cell marker) and DAPI-Vioblue. Every $6^{th}$ section was stained with GFAP-PE (Müller cells marker) and DAPI-Vioblue.

Vitreal Injections and Optical Coherence Tomography Imaging (SD-OCT)

The same protocol for sedation and anesthesia as for the xenograft study was used for vitreal injections of hydrogels and SD-OCT imaging. Rats left pupils were dilated with tropicamide (VetRXDirect, USA). Animals were then anesthetized and a conjunctival incision and a small sclerotomy were performed using a fine disposal scalpel in all rats. A 2% wt Gtn-HPA hydrogel (n=5), 2% wt IPN75 (n=5) and 2% wt IPN50 (n=5), all samples without cells, were injected into the vitreous of the rats. Animals were then placed in front of the SD-OCT imaging device (Spectralis HRA+OCT, Heidelberg Engineering, MA, USA). Eyes were kept moist with HBSS during the whole procedure. Images were taken before, right after injections, 1 h after and each day until no more gel was visible. Presence of gel was assessed by visible islands of gel sitting on top of the retina in IR images. Images of the back of the eye with 4B-scans 30 frames were taken and retinal sections with 4B-scans 60 frames, all done in rectangular scan. Acquired images were saved as tiff files. Firstly, image artifacts due to breathing movements were eliminated by using the StackReg Plugin. Then, all frames were converted into a single image by applying the z-projection. This average enables for the elimination of most of the noise observed on individual images, which help to observe the presence of gel and its volume, or degradation time. Comparison before and after injection was performed to see the impact of gel injection on retina morphology and detachment.

Three days post-vitreal injection, rats were sacrificed by $CO_2$ inhalation for 5 min. Cervical dislocation was performed to certify death. The same protocol as for xenograft study was applied to enucleated eyes. After sectioning, every other section was stained and analyzed with Hematoxylin and Eosin (H&E) in order to measure and locate the different hydrogels on top of the retina.

Immunofluorescence and Histological Staining of In Vitro Samples and In Vivo Cryosections hRGCs cultured on microscope cover slips, and cryosections from Long Evans rats left eyes, were fixed with 4% paraformaldehyde in 0.1 M PBS (Irvine Scientific) at room temperature for 20 min. These fixed cells and sections were blocked and permeabilized with a blocking solution ((Tris-buffered saline (TBS), 0.3% Triton X-100 and 3% goat serum (Jackson Immunoresearch Laboratories, West Grove, PA) for 15 min. Samples were then rinsed twice with 0.1 M TBS buffer for 15 min each time, mounted on polylysine microscope slides and incubated with primary antibodies overnight at 4° C. (Table 3): Brn3a-FITC, RBPMS-FITC, Thy1.1-FITC (ganglion cell marker), Caspase9-FITC (apoptosis marker), Ki67-APC (proliferation marker), C-myc-APC, Oct4-APC (stemness markers) and NeuN-APC (neuronal marker), CD45-FITC (leukocyte marker), IBA1-FITC (macrophage marker), GFAP-FITC (Müller cell marker) and STEM121-FITC (human cytoplasmic marker). After overnight incubation, samples were rinsed three times with TBS for 15 min. Secondary antibodies (goat-derived anti-mouse-APC and anti-rabbit-FITC, DAPI-VioBlue) staining was performed for 1 h at room temperature. Samples were then washed a final time with TBS before being mounted on poly-l-lysine microscope slides with low viscosity slide mounting medium. Digital images were obtained with an epifluorescence confocal microscope (Leica SP8) using 63×-oil objective.

Slides from the vitreal injection of gel only were examined using H&E staining, three days post-injection. Thermoscientific Rapid-Chrome H&E staining kit was used. This consists in an 18-steps process which permanently stains cytology specimens. Slides are dipped into a series of solutions containing 95% alcohol, distilled water, Hematoxylin, Bluing reagent and Eosin-Y stain followed by a series of washings before the final fixing step. Slides were then mounted and observed under an upright microscope (Leica DM2500) at different magnifications.

Results

Figure 3A:
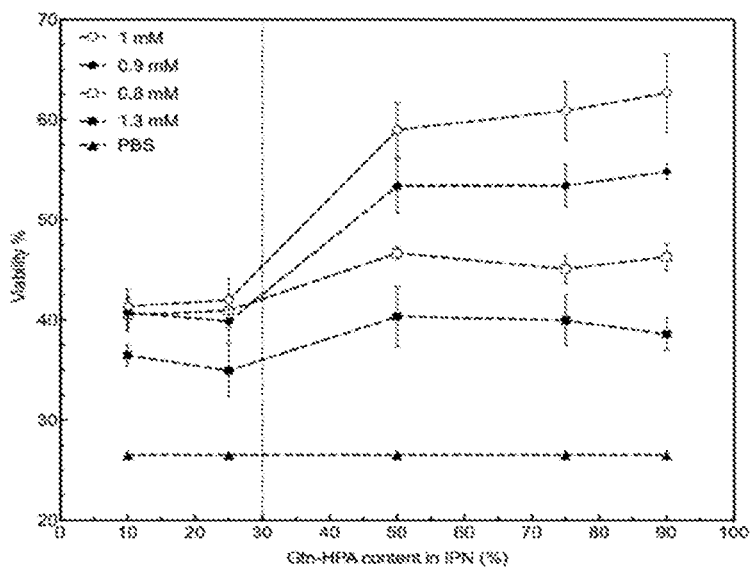
FIG. 3A shows the impact of Gtn-HPA content in example IPN hydrogels on encapsulated cell viability.

Using hydrogels for cell encapsulation implies tuning the materials to be able to conserve many cell characteristics: high viability, differentiation, phenotype, shape or distribution through the gel. For this purpose, human retinal ganglion cells (see Example 2; section titled "Source and viability of hRGC") were encapsulated in multiple IPN with different content and crosslinker concentrations. Results obtained from a short-term viability study, seen in FIGS. 10A-10B and FIG. 3A, yielded the optimal crosslinker ($H_2O_2$) concentration which would lead to the highest cell viability both in IPN and homo-polymeric hydrogels: 1 mM of $H_2O_2$. FIG. 3A shows the impact of Gtn-HPA content in IPN on encapsulated cell viability. A viability threshold, corresponding to a content of >30% of Gtn-HPA, was observed for all crosslinker concentrations proving that cells do not thrive in HA-Tyr. This finding can be related to the understanding that hRGCs possess integrins to attach to the gelatin backbone but not to the hyaluronic acid backbone. This result reduced the number of hydrogel candidates to IPN possessing a Gtn-HPA content higher than 50% (which include Gtn-HPA itself). Of note is that cell viability in all IPN was significantly higher than when cells were left in phosphate buffer saline (PBS) for 3 days.

To compare the efficacy of different IPN, the rest of in vitro and in vivo experiments were performed with IPN50, IPN75, and Gtn-HPA, which satisfied the actual requirement and had different mechanical and chemical properties. A long-term in vitro viability assay was performed (1, 3, and 7 days) by leaving cells in PBS or adding defined media in hydrogels (FIG. 3B). hRGCs receiving media, encapsulated or not, were significantly more viable than those receiving PBS even after 7 days. This suggested a favorable diffusion of nutrients inside IPN. However, when cells receive no nutrients viability decreased significantly with time, reaching <7% for the PBS sample after 7 days. IPN reduced this drop of viability by protecting the cells from the lack of nutrients for all time points, by being significantly higher for all IPN compared to PBS. After 1 week of media deprivation, 35-45% of hRGCs were still viable. This result was unexpected due to the relative fragility of hRGC, and further suggested that these IPNs are excellent candidates for enhancing the ability of encapsulated cells to regenerate the retina.

To determine the distribution of cells throughout hydrogels, the intensity of live (CalceinAM-FITC) and dead (Ethidium Bromide-APC) cells was averaged, normalized, and measured in function of all directions (x,y,z). Directions were averaged into 150 μm and compared to a sample of cells in media on a flat slide (FIG. 2C). The flat microscope slide showed a peak in intensity around its zero positions with a quickly decaying intensity when distancing from the slide, while all hydrogel samples showed a constant intensity in all directions. This suggested a uniform distribution of both live and dead cells inside and/or within IPN, which is critical for the release of cells at the injection site. Due to the enzymatic and surface degradation of the in-situ cross-linking hydrogels, a uniform distribution of encapsulated cells signified a constant release concentration of cells on the retina.

Figure 3B:
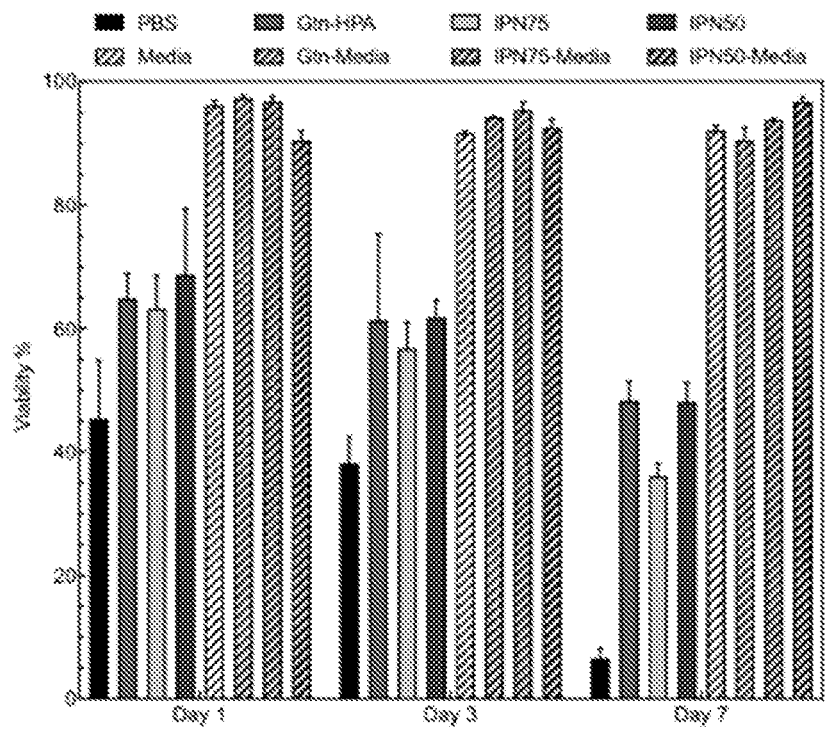
FIG. 3B shows long term in vitro viability of example IPN hydrogels with (IPN50 and IPN75) or without the addition of media (IPN50-Media and IPN75-Media) over the course of 1, 3, and 7 days. The long-term in vitro viability of cells encapsulated in control hydrogels with (Gtn-HPA) or without the addition of media (Gtn-Media) is also shown.
Figure 3C:
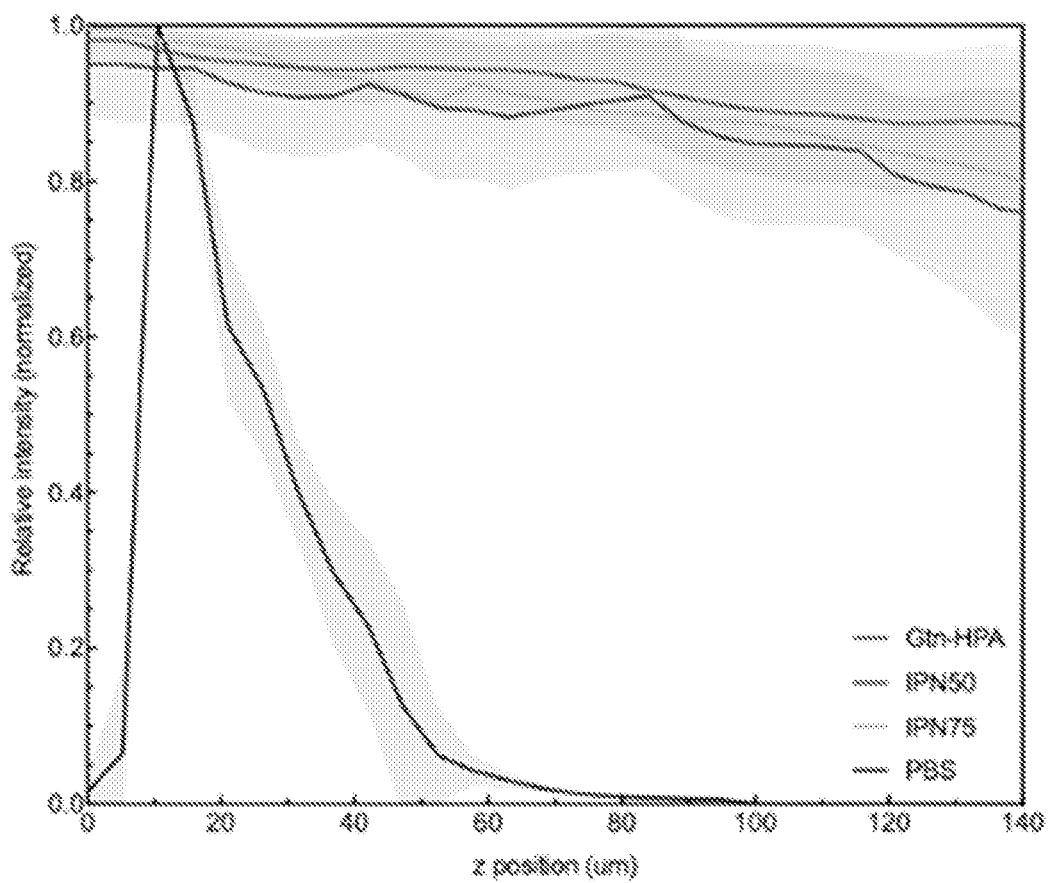
FIG. 3C shows the distribution of cells throughout the example IPN hydrogels (IPN50 and IPN75) and control hydrogels (Gtn-HPA) based on the normalized, relative intensity of live (CalceinAM-FITC) and dead (Ethidium Bromide-APC) cells.
Figure 3D:
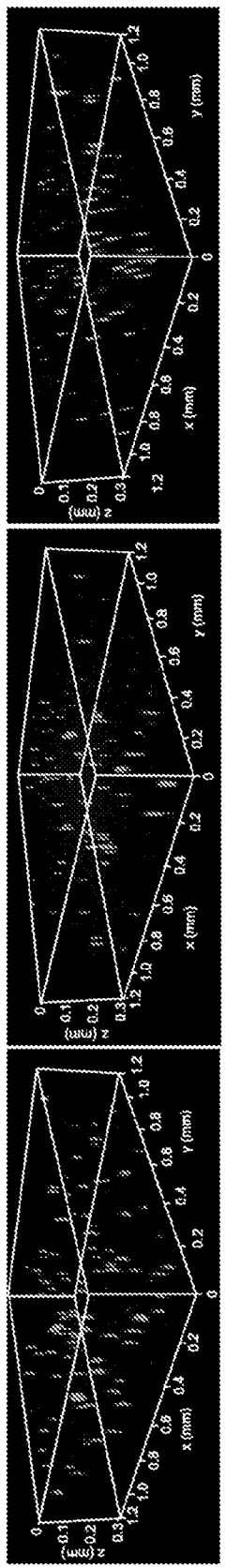
FIG. 3D shows confocal microscopy images of the encapsulated cells (after live and dead staining) throughout 300 micrometer (μm) sections of example IPN and control hydrogels.

The size, compactness, and distribution of hRGC (after live and dead staining) was visualized via confocal microscopy throughout 300 μm sections of gels (FIG. 3D). Image processing algorithms (FIGS. 11 and 12A-12B) permitted the quantification of live cells size and compactness in all samples. No difference was noted between time points; however, cell size was measured to be significantly larger for cells encapsulated in gel compared to media and PBS while their compactness was smaller (FIG. 12A-12B). This finding suggested that hydrogels may enable cell differentiation and processes formation, which could not be seen in media samples.

Figure 13A:
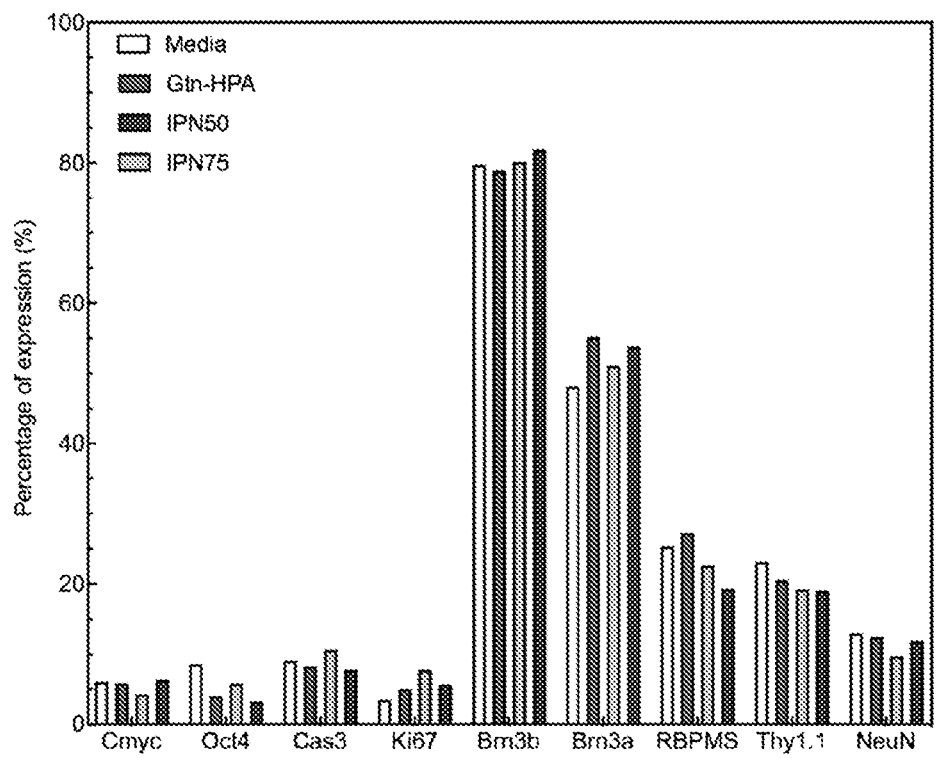
FIG. 13A shows the percentage of expression of retinal ganglion cells (Brn3b, Brn3a, RBPMS and Thy1.1), neuronal markers (NeuN), apoptosis (Cas3), proliferation (Ki67), and stemness (Cmyc and Oct4) as measured by flow cytometry.
Figure 13B:
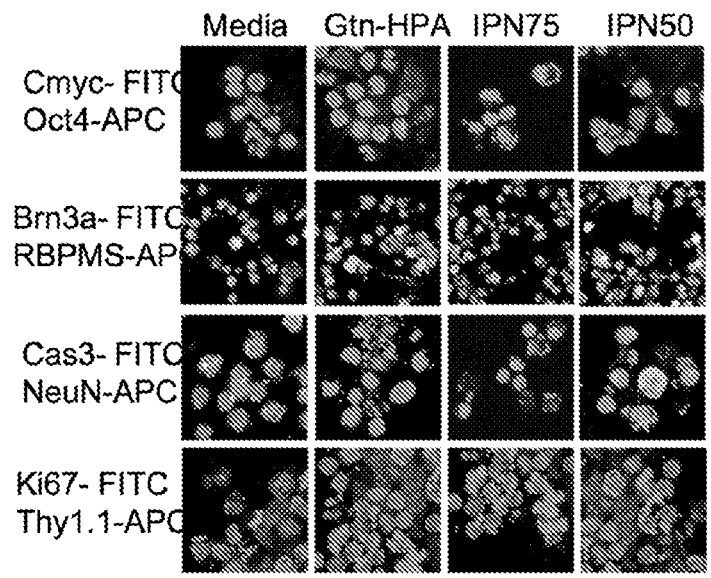
FIG. 13B shows immunohistochemistry images showing expression of retinal ganglion cells (Brn3a, RBPMS, and Thy1.1), neuronal markers (NeuN), apoptosis (Cas3), proliferation (Ki67), and stemness (Cmyc and Oct4).

Cell phenotype was checked by flow cytometry and immunohistochemistry after 7 days of culture in 2D (media) or 3D (gels with media) environment. Phenotype results, as seen in FIGS. 13A-13B, were coherent with previous studies and no significant difference was found in terms of retinal ganglion cells, neuronal, proliferation, apoptosis, or stemness markers between groups. Immunohistochemistry staining (FIG. 13B) and phenotype assay results suggested that gels can maintain cell phenotype in vitro. These results advocated for the use of IPN50, IPN75, and Gtn-HPA for in vivo transplantation and injection of hRGCs.

Example 3—In Vivo Attachment of IPN Hydrogels to the Retina

Materials and Methods—Data Analysis and Image Processing Algorithms
Confocal Microscopy and Cell Analysis Via Image Processing All stained samples (except H&E staining) were analyzed and images were taken using Leica SP8 confocal microscope. Images were taken with sequential scanning at 1024× 1024 or 2042×2042 resolution with the following lasers intensity and characteristics: VioBlue-PMT at 5.4% with line average of 3 and gain of 875 V, FITC-HyD at 2.3% with line average of 3 and gain of 77%, PE-HyD or APC-HyD at 3.7% with line average of 3 and gain of 85%.

hRGC viability images were taken at 20× magnification with a z-stack of 300 μm and 22 steps. A 3D projection was used for qualitative analysis while maximum projection was applied as quantification. Cells in 15 randomly selected, maximum-projected fields of view were counted under 20× objective lens magnification with a cell counting and an analyzing image processing algorithm. Cell numbers (green for live and red for dead), size (area of positive pixels), and compactness (difference in cell shape as compared to a disk) were measured for each field of view. After 1, 3, and 7 days of culture, the percentage of viable cells was calculated by dividing the number of live cells (FITC) by the total number of cells in the given area (live and dead cells added). The same z-stacks images were used to measure the distribution of the cells through the hydrogels. LASX Leica software enabled the measurement of the average intensity of a marker along each (x,y,z) direction. These intensities were measured for each z-stack, in each group after normalization, and averaged.

Qualitative immunofluorescence images of cells stained with various cell markers (e.g., RGC, stemness, neuronal, proliferation, apoptosis, immune cell markers, and Müller cell activation markers) were taken at 20× of 63× magnification using an oil immersion objective with a z-stack of 15 μm and 25 steps. Images, in 15 randomly selected fields of view after maximum projection, were used to quantify the surface coverage of specific markers (IBA1, GFAP, and CD45). To do so, a MATLAB algorithm was created that consisted in calculating and counting (with a tolerance of 0.01%) the number of colored pixels (Green for FITC channel and Red for phycoerythrin (PE) or allophycocyanin (APC) channels) for each marker. Then, a percentage of the total number of colored pixels as compared to the total number of pixels of the image was calculated; this percentage corresponded to the surface coverage of the specific marker.

Entire tiling of the retina was performed on all injected groups (Gtn-HPA, IPN75, IPN50 and PBS) at 63× with oil objective magnification and z-stack of 20 μm with 50 steps. The tiling square size was 25×10 fields of views, which was reduced by only choosing the field of views containing parts of the retina.

Finally, in order to be able to quantify the improvement of injected cells migration and engraftment into the retina of rats, STEM121-FITC with DAPI-Vioblue and TdTomato-PE staining were analyzed in a larger quantity than all other images. Images were taken at 63× magnification with a 15-μm z-stack and 22 steps. For each group, 60 fields of view, chosen in the center of the retina (where the injection was performed) were analyzed.

Hydrogels-Retina Interface and OCT Analysis Algorithms

Each slide, stained with H&E, was analyzed under brightfield light microscopy at 20× magnification to find the locations and size of the different hydrogels after three days. To quantify this measurement, 10 fields of view were used to look at the interface of retina and vitreous. Interfaces were analyzed as follow: where hydrogel was visible (attached or not to the retina), the interface was split into 200 μm parts (usually 2-3 per image); the interface of each part was then characterized by looking at the region of attachment (red regions in FIG. 14) and the others (white regions in FIG. 14). Afterwards, the percentage of attachment for each interface (proportion of red regions compared to white regions), and the distribution of the gel at the interface (holes in the red regions) were calculated using a MATLAB algorithm. The algorithm calculated and measured the attachment of the different hydrogels to the retina after three days.

Figure 4A:
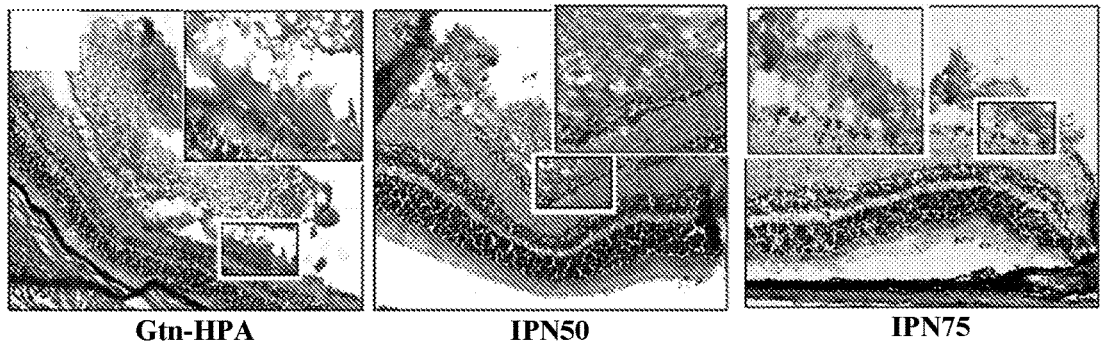
FIG. 4A shows histological images of hematoxylin and eosin (H&E) staining of vitreous and retina samples of Long Evans rats imaged 3 days after being injected with example IPN50, IPN75, and Gtn-HPA hydrogels (encapsulating no cells) into the vitreous.
Figure 4B:
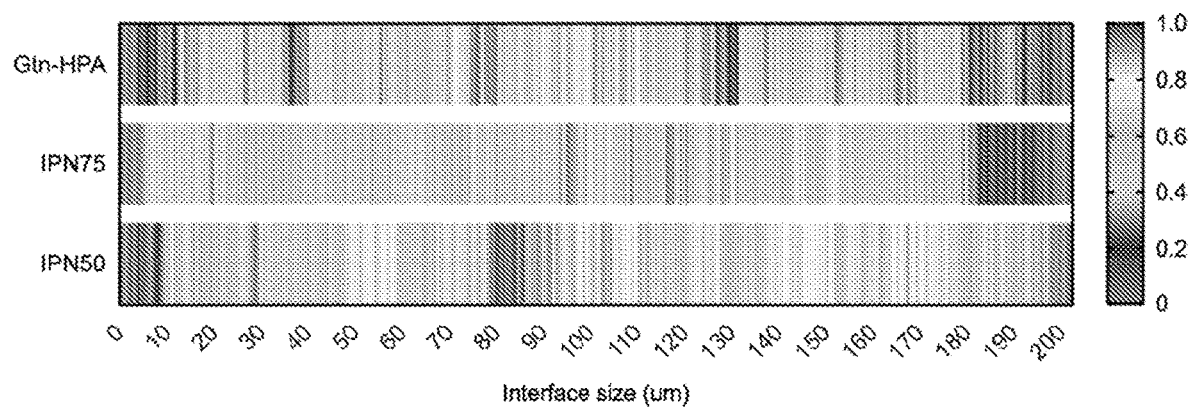
FIG. 4B shows the quantification of interfaces between example IPN hydrogels and the retina of the samples imaged in FIG. 4A.
Figure 4C:
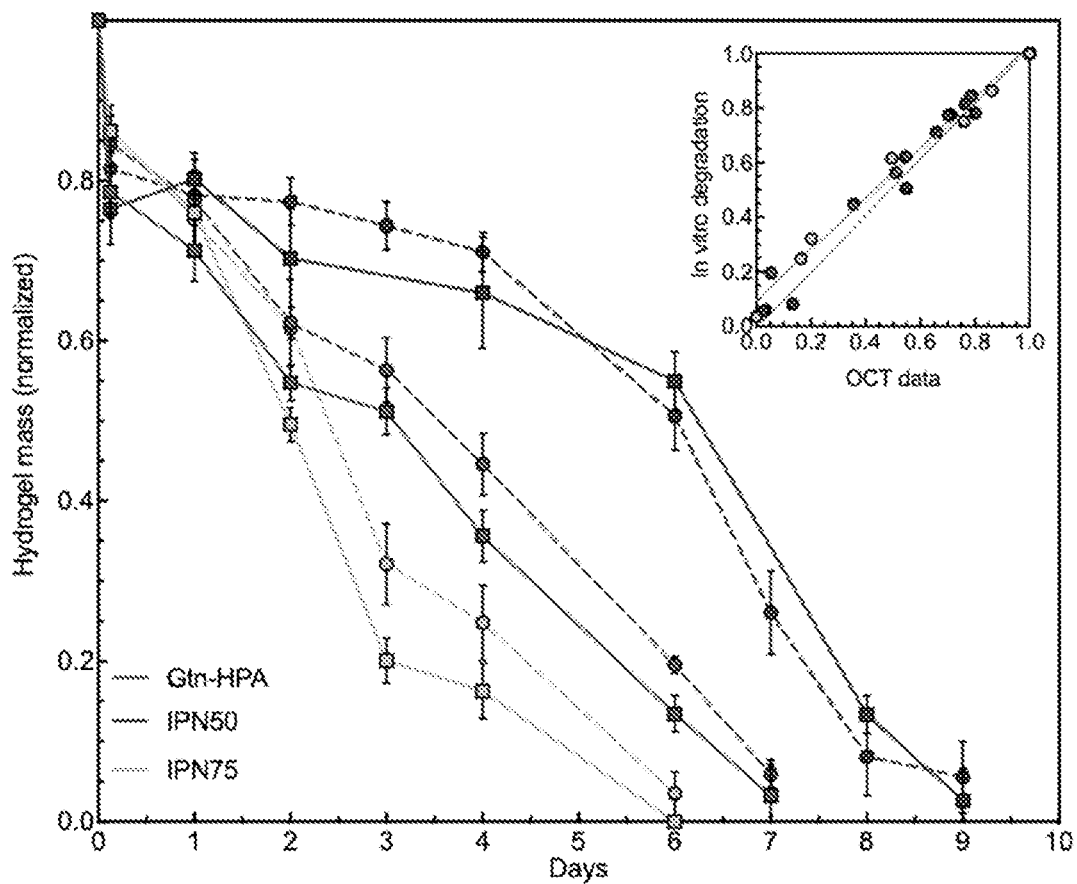
FIG. 4C shows the enzymatically degraded mass of example IPN hydrogels (IPN50 and IPN75) and control hydrogel (Gtn-HPA) in vitro over time and the in vitro degradation of example IPN hydrogels as a function of the Spectral Domain Optical Coherence Tomography (SD-OCT) data.

Islands of gels were visible during SD-OCT data acquisition and a quantification of gel presence was performed by applying an image processing thresholding algorithm. This algorithm was based on Otsu's method of thresholding and enables a specific quantification of the gel degradation in vivo. After taking the OCT images of the section of the retina, 10 fields of views were analyzed for each group. In order to apply and use Otsu's method, the retina and the noise were processed to be considered as the background while the gels were processed to be considered as the foreground. Most of the noise was deleted by the plugin in the SD-OCT software, hence the rest of the image was just composed of a bright retina (curved with different layers) and islands of gel on top of it). In order to process the retina as background, different values of the presence of the retina with no injections were calculated: this consists in counting the number of foreground pixels found with Otsu's algorithm in OCT images without injection. These values were used as a normalization in order to find the surplus of foreground pixels where gel was present. This quantification was performed for all groups at all time points and an in vivo degradation curve (which was confirmed with in vitro degradation) was calculated (FIG. 4C).

Image Processing Algorithms for Detection of Cell Migration, Co-Localization and Orientation Compare to Retinal Layers The improvement in engraftment of hRGCs by the IPN hydrogels was quantified by measuring cell migration (e.g., location in retinal layers after 1 month), co-localization (e.g., expressing both Brn3b intrinsically and STEM121 human markers), and, for large cells, orientation (e.g., angle formed by extended processes and retina). After using a Leica SP8 confocal microscope to image the test groups (60 fields of view per group), as explained earlier, colored images (VioBlue for DAPI, FITC for STEM121 and PE for TdTomato) were analyzed.

To segment cells from images, a two-step algorithm was designed. First, pixel intensities of input images were normalized from 0 to 1. Due to the large amount of noise in the image, the segmentation pipeline was started with a small amount of gaussian blur to smooth the image. Part of the cells were very dim; therefore, to segment them, a first low threshold (around 10% of intensity) was used to segment cells. To remediate cells which displayed small holes, a closing morphological operation (consisting of a dilation followed by an erosion) was incorporated. An opening (an erosion followed by a dilation) was run to remove small clusters of pixels that were most likely noise. For large cells, the low threshold followed by morphological operation led to a high recall for cell pixels. The brightest part of cells was segmented using a second larger threshold (about 0.3). To merge those two segmentations, a fusion algorithm was designed. Using the rough segmentation obtained from the first threshold, a connected component algorithm was employed to label each independent group of segmented pixels. A group was defined as independent if it was not in contact with another group of segmented pixels. Then, each labeled group of segmented pixels, which did not contain pixels from the high threshold segmentation, was eliminated. The final result had a high precision (due to the high threshold) and a high recall (due to the low threshold). Labeled groups of segmented pixels were used to compute the area of segmented cells.

All images were manually annotated using an online annotation tool (Makesense.ai). This enabled the localization of each layer of the retina and therefore, by fitting labelled groups, the migration of injected cells and their location in the retina. The orientation of both retinal layers and cells was measured by fitting each group with the smallest enclosing ellipse.

To make sure that STEM121 human staining and intrinsic Brn3b expression were colocalized in regions of interest (cells), a co-localization algorithm was used. Using MATLAB as a basis, the co-localization program can analyze the content of images taken with confocal microscopy. First, regions of interest in images taken previously (cells in RGC layer) were cropped and transformed into DIP images. Following this, images were filtered, selected based on a threshold, and analyzed with the co-localization, Pearson's, and Mader's algorithms. Co-localization consists in finding the fraction of pixels which possess a high intensity in both colors (green and red, in this study) with linear approximation. The p-value, Pearson coefficient, Mader's coefficient, and a co-localization number were then calculated and reported.

Statistical Analysis

All experiments were performed with n=10-15 (except image processing for cell location and migration which had n=60 for each group). The power calculation was based on detecting as significant a difference in the means between groups of 30-40% with a standard deviation of 15% and α=0.05 and β=0.20. Values were expressed as mean+/− standard error mean (SEM) using GraphPad software. Analysis of variance (one-way and two-way ANOVA) followed by Tukey's and Student's t-test were performed for statistical analysis. Statistical significance was set at p<0.01.

Results

Due to the viscous nature of the vitreous, vitreal injections of retinal stem cells or drugs pose some problems: how to control their location and release onto the retina? To investigate whether the IPN hydrogels of the disclosure can answer this question IPN50, IPN75 and Gtn-HPA hydrogels (with no cells) were injected into the vitreous of Long Evans rats. The daily morphology of their vitreous and retina was checked daily with SD-OCT, and, after 3 days, these retinal samples were histologically stained with H&E and imaged (FIG. 4A). Histology images show the presence of islands of hydrogels in the vitreous and attachment of the hydrogels to the inner limiting membrane (ILM) of the retina. By encapsulating cells into these biomaterials, a controlled and constant release of cells was performed right onto the first layer of the retina. H&E staining suggested qualitatively that the stiffer the IPN gel (e.g., IPN50) the greater attachment of the hydrogel to the retina is achieved. That is, the study results qualitatively indicated that stiffer IPN hydrogels degraded more slowly and had less "holes" (i.e., degraded portions of the hydrogel) at the retinal interface.

Figure 14:
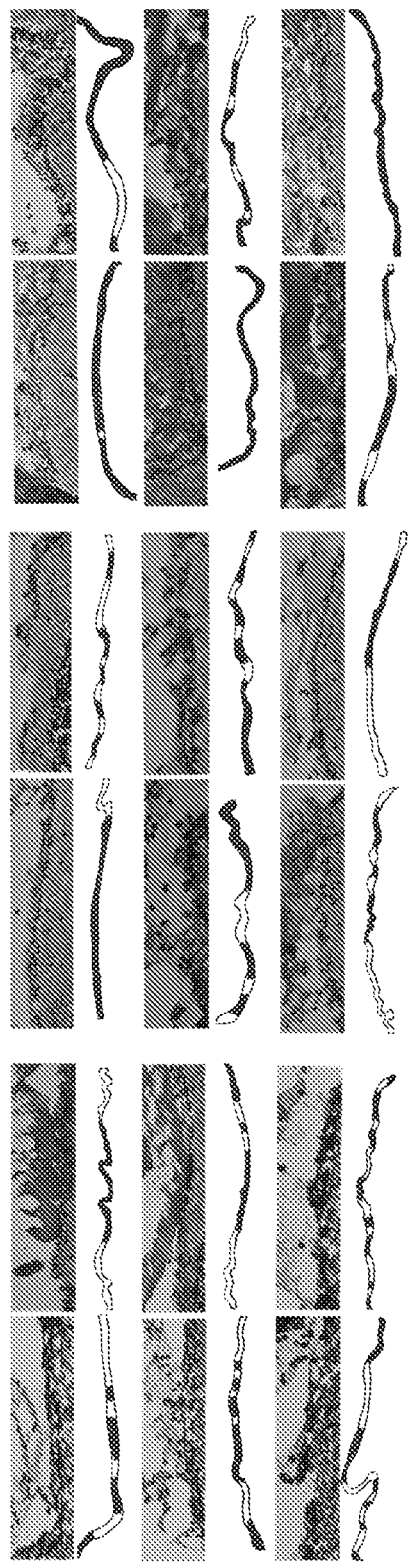
FIG. 14 shows histological images of H&E staining of retina samples of Long Evans rats imaged 3 days after being injected with example IPN50, IPN75, and Gtn-HPA hydrogels (encapsulating no cells) into the vitreous and quantification of contact of example hydrogels to the retina.

To quantify this finding, the interfaces between IPN hydrogels and the retina were analyzed (see FIG. 14). The results showed an average percent of attachment increasing with stiffness; 50% attachment of Gtn-HPA hydrogels to the retinal surface, 59% attachment of IPN75 hydrogels to the retinal surface, and 79% attachment of IPN50 hydrogels to the retinal surface. The actual distribution of attachment was measured for n=10 and normalized per 200 µm portions, which gives a sense of "holes" present at the interface and therefore, the aptitude of each IPN hydrogel to attach to the ILM. As seen in FIG. 4B, IPN50 hydrogel possessed the highest attachment with the lowest number of "holes" (shown as dark bands), while the distribution of Gtn-HPA hydrogel was uneven with numerous "holes" throughout the interface. Of note is that the average interface length was 10 µm smaller for IPN75 and Gtn-HPA hydrogels as compared to IPN50 hydrogels.

Finally, SD-OCT data (FIG. 15) were analyzed to measure an approximation of the amount of hydrogel present in the vitreous (or on top of the retina) as a function of time (see Example 3; section titled "Hydrogels-retina interface and OCT analysis algorithms") and was compared with an in vitro degradation assay of IPN hydrogels by collagenase and hyaluronidase (degrading enzymes commonly known to be present in the eye). As seen in FIG. 4C, all IPN hydrogels degrade within 6-10 days. Results showed the longest degradation time, after 9-10 days, corresponded to IPN50 hydrogels. In vitro degradation showed a comparable result (see inset of FIG. 4C, which showed an average $R^2$ value of 0.97). These results confirmed the presence of enzymes at corresponding concentrations used (Example 1; section titled "In vitro degradation assays for IPNs"). A curious trend is shown for IPN75 hydrogels, which degraded faster than Gtn-HPA hydrogels despite being stiffer. This phenomenon can be explained by the presence of both hyaluronidase and collagenase in the vitreous. Indeed, IPN75 hydrogels, which include 75% of Gtn-HPA and 25% of HA-Tyr can be simultaneously affected by both enzymes. On the other hand, homo-polymeric Gtn-HPA hydrogels are degraded by collagenase only (as was previously shown in the in vitro degradation study). Of note, the SD-OCT images and analysis of the retina before injection and after total degradation of IPN hydrogels (7 days for Gtn-HPA, 6 days for IPN75, and 9 days for IPN50) showed no detachment nor injury to the retina. This finding suggested that no harm was enforced onto the retina during the injection of the hydrogels, which was later confirmed with immune and Müller cell activation immunohistochemistry cell staining study.

Being able to attach a hydrogel that crosslinks in situ to the back of the eye (e.g., to the ILM) can enhance not only stem cell therapies.

Example 4—In Vivo Vitreal Injection of Encapsulated hRGC in IPN

Figure 5A:
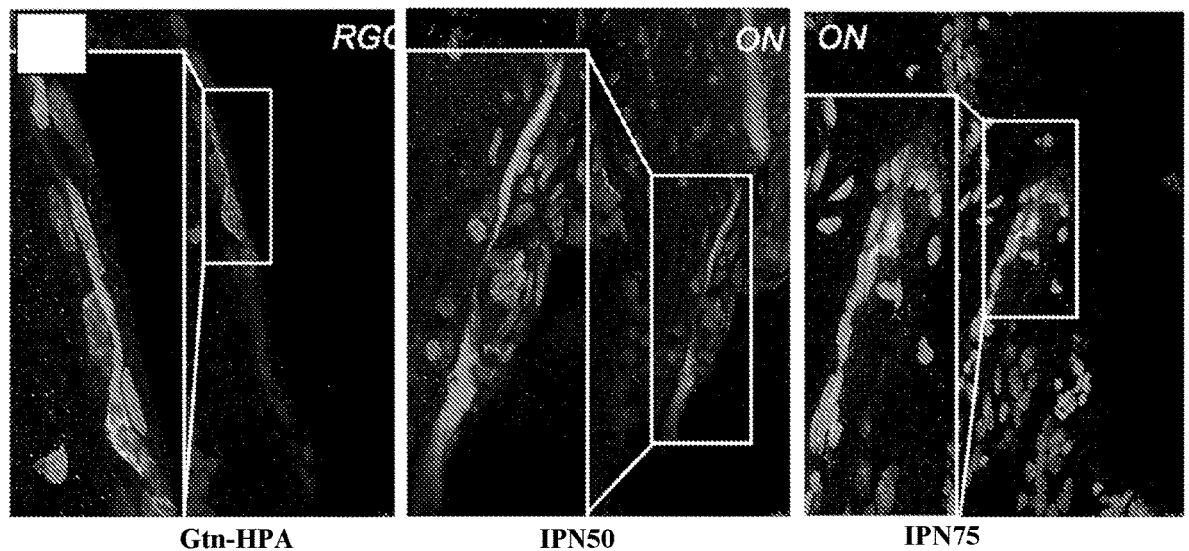
FIG. 5A shows immunohistochemistry images highlighting the difference in cell morphology of cells stained for identification of STEM121 (human marker in green) and encapsulated within example IPN hydrogels after 1 month of being injected into the vitreous of rats.

In vivo experimental studies demonstrated that IPN hydrogels including Gtn-HPA and HA-Tyr may enhance engraftment, extension of encapsulated hRGC processes, and retinal regeneration. 50,000 hRGC encapsulated in 3 µl of Gtn-HPA, IPN75, IPN50 hydrogels, and in PBS were injected into the vitreous of immunosuppressed Long Evans rats. Viability of cells was checked through the experiment and ranged from about 91% at the start of the experiment to about 87% after 4 h. A long-term study lasting 1 month was performed to measure the impact of IPN hydrogels on cell engraftment and STEM121 (human marker shown in green on the immunohistochemistry images) was used to stain the injected cells. By tiling multiple images of the entire retina (FIGS. 16A-16B), the presence of cells one month after the injection in the center of the retina was shown. The cells were located next to the base of the optic nerve for all groups (IPNs and PBS) while analyzed sections showed their location: mainly in RGC and INL layers of the retina for all groups. These findings suggested the success of injection in most animals. A major difference was observed (FIG. 5A) in terms of cell morphology between groups. Cells encapsulated in hydrogels were found to have high processes extended toward the optic nerve (i.e., long axons). IPN50 and IPN75 hydrogels also showed cells already at the base of the Optic Nerve (ON) and extending their axons inside the fibrous layers of the ON.

To quantify the results of the in vivo xenotransplantation, an image processing algorithm (FIG. 17A-17B) that enables for the localization (retinal layer), size, and orientation of a substantial number of injected cells (n=60 fields of view) was created. Most injected cells that achieved engraftment (about 40%), for all groups, were found in the RGC layer (FIG. 5B), while the rest of the injected cells were mainly in the inner nuclear layer (INL). No significant number of injected cells was found in the outer nuclear layer or vitreous (less than about 4%). Compared to the initial number of cells injected (50,000 cells), a total of about 52% for Gtn-HPA, about 53% for IPN75, about 56% for IPN50, and about 38% for PBS of cells were found viable and engrafted after one-month post-injection. A 2-fold decrease can be seen in FIG. 5B for the PBS group in the target layer (RGC) compared to hydrogels, while all other layers remained about the same. Furthermore, IPN50 hydrogels showed the tightest distribution of the number of cells in the target layer and was significantly higher than all other groups.

Figure 5B:
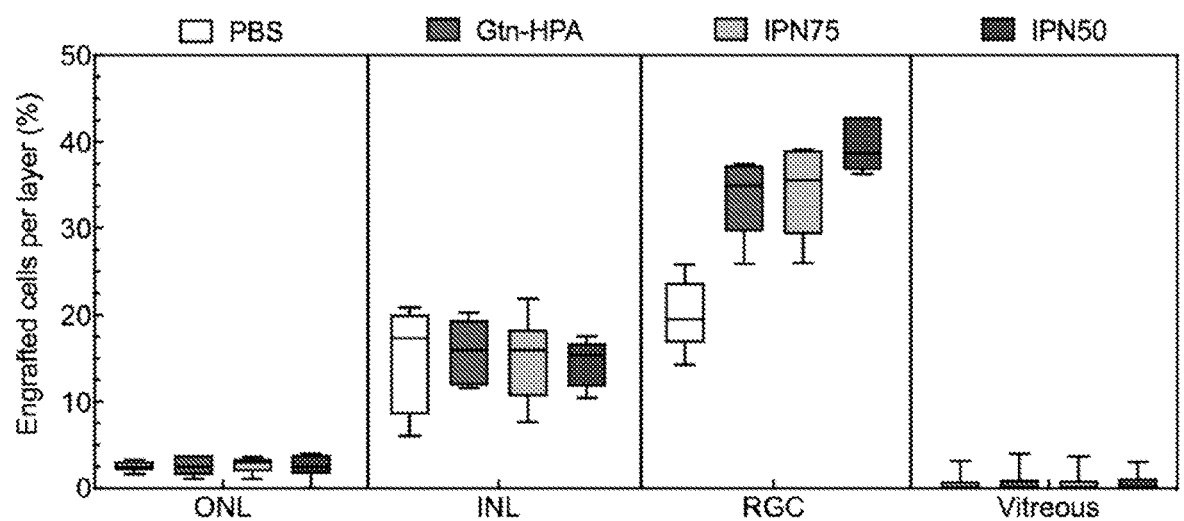
FIG. 5B shows localization data of cells encapsulated in control hydrogels (Gtn-HPA) and example IPN hydrogels (IPN50 and IPN75) in various retinal regions: outer nuclear layer (ONL), inner nuclear layer (INL), retinal ganglion cells (RGC), and vitreous.
Figure 5C:
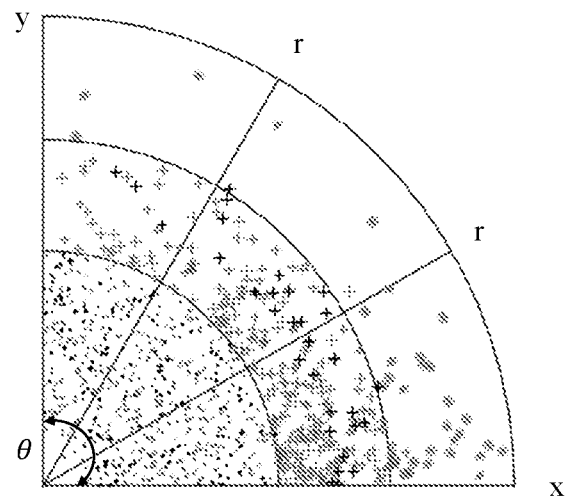
FIG. 5C shows the size (r) of the encapsulated cells localized in FIG. 5B presented in polar coordinates as a function of their relative orientation to the retina (0).
Figure 5D:
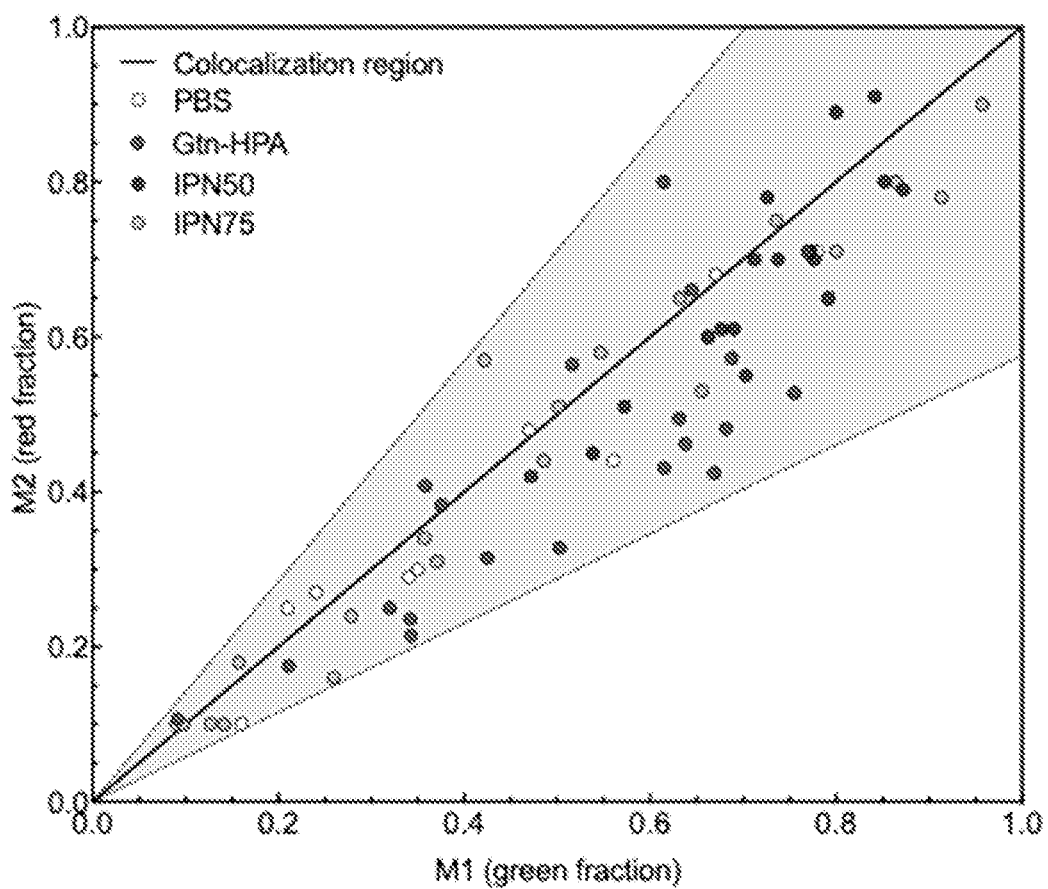
FIG. 5D shows the co-localization correlation coefficient, which measures the correlation between STEM121 human staining and intrinsic Brn3b expression of the encapsulated cells imaged in FIG. 5A.

The extension of processes in injected cells was a critical goal to induce retinal regeneration in retinal diseases, such as Type 1 neurofibromatosis optic pathway glioma (NF1-OPG). To demonstrate the enhancement procured by IPN hydrogels, cells found in the target layer (RGC) were analyzed by measuring their cell body size (not only stroma) and their orientation in the retina and comparing it to native RGC orientation, which is commonly known as being parallel to the retina's orientation. FIG. 5C shows, in polar coordinates, the size of these cells (as indicated by distance "r" extending from the origin) as a function of their relative orientation to the retina (as indicated by angle theta "0," defined as the angle measured between distance "r" and the x-axis). Cells were divided into three categories: undifferentiated round cells (r<30 µm), medium-size processes extension (30<r<150 µm) and long processes extension (r>150 µm). Most long cells were found in IPN50 and Gtn-HPA hydrogels and had their orientation close to 0 degrees, while no long cells were found in the PBS negative control group. The distribution of medium-size cells was centered around 0 degrees for all groups. Of note is that significantly more medium-size cells were found in IPN50 hydrogels compared to all other groups. Finally, the number of round and undifferentiated cells was uniformly distributed through size and orientation for all groups. To corroborate that the large extensions were indeed injected cells, and not artifacts, a co-localization algorithm was used, which measured the correlation between human STEM121 staining and intrinsic Brn3b expression (see Example 16 for more information). All events were found to have a co-localization correlation coefficient higher than 70% which corresponds to the grey area shown in FIG. 5D.

Figure 18A:
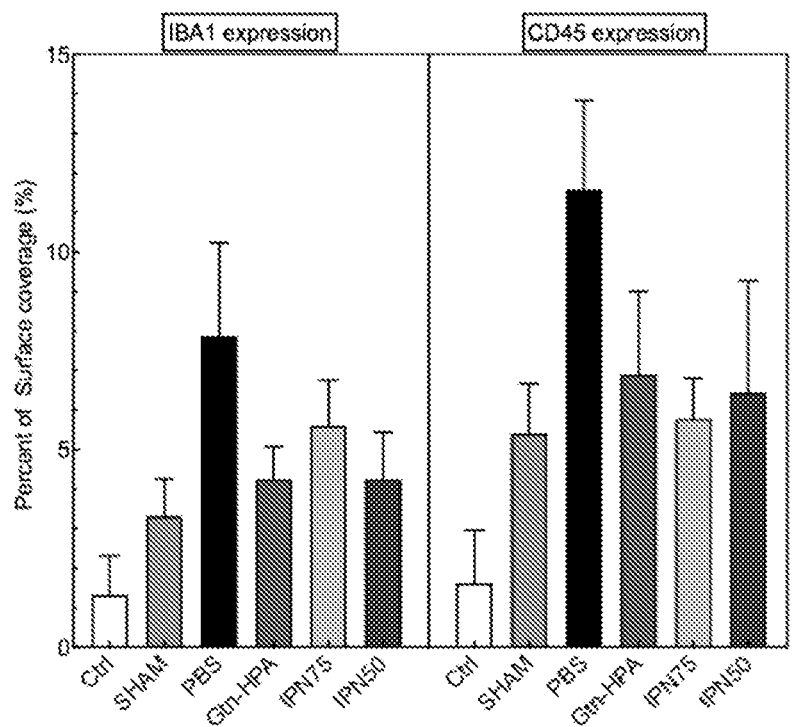
FIG. 18A shows the percentage of surface coverage of positive pixels for each immune cell marker (IBA1 and CD45) in immunohistochemistry images of eye samples that had received an injection of example hydrogels encapsulating cells.
Figure 18B:
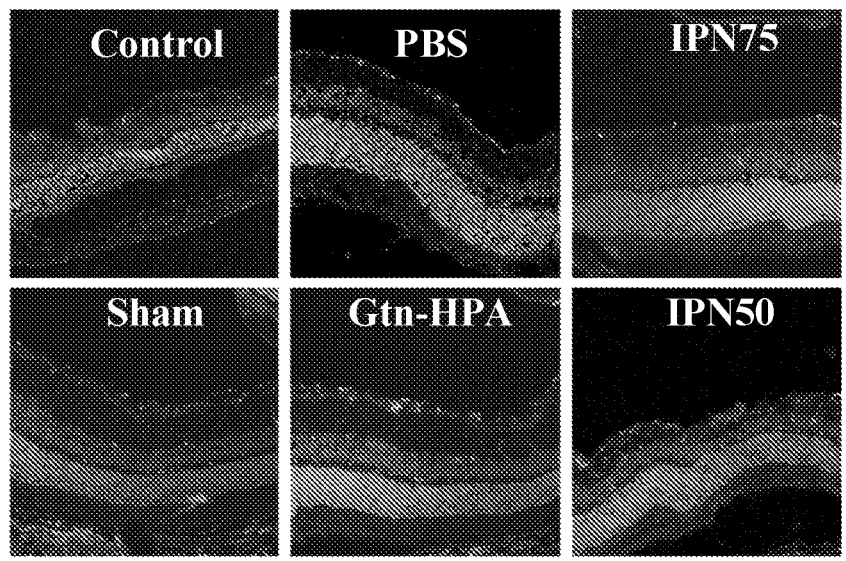
FIG. 18B shows immunohistochemistry images of the samples described in FIG. 18A.

Immune response and Müller cell activation assays were also performed by checking and analyzing the surface coverage of immune cells markers (IBA1 and CD45) and activated Müller cell marker (GFAP) for all groups (FIGS. 18A-18B). Immune response was found to be significantly higher for cells injected in PBS while the immune response to IPN-cells injection was similar to the sham condition. A similar trend was observed for GFAP expression suggesting a higher retinal disturbance with PBS injections.

Example 5—Chemical Structures and Broad Viability Testing

Figure 6A:
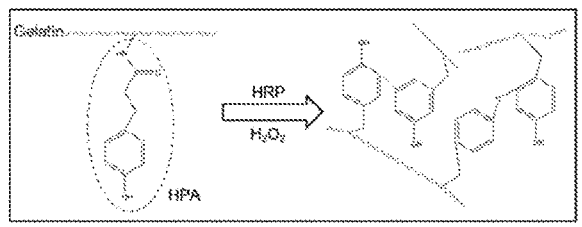
FIG. 6A is a schematic illustrating the chemical structure of Gtn-HPA.
Figure 6B:
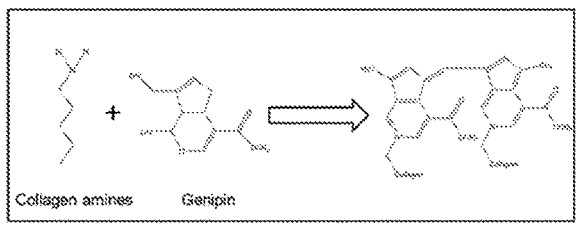
FIG. 6B is a schematic illustrating the chemical structure of HA-Tyr.
Figure 6C:
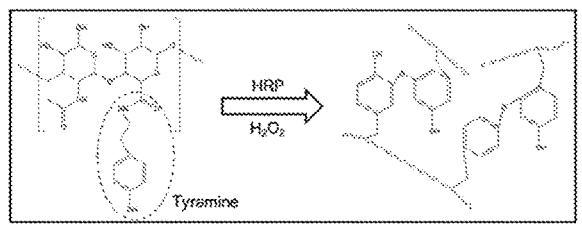
FIG. 6C is a schematic illustrating the chemical structure of genipin used as an example crosslinker.
Figure 6D:
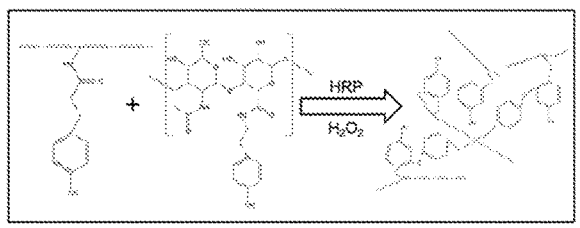
FIG. 6D is a schematic illustrating the chemical structure of the interpenetrating polymer network (IPN) formed by the mixture of Gtn-HPA and HA-Tyr catalyzed by horseradish peroxidase (HRP) and crosslinked by hydrogen peroxide ($H_2O_2$).

Chemical structures of all materials (polymer and hydrogels), used in the first viability assay to find potential candidates for the enhancement of retinal regeneration, are shown in FIGS. 6A-6D. Gtn-HPA (FIG. 6A) and HA-Tyr (FIG. 6Be) were used at the same 2% wt for all experiments and possessed the same chemical mechanism of crosslinking: first dissolved polymers are catalyzed with horseradish peroxidase (HRP) then crosslinking was started with hydrogen peroxide ($H_2O_2$). Stability of those two hydrogels was usually reached after 20 min at 37° C. Due to its high tunability, high molecular weight (around $1\times10^{\wedge}6$ Da) hyaluronic acid was also tested at various weight percentages. Dissolved polymer was mixed with cells at room temperature and physical crosslinking (chain entanglement) happened after a few minutes, creating a hydrogel. Given that the composition of the vitreous is partly collagen, a hydrogel made of 2% wt collagen crosslinked with different concentrations of genipin was used (FIG. 6C). Finally, the chemical structure of the interpenetrating network formed by the mixture of Gtn-HPA and HA-Tyr can be seen in FIG. 6D.

Figure 6E:
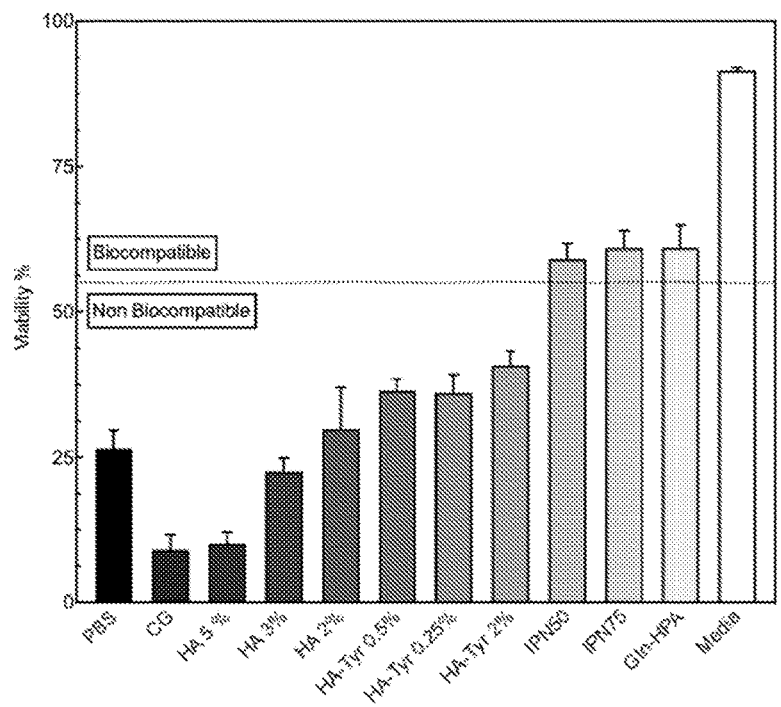
FIG. 6E shows the percentage of viable human retinal progenitor cells (hRGC) encapsulated in example hydrogels as measured using a live/dead assay. The graph shows negative control (PBS) having only 26.5% viable cells, and the positive control (Media) having 91.5% viability.

To test the biocompatibility of these hydrogels a short-term viability study was performed. This consisted in encapsulating human retinal progenitor cells (hRGC) in all potential candidates without media and leaving the samples for 2 days in incubators. A live and dead assay was then performed and the number of live and dead cells (hence viability percentage) was measured for each sample and compared to cells in 2D culture with (media) and without (phosphate buffer saline: PBS) nutrients. FIG. 6E summarized this viability data with the negative control being PBS with only 26.5% viable cells and the positive control being media with 91.5% viability (being significantly higher than all candidates deprived from nutrients). A threshold of 55% viability was applied to consider any sample biocompatible. Collagen-Genipin (CG) hydrogel samples (averaged for all Genipin concentrations) showed the lowest viability of all, due to the fragility of retinal cells and the relatively high cytotoxicity of Genipin needed to produce a stable hydrogel. Due to its high molecular weight and high stiffness, HA alone showed really low viability after 2 days, even lower than PBS. By reducing the percent of HA and using the chemical induced crosslinking with HA-Tyr and $H_2O_2$ viability reached 37-39%. By mixing HA-Tyr and Gtn-HPA at different quantities (IPN50 having 50% of each HA-Tyr and Gtn-HPA and IPN75 having 75% of Gtn-HPA and 25% of HA-Tyr), viability was higher than the desired values: reaching respectively 59% and 61%. Finally, Gtn-HPA alone showed the highest viability result, being the most biocompatible polymer, with 61.2%. There was no statistical difference measured between the three highest candidates (IPN50, IPN75 and Gtn-HPA), however they were significantly higher than all other hydrogels and PBS. The hydrogel candidates showing high biocompatibility within a first short-term viability test were Gtn-HPA and interpenetrating networks made of various content of Gtn-HPA and HA-Tyr.

Example 6—Fourier Transform Infrared Spectroscopy Data

Figure 7A:
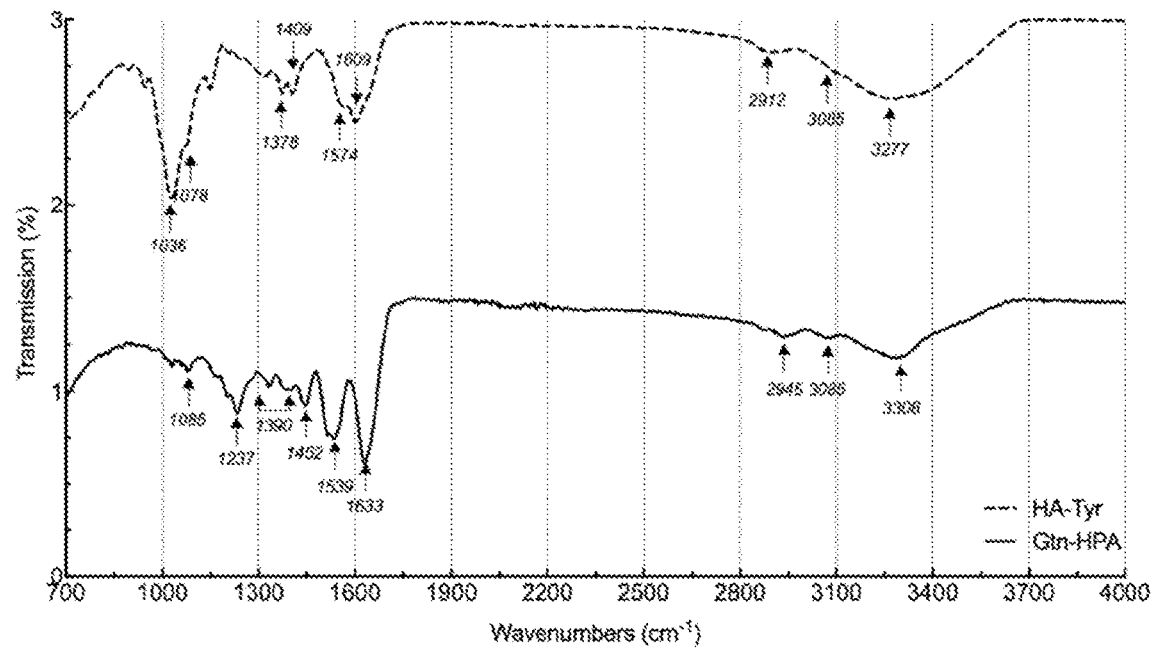
FIG. 7A shows the Fourier transform infrared spectroscopy (FTIR) spectrum of Gtn-HPA and HA-Tyr in a non-crosslinked state.

Proving the formation of either a hybrid interpenetrating network (IPN) or random copolymer network was critical in terms of in vivo degradation kinetics and cell encapsulation. FIG. 2B shows the in vitro enzymatic degradation kinetics for both homo-polymeric networks Gtn-HPA and HA-Tyr and the IPN with different content of each polymer: ranging from 25% Gtn-HPA in IPN25 to 75% in IPN75. Enzymatic degradation by collagenase or hyaluronidase shows a percentage of mass loss being equal to the content of respectively Gtn-HPA or HA-Tyr in the IPN. This result suggested a strong crosslink selectivity producing a hybrid IPN hydrogel. To confirm these findings, Fourier transform infrared spectroscopy (FTIR) was performed on all samples. The FTIR spectrum of the Gtn-HPA and HA-Tyr non-crosslinked solid polymers are shown in FIG. 7A.

A number of bands around 1390 $cm^{-1}$ were attributed to the presence of type-I Gelatin, proving the provenance of the material. Hyaluronic acid was seen in the band at 1409 $cm^{-1}$, which can be attributed to the stretching of COO—, referring to the acid group in the HA molecule. The absorption band at 1036 $cm^{-1}$ can be attributed to the linkage stretching of C—OH and finally, the stretching region of the protonated group COOH was observed at 1078 $cm^{-1}$. The amide A band arising from N—H stretching was distributed at 3308 and 3277 $cm^{-1}$, C—H stretching at ~2945 and 2912 $cm^{-1}$ for the amide B, N—H deformation at 1539 and 1574 $cm^{-1}$ for the amide II respectively for Gtn-HPA and HA-Tyr. C═O stretching at 1609 $cm^{-1}$ for the amide I was observed in HA-Tyr while the amide III was seen at 1237 $cm^{-1}$ for Gtn-HPA. The presence of HPA side group was seen by the peaks at 1452, 1633 and 3085 cm-1 while Tyramine was visible at 1378 and 3085 $cm^{-1}$.

Figure 7B:
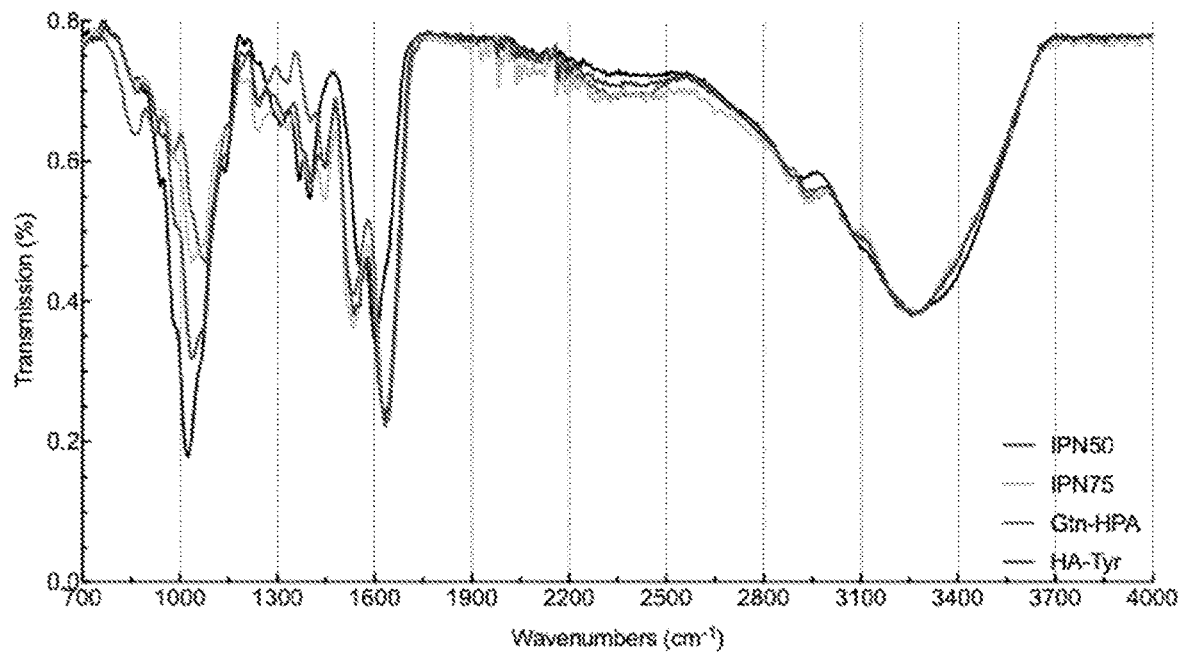
FIG. 7B shows the FTIR spectrum of example hydrogels.

To quantify crosslinking reactions between HPA and Tyramine groups in both homo-polymeric networks and IPN the FTIR spectra of gels was measured (FIG. 7B). Due to the high-water content in samples (2% wt), hydrogels were first dried and then analyzed post-dehydration. The appearance of a difference in transmission around 1000 $cm^{-1}$ indicated the stretching of COO— groups and therefore the presence of hyaluronic acid, which is shown to be increasing from IPN75 to IPN50 to HA-Tyr. Both side groups HPA and Tyramine had specific peaks respectively around 1600 and 1300 $cm^{-1}$ in the non-crosslinked polymers. In IPN and hydrogels, an increase in transmission percentage can be seen for the HPA peak while a decrease was observed for the Tyramine peak from HA-Tyr to Gtn-HPA. Gtn-HPA did not show any transmission around Tyramine peak but IPN transmission is relatively close to HA-Tyr. At HPA peak, HA-Tyr was significantly lower than all others while both IPN are close to Gtn-HPA. The similar transmission seen in homo-polymeric networks side groups and IPN suggested a strong selectivity in crosslinks and the formation of a hybrid IPN.

Example 7—Oscillatory Rheology, Compression and Passive Micro-Rheology Measurements Mechanical tunability of IPN was measured by oscillatory rheology and unconfined compression testing as explained in the main text. Hydrogen peroxide, being cytotoxic to cells at high concentrations, has been shown to create biocompatible hydrogels around 1 mM (see FIG. 10A). This hinted at the mechanical measurement of HA-Tyr, Gtn-HPA, and IPN at crosslinker concentrations equal or close to 1 mM as seen in FIG. 8A. Shear moduli (G') of both Gtn-HPA and HA-Tyr increased with crosslinker concentration ranging respectively from 160 and 1010 Pa at 0.7 mM of $H_2O_2$ to 910 and 1650 Pa at 1.3 mM. A similar trend was observed for the time to reach steady state. This high difference could critically control a specific stiffness tunability by controlling the amount of Gtn-HPA in the IPN.

A similar trend was observed on the Young's moduli, calculated from maximal 5% strain during unconfined compression (FIG. 8B). HA-Tyr showed a plastic behavior at low strain (4.5%) with a modulus of 6818 Pa while IPN50, IPN75, and Gtn-HPA stayed in the elastic domain with higher strain (8%).

Figure 2D:
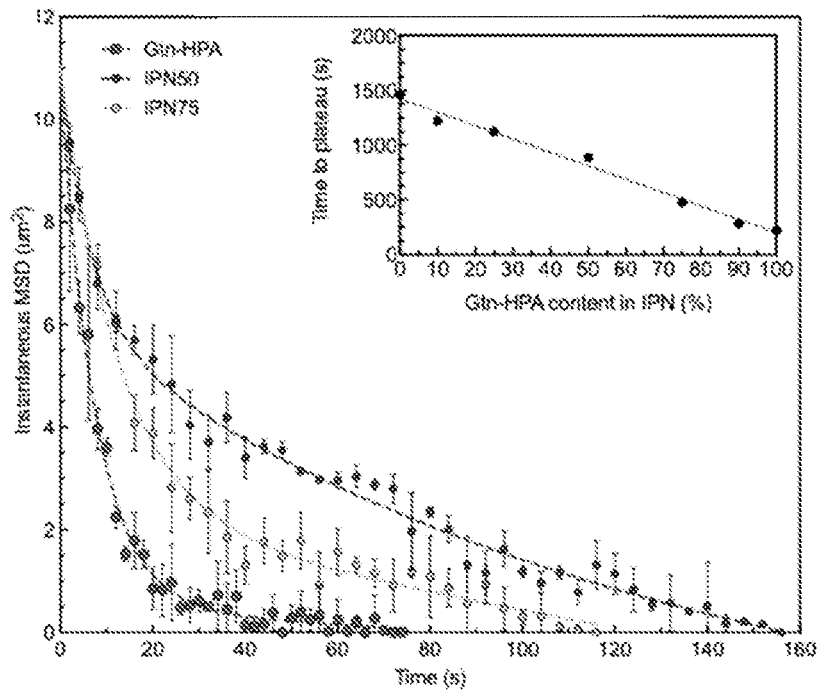
FIG. 2D shows the mean square displacement (MSD) of poly(lactic-co-glycolic acid) (PLGA) microbeads mixed with the example IPN hydrogels (IPN50 and IPN75) and control hydrogel (Gtn-HPA) and the "Time to Plateau" or the time to reach the gel point measured in seconds as a function of Gtn-HPA content.

In order to prove that gel point and stability of gels can be tuned by controlling the content of IPN, it was necessary to quantify the elastic nature of gels in the crosslinking process. To obtain this measurement, passive micro-rheology was used by preparing uncrosslinked IPN and homopolymer mixed with PLGA passive microbeads having a diameter ranging from about 10-20 μm. To characterize the viscoelastic nature of these gels, the passive particles were tracked for a period of approximately 2 minutes. A MATLAB program was then used to track the particles, calculate the instantaneous mean square displacement (MSD), and fit the data with a double exponential decay as seen in FIG. 2D. The MSD of n=15 particles was calculated and averaged every 2 s. This fit function was then used to calculate the average complex modulus (every 2 s) by feeding it into MATLAB. The data was fitted a second-order polynomial function from which the first and second time derivative and subsequently the complex modulus were computed. The storage modulus (elastic) G' and loss modulus (viscous) G" were then calculated and plotted in function of time post mixing (addition of crosslinker) as seen in FIG. 8C. G' and G" measurements confirmed the dependency of gel point on the Gtn-HPA content. Gel point ranged from 42 s for Gtn-HPA, being far too quick for surgical needs, to 162 s for IPN50 hydrogels. This was a crucial result as it confirmed the hypothesis that these biocompatible IPN can be tuned to fulfill surgical needs.

Figure 9A:
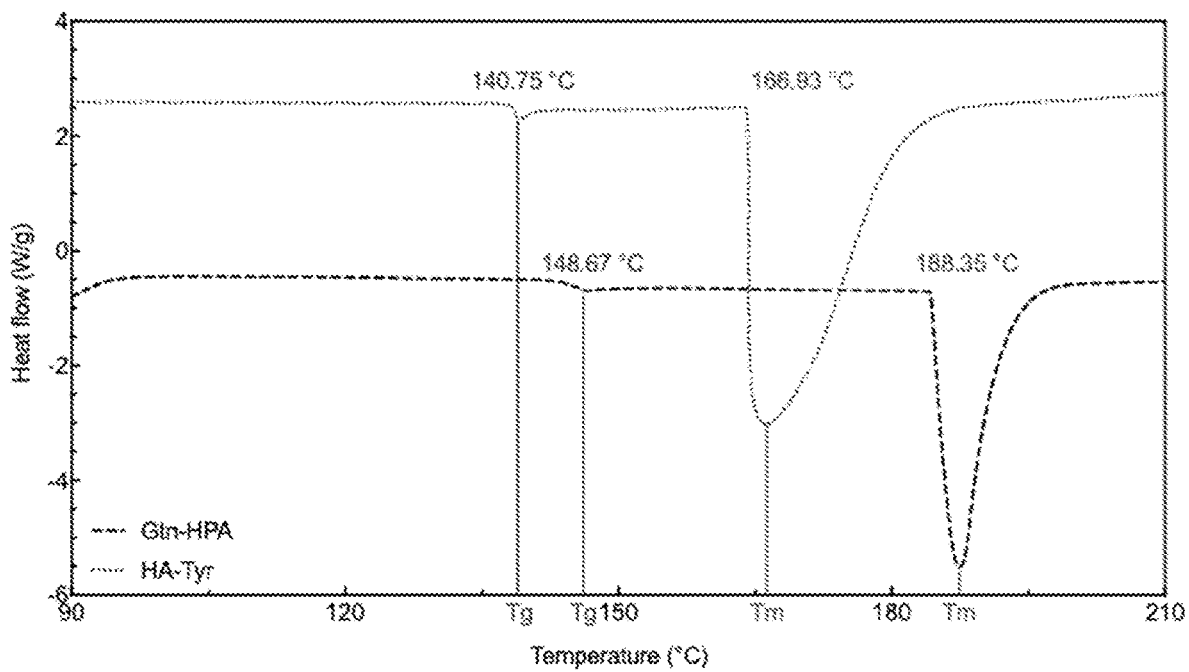
FIG. 9A shows glass transition temperatures (Tg) and melting temperatures (Tm) of Gtn-HPA and HA-Tyr (non-crosslinked) as measured by differential scanning calorimetry (DSC).
Figure 9B:
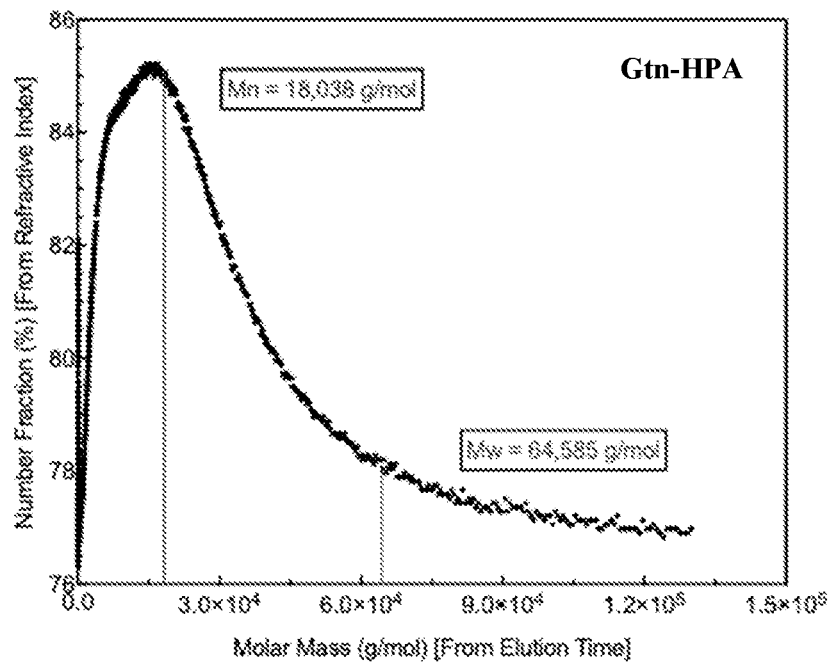
FIG. 9B shows number (Mn) and weight (Mw) averaged molecular weight of Gtn-HPA or HA-Tyr (non-crosslinked) as measured by gel permeation chromatography (GPC).
Figure 9C:
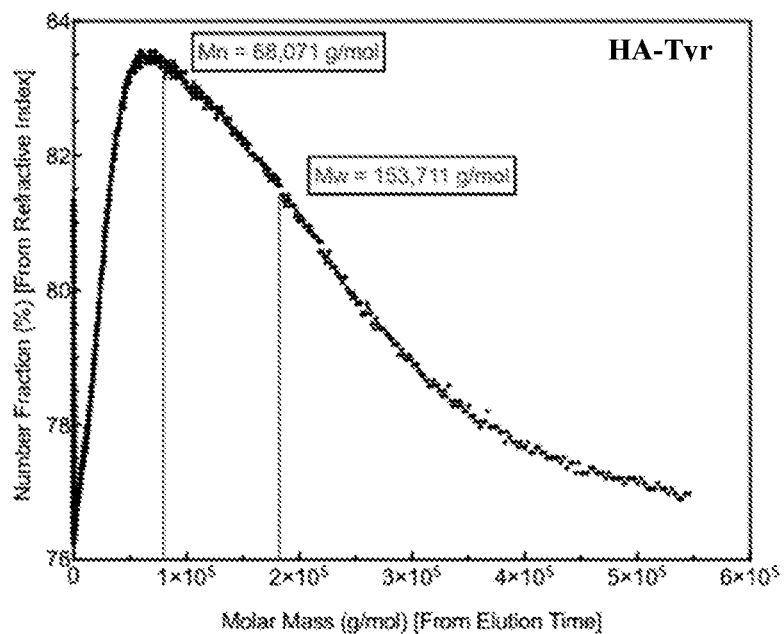
FIG. 9C shows number (Mn) and weight (Mw) averaged molecular weight of Gtn-HPA or HA-Tyr (non-crosslinked) as measured by gel permeation chromatography (GPC).

Example 8—Differential Scanning Calorimetry and Gel Permeation Chromatography Data Complete characterization of solid polymers (Gtn-HPA and HA-Tyr), hydrogels and IPN was performed, as seen in Table 2. Number (Mn) and weight (Mw) averaged molecular weight, glass transition temperature (Tg) and melting temperature (Tm) were measured with gel permeation chromatography (GPC) and differential scanning calorimetry (DSC), respectively. As seen in FIG. 9A, a clear glass transition and melting transition were observed. However, differing from usual DSC experiments, both samples were destroyed post-melting and could not be brought back to their initial shape. Molecular weights (FIGS. 9B-C) measured were fitted with a normalized gaussian curve showing higher molecular weight for HA-Tyr than Gtn-HPA. Some peaks were seen at really low weight (<5,000 g/mol) for both samples resulting from the presence of both HPA and Tyramine groups.

Example 9—Effect of $H_2O_2$ on Cell Viability and Intensity Measurement

The main goal, in creating a hydrogel that could be mechanically tuned to improve retinal regeneration, was to prove its biocompatibility by measuring cell viability after 5 days of culture in 3D scaffolds. Cells were encapsulated in hydrogels (deprived from nutrients) and, after 5 days, were analyzed to evaluate the efficiency of culture condition using a live-dead assay. The percentage of viable cells was calculated by dividing the number of live cells (green) by the total number of cells in the given area. Data of each group were calculated from 15 randomly chosen fields in each group.

Figure 10A:
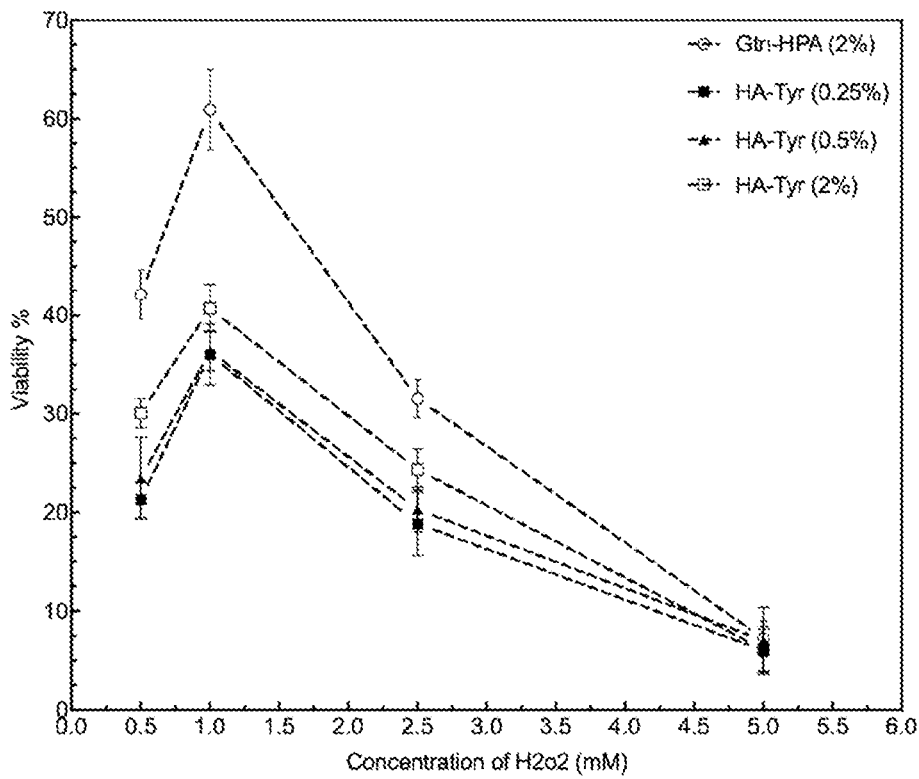
FIG. 10A shows the percentage of viable cells encapsulated in example hydrogels as a function of the concentration of hydrogen peroxide.

One of the most impactful stressors that affects cells encapsulated in Gtn-HPA and HA-Tyr is oxidative stress due to the presence of hydrogen peroxide as a crosslinker (commonly known to be cytotoxic to cells in high doses). A viability assay was performed on cells encapsulated in hydrogels with increasing concentration of $H_2O_2$ to find the optimal formulation for both homo-polymeric networks: this could then be transferred to IPN hydrogels. To accurately quantify the number of viable cells, immunohistochemistry was performed using calcein-AM and ethidium bromide as viability and DAPI as nuclear marker (FIG. 10A). For all samples (Gtn-HPA and HA-Tyr at different wt %) using $H_2O_2$ around 1 mM seemed to provide the highest biocompatible hydrogels with viability ranging from 35% in HA-Tyr at 0.5 wt % to 60% for Gtn-HPA at 2 wt %. Of note is that, for low concentration of $H_2O_2$ (<0.8 mM), almost no gel formation which is shown by a lower viability (similar to culture in PBS), was observed at 0.5 mM. Finally, hydrogen peroxide concentration was increased to 2.5 and 5 mM in order to look for its cytotoxic effect on cells. Oxidative stress was already really high at 2.5 mM with a viability ranging from 20% to 35% while being maximal at 5 mM where most cells died (only 5-8% viable). This broad testing of hydrogen peroxide effect on cell viability in both homo-polymeric networks suggested that a concentration around 1 mM should be used in order to make the most biocompatible hydrogel. As shown in FIG. 3A, a sharper testing for different IPNs content with crosslinker concentration ranging from 0.8 to 1.3 mM was performed. The optimal IPN was found to contain at least 30% of Gtn-HPA with a crosslinker concentration of 1 mM. The catalyst (HRP) concentration was optimized at 0.1 U/mL to enable encapsulated cells to thrive.

Figure 10B:
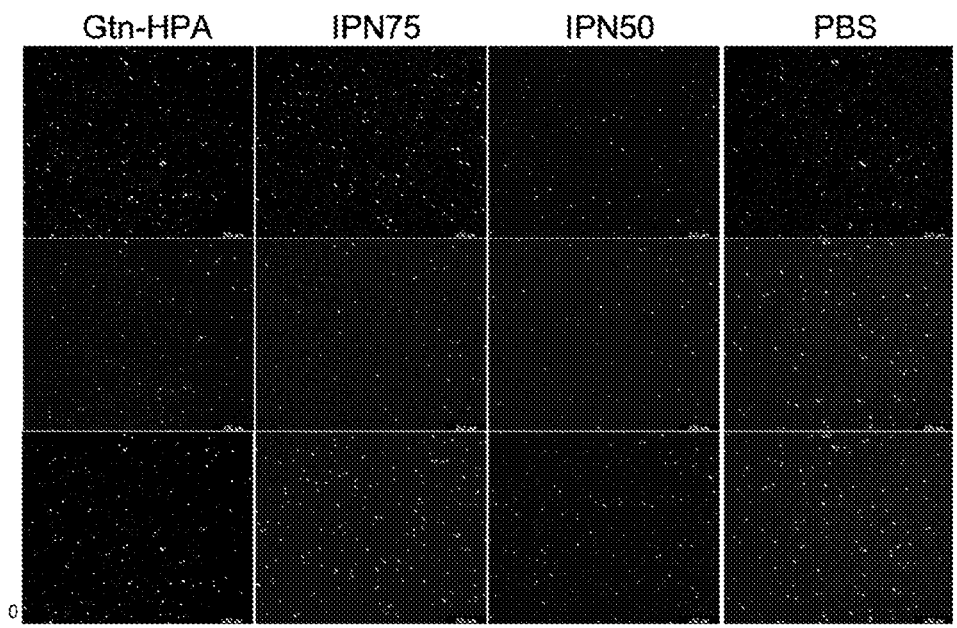
FIG. 10B shows immunohistochemistry images of cells encapsulated in example hydrogels and stained using calcein-AM and ethidium bromide as viability markers and using 4',6-diamidino-2-phenylindole (DAPI) as a nuclear marker.

Live and dead staining of cells encapsulated in IPNs and grown in PBS are presented in FIG. 10B. Images represent a maximal projection of 200 um z-stack for hydrogels samples which were seeded at the same concentration. Cells in 2D culture appeared more fibroblastic with a higher number of dead cells. In contrast, cells encapsulated in Gtn-HPA and IPNS looked to retain their phenotypic morphology. These results clearly demonstrated the effect of oxidative stress and protective nature of Gtn-HPA and IPNs for hRGC culture and possible transplantation.

Example 10—Analysis of Cell Size and Shape with Image Processing Algorithm

Counting and analyzing cell size and shape manually is a tedious error prone process. To be able to analyze a large data set from fluorescent confocal microscopy images a basic computer vision technique was used. This image processing algorithm enabled for cell segmentation from a black background image based on cell intensity and staining.

The method used basic morphological operations and the watershed algorithm to segment the cells and was implemented in MATLAB. This method was chosen for its simplicity and ease of implementation.

Figures 11A, 11B, 11C, 11D, 11E, 11F, 11G, 11H:
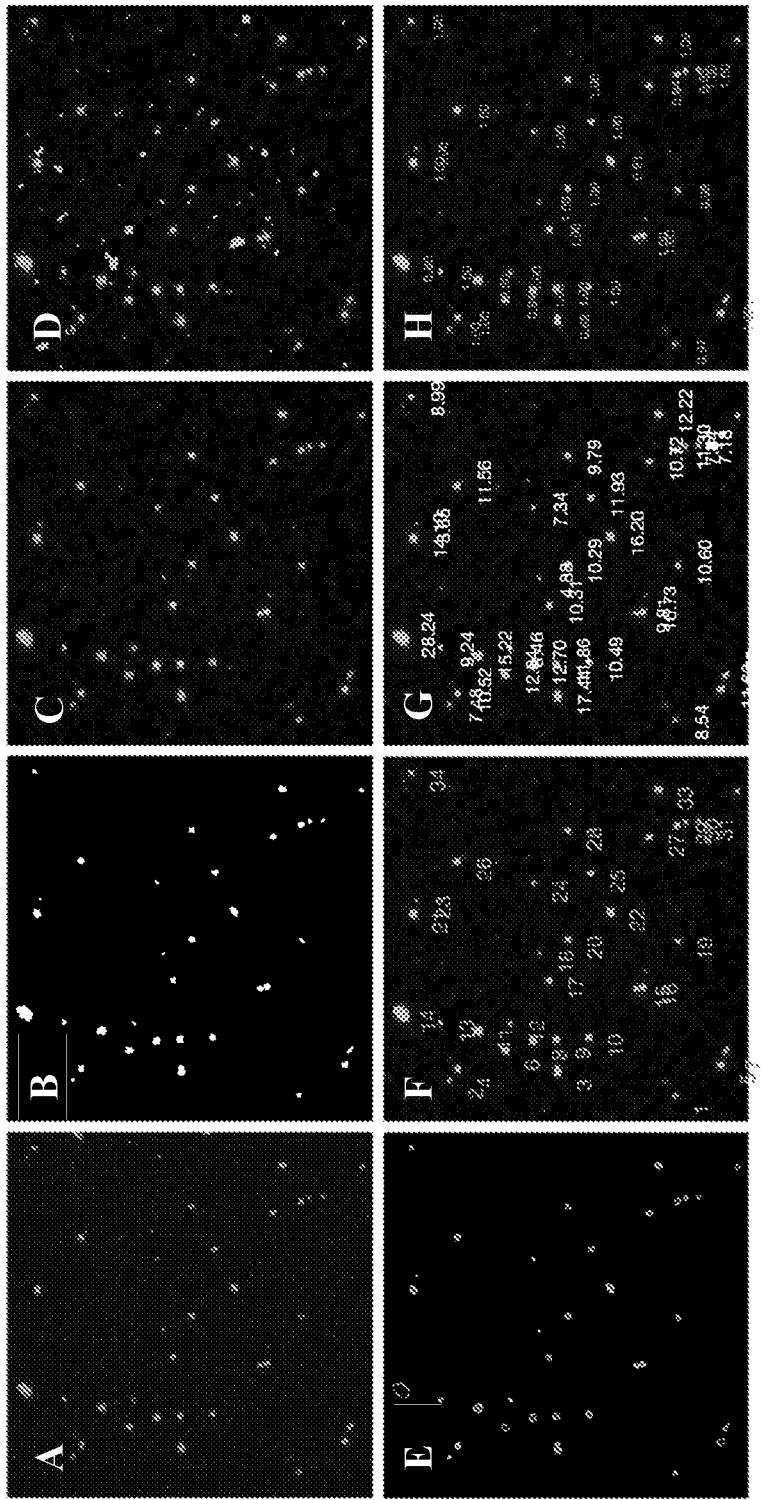
FIG. 11A shows a fluorescent microscopy image of human retinal ganglion cells (hRGC) stained using a Live/Dead assay.
FIG. 11B shows a fluorescent microscopy image of hRGC stained using a Live/Dead assay and analyzed by an image processing algorithm to find a threshold for the surface of cells.
FIG. 11C shows a fluorescent microscopy image of hRGC stained using a Live/Dead assay and analyzed by an image processing algorithm applying the dual Otsu's method for automatic image thresholding.
FIG. 11D shows a fluorescent microscopy image of hRGC stained using a Live/Dead assay and analyzed by an image processing algorithm to detect the maximum and minimum fluorescent intensities.
FIG. 11E shows a fluorescent microscopy image of hRGC stained using a Live/Dead assay and analyzed by an image processing algorithm for cell capture.
FIG. 11F shows a fluorescent microscopy image of hRGC stained using a Live/Dead assay and analyzed by an image processing algorithm to measure the number of cells as indicated by the numbers shown.
FIG. 11G shows a fluorescent microscopy image of hRGC stained using a Live/Dead assay and analyzed by an image processing algorithm to measure the size of cells as indicated by the numbers shown.
FIG. 11H shows a fluorescent microscopy image of hRGC stained using a Live/Dead assay and analyzed by an image processing algorithm to measure the compactness of cells as indicated by the numbers shown.
Figure 12A:
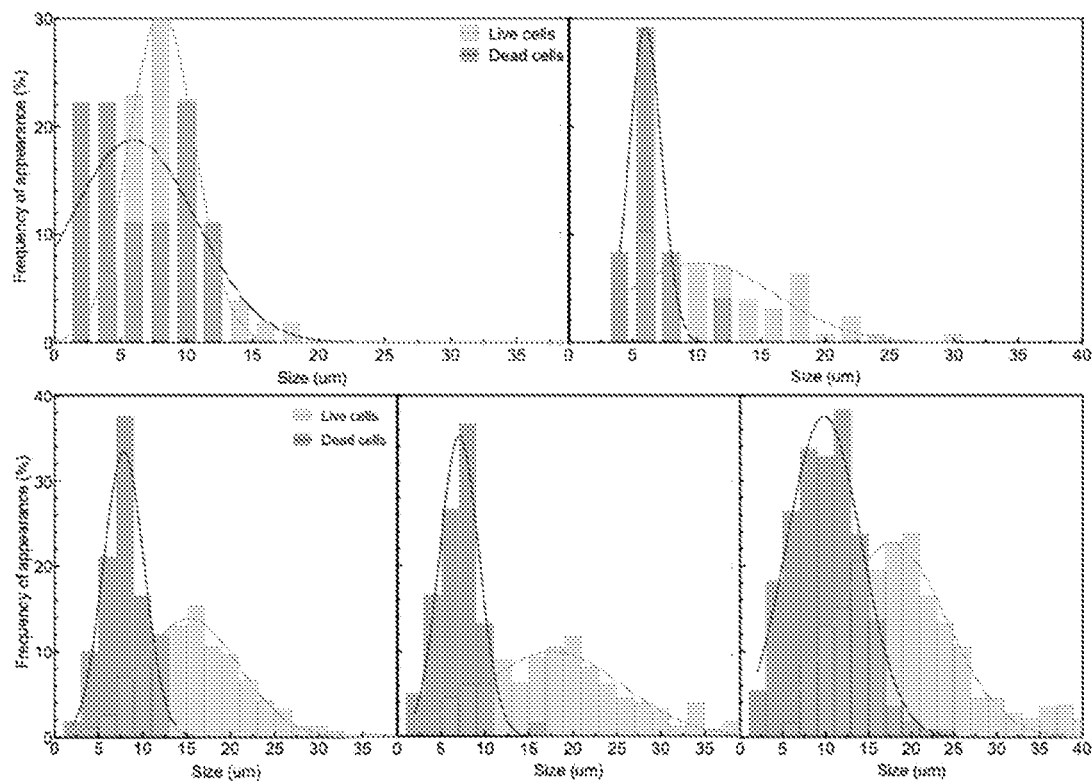
FIG. 12A shows the percentage of cells of various sizes extracted from the image processing algorithm analysis of FIG. 11.
Figure 12B:
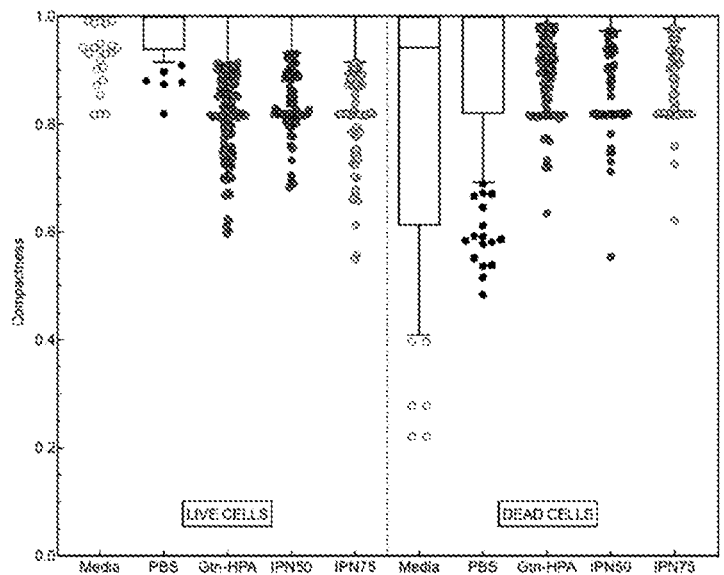
FIG. 12B shows the compactness values of cells encapsulated in different, example hydrogels extracted from the image processing algorithm analysis of FIG. 11.

For each sample group, n=10 fluorescent maximum projection of fields of view obtained from live and dead staining images of cells encapsulated or grown in 2D conditions were analyzed (FIG. 11A). Each image was then converted to a greyscale (from the specific staining analyzed live: green and red: dead). To be able to analyze cells correctly, multiple image rendering processes were used. The extraction of dimmer cells was performed by contrast adjustments. The elimination of objects on the borders (which can cause noise and be artifacts) was realized with an intrinsic MATLAB function. Noise removal, critical to extract only cells and not artifacts, was done with adaptive filtering (small window). The final image rendering included using a global Otsu's thresholding method to convert the image to binary, filling the image region and holes, performing a morphological opening using a disc kernel and finally removing all small cells (connected components with low number of pixels <10 px). The final image can be seen in FIG. 11B. To further analyze cells, perimeters extraction of cell or cell groups were performed, as seen in FIG. 11C. Some cells might be grouped and counting their number may be critical for viability results. To extract cells in groups a watershed algorithm was applied, which can divide the groups into distinct cells. The watershed algorithm interprets different levels of gray intensity, in an image, as altitude. It then finds objects which are delimited by their perimeter with a high altitude in their center (high overlapping intensity). To implement the watershed algorithm, the image was modified by finding the maxima (corresponding to the cell nuclei) and transformed the image to show the perimeter and these maxima (FIG. 11D). The watershed algorithm was finally applied, which finds all connected components and enables for an easy cell counting (FIG. 11E). In the sample image, 33 cells were extracted (FIG. 11F). Cell size was also extracted and measured with the longest line drawn inside each object (FIG. 11G). Cell compactness (FIG. 11H) was extracted, which corresponds to the relative shape of one cell compared to a circle: $C=(4*\pi*A)/(P^2)$ (C=1 being a perfect circle). Due to small cell size, while most cells were correctly detected, some were taken as dust and deleted. Segmenting grouped cells worked well and enabled a coherent cell size and number measurement. Detected cells appeared to have a similar size to real cells (broadly measured with scale on confocal microscope). By counting some fields of views manually and comparing to the algorithm result, it is estimated that this algorithm has a rate of success of about 95%.

This image processing algorithm was applied to the long viability assay performed on hRGC for 1, 3, and 7 days in different conditions (see FIG. 3B in the main text). All extracted values from the image processing algorithm can be seen in FIGS. 12A-12B for all samples. Live (green) and dead (red) cell size distribution was analyzed for all groups and shows no significant difference in time. The results suggested that dead cells are, on average, 10 µm smaller than live cells. A significantly higher live cell size was found in hydrogel samples (around 15 um for Gtn-HPA, 20 µm for IPN75 and IPN50) compared to cells cultured in 2D environment (8-10 um for media and PBS).

Compactness was also analyzed for both live and dead cells for all samples and showed no difference between time points. A significantly lower compactness was observed for cells in hydrogels samples compared to media and PBS. Dead cells, mostly due to the loss of cytoplasm, nucleus and shape, showed a low compactness for all samples. These findings suggested that Gtn-HPA and IPNs can enable cell growth and differentiation due to their higher size while enabling morphological extension of primary processes, as shown with a lower compactness.

Example 11—Immunohistochemistry and Flow Cytometry Assay

Phenotype was checked by flow cytometry and immunohistochemistry on cells cultured for 5 days in 2D (media) or 3D (Gtn-HPA, IPN75 and IPN50 with media) conditions. The hRGC phenotypic expression was measured in previous studies and was shown to have a high positive cell population expressing early RGC markers (as Brn3a and Brn3b) with a moderate population of late retinal ganglion cells. Percentage of expression of retinal ganglion cells (Brn3b, Brn3a, RBPMS and Thy1.1), neuronal (NeuN), apoptosis (Cas3), proliferation (Ki67) and stemness (Cmyc and Oct4) was measured and is reported in FIG. 13A while actual cell expression is shown with confocal microscopy fluorescent images (FIG. 13B). Images were taken at field of views presenting a high expression of each marker and are not representative of overall marker percentage of expression. Of note is that a critical factor of using a scaffold to encapsulate cells was to ensure the maintenance of phenotype throughout the entire experiment.

Stemness, proliferation, and apoptosis expression were remarkably low in all samples. This suggested an already differentiated cell population (with low number of pluripotent stem cells) which is past mitosis (cannot proliferate anymore). A low apoptosis expression in all samples enabled consideration of the hydrogels as non-toxic and confirm the viability assay performed on all IPN with healthy cells in 2D and 3D environments.

As previously explained in Example 2, section titled "Source and viability of hRGC," hRGCs were Brn3b-Tdtomato positive; therefore, Brn3b expression was primordial to confirm maintenance of cell phenotype by hydrogels and protocols. Critically, the Brn3b expression was high for all samples (about 80%), which also indicated the possibility of locating injected cells in tissue without the need to stain for multiple cell markers. Brn3a is a marker which overlaps with Brn3b and was shown here to be relatively high for all samples (about 50%) indicating a high percent of early retinal ganglion cells in the population. RBPMS and Thy1.1 are markers for late retinal ganglion cells, already fully differentiated. Part of the hRGC population (about 20%) was expressing those two markers, suggesting cells differentiated already present.

Finally, retinal ganglion cells' main objective is to extend processes (e.g., axons) that merge into fibers to form the optic nerve. These fibers express some neuronal markers such as NeuN. A small part of the hRGC population expressed NeuN after 5 days of encapsulation in hydrogels (about 10%), which suggested that injected cells could potentially be able to extend processes that could attach the retina and regenerate a dying RGC layer. This assay enabled the confirmation of the maintenance of hRGC phenotype when encapsulated in IPN with nutrients for 5 days in vitro.

Example 12—Gel-Retina Interface Analysis with H&E Staining

To prove if IPN hydrogels could be mechanically tuned in order to make contact or attach with the back of the eye (inner limiting membrane of the retina: ILM) Gtn-HPA, IPN75, and IPN50 were injected in the vitreous of Long Evans rats. Three days post hydrogel injection, eyes were enucleated, sectioned and stained with H&E staining. H&E staining showed gel presence on top of the retina for all samples.

To quantify the presence and attachment of IPNs, the contact between IPNs and retinal layers for n=10 fields of view for each sample was measured. As seen in FIG. 14, 200 µm portions of sectioned retina were analyzed (H&E staining) by outlining the interface and calculating contact (in red) or not (in white). Percentage of attachment was calculated for each portion and summed over all replicates which gave for Gtn-HPA, IPN75 and IPN50 respectively 50%, 59%, and 79%. By summing over all replicates, the actual distribution of attachment was obtained, which suggested the presence of holes at the interface (see FIG. 4B). These findings suggested that a higher stiffness and mechanical strength (as in IPN50) could enable a better attachment of injected hydrogels to the retina: higher average attachment and less holes at the interface. When injected cells in saline in the vitreous, cells do not have a matrix to stay at the site of injection (usually ILM or RGC layer) and can potentially leave the site and start the process of apoptosis, not being able to attach to other cells. Using these tunable IPNs cells can be encapsulated and injected at the interface where stiffer hydrogels could then attach and release cells directly onto the targeted layer of the retina.

Of note is that H&E staining was performed 1- and 10-days post-injections. In the first case, the hydrogel was not fully attached to the eye but was present in the vitreous cavity, while in the latter case, most of the hydrogel was already degraded without any detachment of the retina or its layers.

Example 13—Optical Coherence Tomography Data

Figure 15:
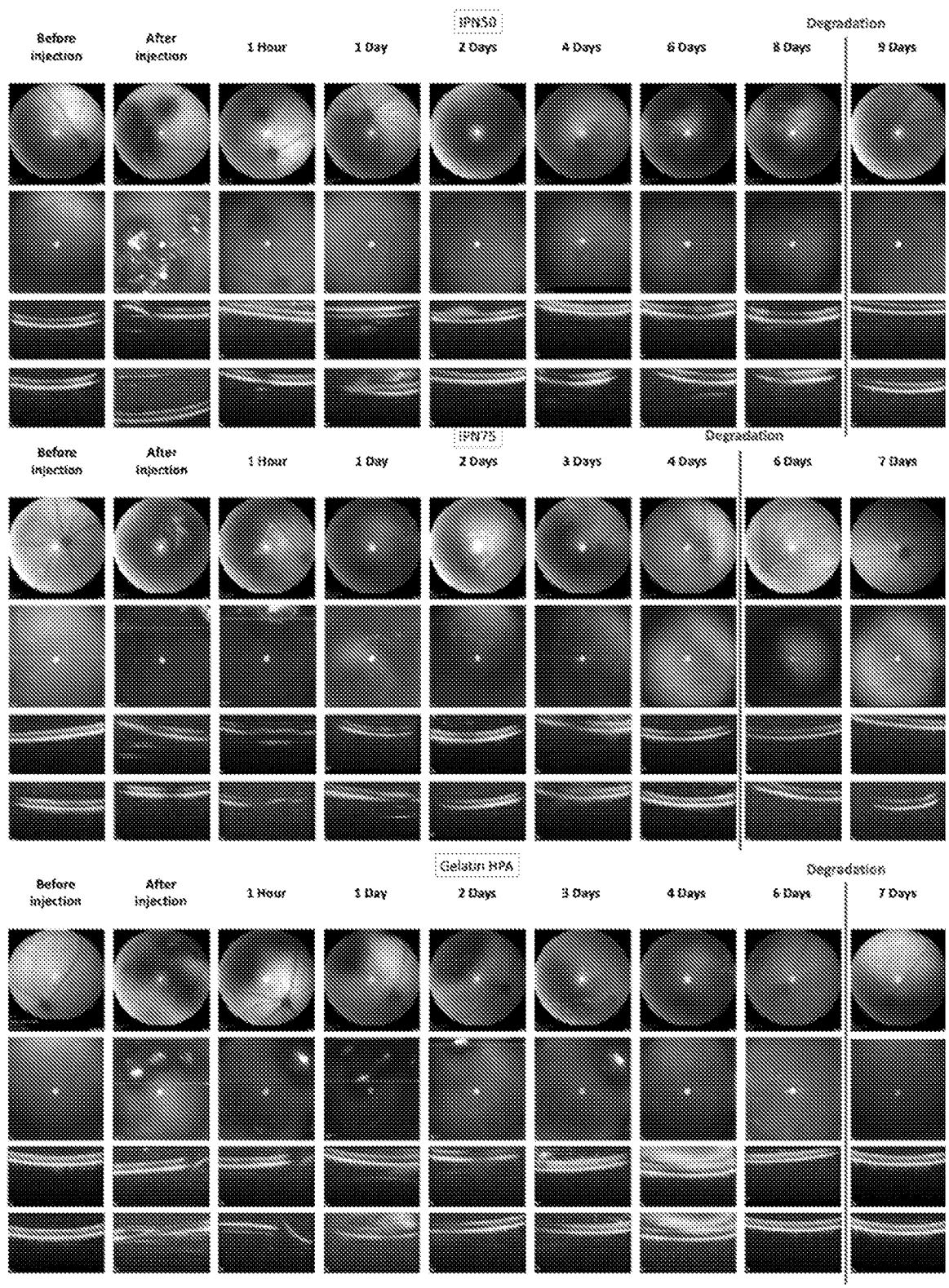
FIG. 15 shows SD-OCT images of the back of the eye of rodents showing healthy blood vessels, the core of the vitreous, and multiple sections of the retina before, after, and each day post-injection of example hydrogels.

When injecting in vitreous Gtn-HPA, IPN75 and IPN50 live Spectral Domain Optical Coherence Tomography (SD-OCT) was performed to image the back of the eye and portions of the retina using infrared (IR) light without sacrificing animals. For the first time, it was possible to image and observe hydrogels injected into the vitreal in vivo. As seen in FIG. 15, images of the back of the eye showing healthy blood vessels, the core of the vitreous and multiple sections of the retina before, after and each day post-injection were acquired.

Due to the size of the animals, and the SD-OCT apparatus not designed for rodents, the quality of SD-OCT images was lower than expected. However, the presence of islands of hydrogels was observed in the bulk of the vitreous right after injection for all samples, which implied a difficult imaging of the section of the retina at that time point. Indeed, islands of gels were refracting the OCT light far away from the retina therefore sectioned looked cut in half. This can be mainly solved by waiting for the setting of the gel on top of the retina. These islands are characteristics of Gtn-HPA and HA-Tyr in-situ crosslinking hydrogel formation and suggested a successful injection. While the back of the eye was still blackened by the gel, its islands were observed to be sitting on top of the retina around 2-3 days for all samples. White regions of gels attached to the retina suggested 3 days to be the optimal time for setting and start of degradation. A drop-in gel presence was observed starting at 4, 5, and 6 days for IPN75, Gtn-HPA, and IPN50, respectively. This finding was reinforced by the total absence of gel for all samples after specific time marked on FIG. 15 (8-9 days for IPN50, 6-7 days for Gtn-HPA and 4-5 days for IPN75). One crucial finding was that morphology of the retina and the back of the before injection and after total degradation of gel are similar, showing no sign of retinal injury nor detachment. These findings suggested successful injection of gel that was enabled to sit on top of the retina and degraded at a moderately fast rate without provoking retinal detachment.

To quantify these findings, SD-OCT data was analyzed with an image processing algorithm based on Otsu's thresholding method (see Example 3; section titled "Hydrogels-retina interface and OCT analysis algorithms"). An extraction of background and foreground was performed on n=10 images for each group. The variation from the common thresholding method was to use a 2-step algorithm. First, sections of the retina were analyzed with no gel and were considered as 100% background (while removing noise). Then, when analyzing an image containing islands of gel sitting on the retina, same consideration for background was kept and the only foreground was made of the hydrogels. This enabled to partially quantify the presence of hydrogel in the eye in vivo throughout time (see FIG. 4C). This quantification was then compared with a long-term in vitro degradation assay by using degrading enzymes (hyaluronidase and collagenase) with their actual concentrations found in vivo in the vitreous. Both in vitro and in vivo data showed similar trends with a high correlation coefficient ($R^2$=0.97), which suggested a correct analysis and measurement of gel presence in vivo with SD-OCT.

Figure 16A:
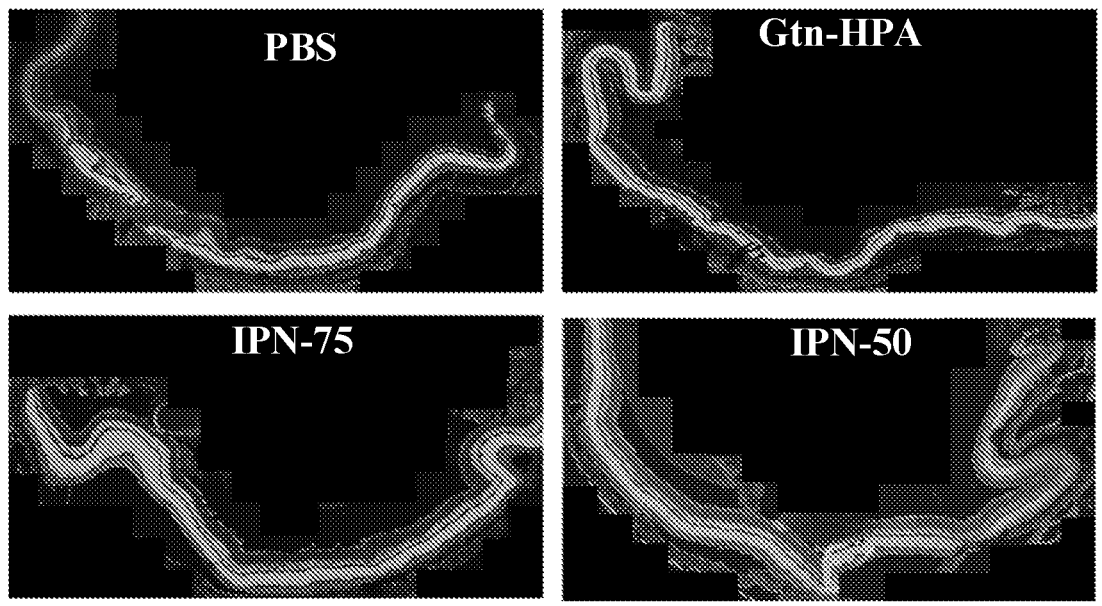
FIG. 16A shows tiling of immunohistochemistry images of whole retina samples of rodent eyes containing hRGCs encapsulated in 3 µL of Gtn-HPA, IPN75, IPN50 or in PBS. STEM121-positive cells were observed next to the optic nerve for IPN50 and IPN75 while being in the center of the retina for Gtn-HPA and sparsely distributed everywhere for the PBS sample.

Example 14—Confocal Imaging of Eyes Sections Containing Injected Cells hRGCs, encapsulated in 3 µL of Gtn-HPA, IPN75, IPN50 or in PBS, were injected in the vitreous of n=5 immunosuppressed Long Evans rats. After 1 month of immunosuppression rats were sacrificed and eyes were enucleated, sectioned and stained with FITC-STEM121 (human cytoplasmic maker) and VioBlue-DAPI (nuclei marker) for further analysis. To prove broad presence of human cells 1 month after injection, tiling of the whole retina was captured for all samples. As seen in FIG. 16A, STEM121 positive cells were observed next to the optic nerve for IPN50 and IPN75 while being in the center of the retina for Gtn-HPA and sparsely distributed everywhere for the PBS sample. Due to its low intensity and the size of tiling, intrinsic TdTomato-Brn3b was observed to be really dimmed in all tiling. These tiling suggested not only the success of the xenotransplantation, but also of engraftment due to the long-term experiment. Indeed, due to the fast degradation of hydrogels injected cells had to attach and integrate to living tissue in order to thrive for 1 month in vivo. These tiling also enabled to measure the size of the retina and by using an image processing algorithm (explained in the next section) to calculate the exact fraction of injected cells (50 k per eye) engrafted after 1 month for each whole eye.

Figure 16B:
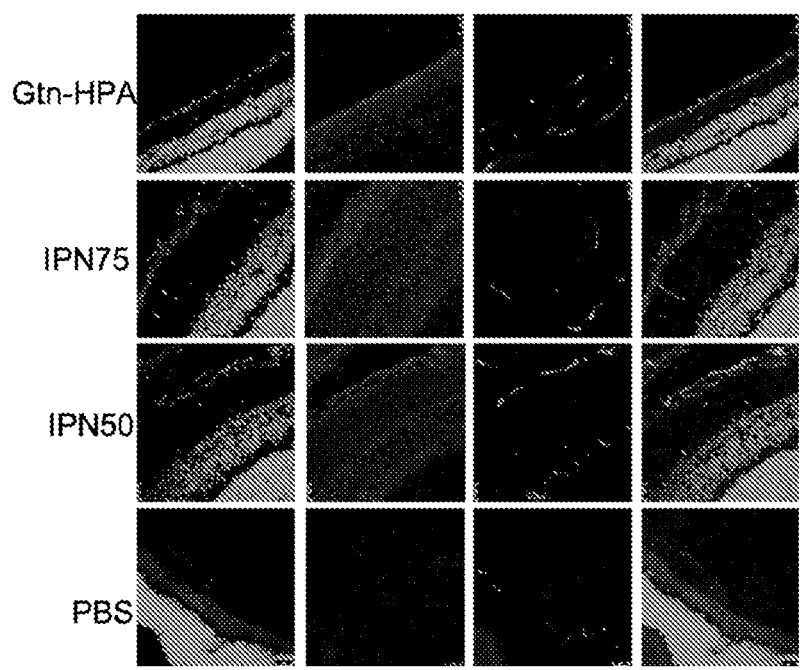
FIG. 16B shows magnified immunohistochemistry images of the retina samples of FIG. 16A.

To further analyze location and engraftment of injected human retinal ganglion cells, sample sections were imaged at 20× magnification (FIG. 16B). Cells were found to be mainly in the retinal ganglion cell (RGC), which is the targeted layer, and the inner nuclear layer (INL) some migrated towards the choroid and stopping in the outer nuclear layer (ONL). On first sight, it was observed that cells in stiffer hydrogels (IPN5) and IPN75) were larger and more abundant than the one in Gtn-HPA. Overall cells injected in PBS were found to have the smallest size and were really low in number throughout all sections analyzed. Compared to tiling, intrinsic TdTomato-Brn3b was observable in these images and shows coherent location with injected cells (co-localization of both markers being analyzed in the next section).

To understand and explain why injected hRGCs, in the vitreous, migrate towards another layer of the retina, the difference in size and morphology required more examination due to the experiment being a xenotransplantation. As a fact, human RGC are 2-3 times bigger than rats RGC; therefore, even being attracted to stay and engraft on the RGC layer, those cells try to find the right place to thrive by migrating into other layer with bigger cells (as in INL or ONL). Of note is the location of most cells being in the targeted layer (RGC) for hydrogels groups suggesting a better release of cells throughout time onto the retina compared to cells injected in PBS only.

Example 15—Cell Migration, Orientation and Colocalization Algorithms

Figures 17A, 17B:
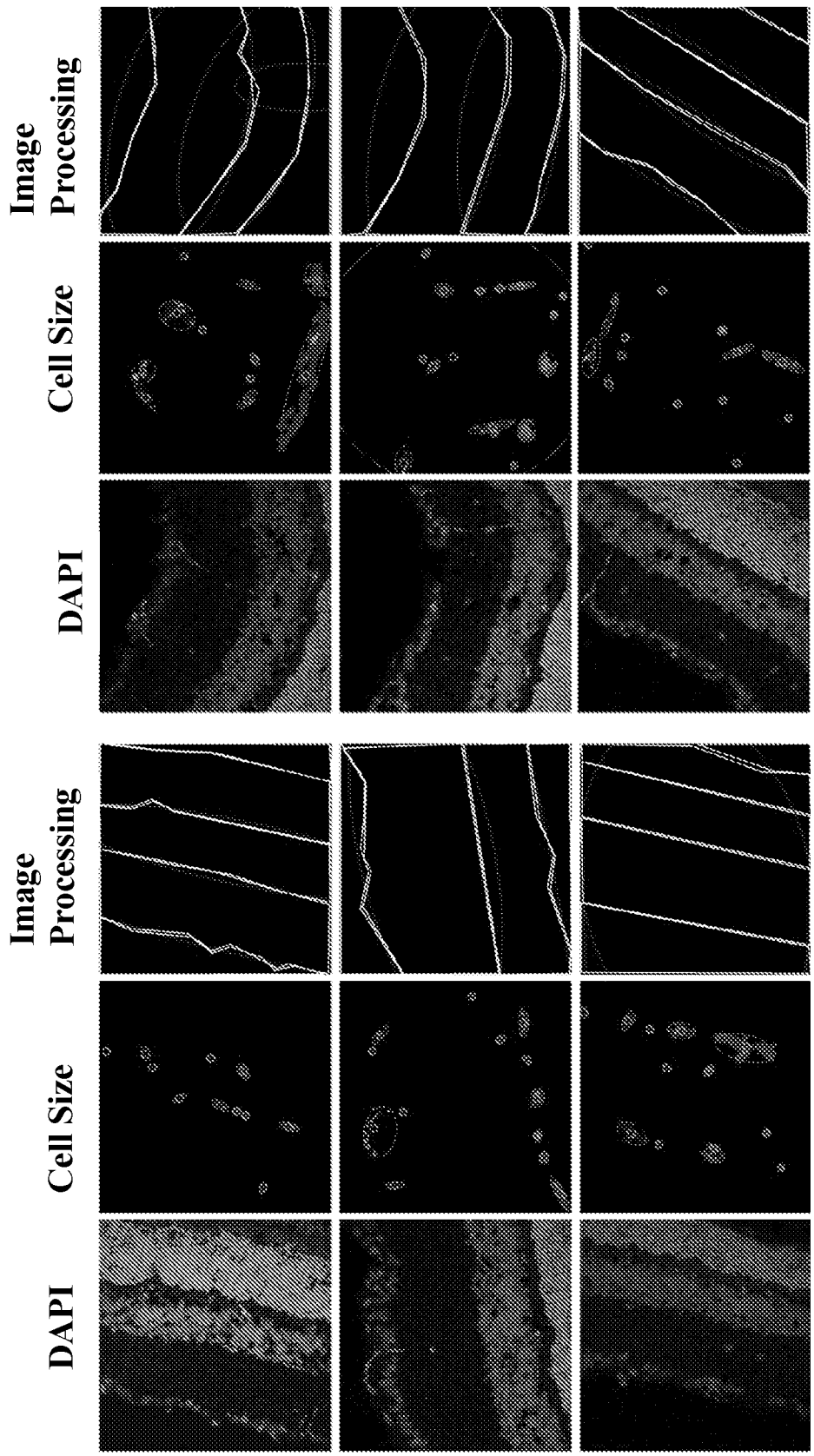

Most stem cell in vivo transplantations are usually analyzed qualitatively by observing stained sectioned and cell morphology without applying quantification processes. To enhance this analysis, an image processing algorithm was created. The image processing algorithm was capable of localizing cells in their respective layer of the retina, calculating their relative orientation compared to the tissue, and measuring the amount of both markers (STEM121 and Brn3b) co-localization in the cell body. A learning data set consisting of n=60 pictures in the center of the retina (usually the injected site) was created. The learning data set, taken at 63× magnification, for all samples, is seen in FIG. 17A.

As explained in Example 3, (section titled "Image processing algorithms for detection of cell migration, co-localization and orientation compare to retinal layers"), the algorithm consisted in a 2-step thresholding process which separated the cell center (possessing a high intensity) from their surrounding (dimmer intensity). To use a simple non-realistic analogy, whole cells were first segmented, then nuclei were segmented, and finally cells not containing any nucleus were removed. This extraction worked with most cells however, precision suffered: some pixels—especially around the border of the image—were above the threshold, leading to segmentation towards unwanted parts of the image. To solve this issue, the 5-pixel border of each image (which corresponded to <1% of the image) was deleted. The 5-pixel border usually only removed about 1-2 cells per picture. To set a constant and relatable quantification an intensity normalization for all images was performed and almost all cells in each image were localized, as seen in FIG. 17B where the red circle corresponds to the high intensity center and the red regions to the dimmer cell body. Nonetheless, being able to extract cell location on each image was not sufficient to significantly quantify the xenotransplantation; therefore, each image was annotated with the retinal layers as seen with DAPI staining (FIGS. 17A-17B). This annotation was done by hand using a simple online tool (Makesense.ai), which enabled each image to be divided into retinal regions (Choroid, ONL, INL, RGC and Vitreous). By merging the coordinates of cell extraction with the retinal layer, each cell engraftment in the retina was finally able to be localized (as seen in FIG. 5B).

By observing most of the learning data set, it was noticeable that many cells had started their differentiation and extension of long processes toward or in the optic nerve during their engraftment. To quantify this finding, cell size was calculated (not only body but also processes), which worked well except with crescent shape cells or very round-shaped cells. Morphologically, retinal ganglion cells extended their processes towards the optic nerve parallel to all retinal layers; hence, the relative orientation of the injected cells was also measured with the annotated layers of the retina. The actual orientation of each cell corresponded to the angle difference between its body and the layer it was located in. Both angles were measured by fitting the largest possible ellipse in both the extracted cell body and annotated layers (cell ellipses shown in FIG. 17B) and using their long axes angle.

Most human markers (including STEM121 or STEM101) are usually also staining some blood vessels, especially in the retina. Therefore, to guarantee that the in vivo quantification was performed on human injected cells and not host blood vessels (i.e., artifacts) a colocalization algorithm was used, which measured the presence of both STEM121 marker and human intrinsic Brn3b for each extracted cell. This code found the M1 and M2, which corresponded to the amount of green and red pixels, respectively, in each image while measuring the correlation coefficient of these pixels. This enabled the demonstration that events found during staining were injected cells and not artifacts.

Example 16—Müller and Immune Cells Expression

While in vivo xenotransplantation was performed on immunosuppressed Long Evans rats, analyzing and measuring the core immune response to injected cells and biomaterials is critical to any transplantation. To do so, sections of ocular tissue stained with IBA1 and CD45 cell markers (mainly expressed in microglia and immune cells in response to injection). By imaging with fluorescent confocal microscopy (15 random fields of views), the presence of both markers in all samples was observed, as it can be seen in FIG. 18B. Most IBA1 expression was found in the inner nuclear layer while CD45 was localized next to the injection site in the retinal ganglion cells layer. To create a significant quantification of the immune response due to injection, a simple image processing algorithm was used. The algorithm consisted in calculating the surface coverage of each marker: calculating the number of positive pixels for each marker (green for IBA1 and red for CD45) and normalizing by the total number of pixel in the image. As seen in FIG. 18A, expression of both immune markers was significantly higher in PBS than all other samples. In order to decouple the effect of the hydrogels from the injection itself, these data was compared to the sham condition (i.e., consisting in stabbing the eye with the needle without injecting hydrogels, cells, or buffers). All hydrogel samples possessed a similar expression of immune cell markers compared to the sham condition but had a higher expression than the control condition.

These findings suggested that the main cause of immune response when injecting cells encapsulated in the IPN hydrogel is the needle injection itself, as injecting cells in PBS provoked a higher immune response. The immune reaction analysis showed the injury due to the injection could trigger a reaction from the host as seen with CD45 staining. In the PBS group, hRGC suspension was exposed to the invading leukocytes, especially as xenograft in non-immunosuppressed animals. Gtn-HPA and HA-Tyr, being FDA approved biocompatible and biodegradable polymers, can form a protective barrier for hRGC, protecting them from the migrating immune cells.

Figure 19A:
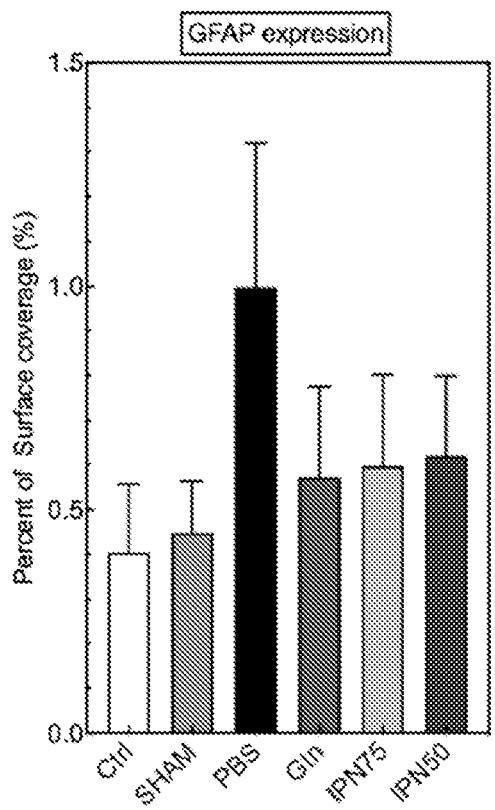
FIG. 19A shows the percentage of surface coverage of positive pixels for Müller cell marker (Glial fibrillary acidic protein (GFAP)) in immunohistochemistry images of eye samples that had received an injection of example hydrogels encapsulating cells.
Figure 19B:
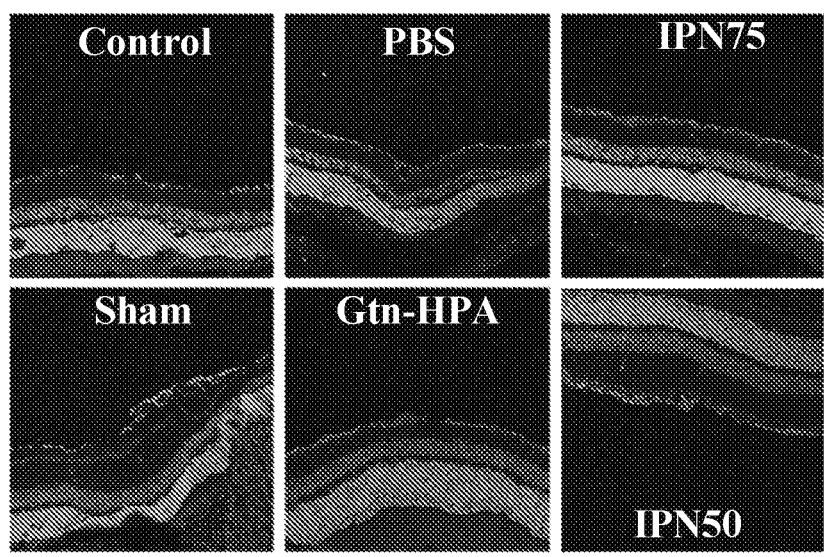
FIG. 19B shows immunohistochemistry images of the samples described in FIG. 19A.

Müller cells form the entrance path inside the retina. They extend their process through all the layers partly forming the barrier between the retinal ganglion cell layer and the vitreous: the inner limiting membrane. When activated, due to entrance of pathogens, migrating immune cells or exogenous ed human cells, Müller cells express largely Glial fibrillary acidic protein (GFAP). To measure Müller cells activation, ocular tissue sections were stained with GFAP and imaged via fluorescent confocal microscopy, as seen in FIG. 19B. By using the same image processing algorithm used for the immune response, GFAP expression was quantified for all samples (FIG. 19A). An identical trend, as for immune reaction, was found in Müller cell activation with a significantly higher expression in PBS samples compared to all other groups. No differences were found between all gels and sham samples. These findings corroborated the immune response expression previously explained. While being a delivery vehicle and protecting cells from the intrinsic immune response, hydrogels (and especially these IPNs hydrogels) also facilitated the entry of exogenous cells inside the layers of the retina with less Müller cell activation observed.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of treating an ocular disorder in a subject in need thereof, the method comprising:
   administering a therapeutically effective amount of a composition into an eye of the subject,
   wherein the composition comprises gelatin hydroxyphenylpropionic acid (gelatin-HPA), hyaluronic acid-tyramine (HA-Tyr), and an ocular cell, and
   wherein the composition attaches to an inner portion eye after administration into the eye.

2. The method of claim 1, wherein the ocular disorder comprises congenital retinal disease, diabetic retinopathy, glaucoma, optic neuropathy, retinal neuron damage, or any combination thereof.

3. The method of claim 1, wherein the composition comprises water, or wherein the composition comprises water at a concentration of about 88% to 98%.

4. The method of claim 1, wherein the composition is administered as a liquid, or wherein the composition gels in situ.

5. The method of claim 1, wherein the composition is administered via an intravitreal injection, or wherein the composition is administered after a pars plana vitrectomy.

6. The method of claim 1, wherein the composition has a polymer concentration of about at least 2 weight %.

7. The method of claim 1, wherein the composition comprises gelatin-HPA at a concentration of about 30% to 100%, or wherein the composition comprises HA-Tyr at a concentration of about 70% to about 0%.

8. The method of claim 1, wherein the composition comprises a concentration ratio of gelatin-HPA to HA-Tyr of about 50%: 50%, or wherein the composition comprises a concentration ratio of gelatin-HPA to HA-Tyr of about 75%: 25%.

9. The method of claim 1, wherein the gelatin-HPA, HA-Tyr, and ocular cell are mixed prior to administration into the eye of the subject, wherein the gelatin-HPA, HA-Tyr, and ocular cell are mixed during administration into the eye of the subject.

10. The method of claim 1, wherein the ocular cell comprises a human retinal progenitor cells (hRPGs), a human retinal ganglion cell, or any combination thereof.

11. The method of claim 1, wherein the composition comprises an ocular cell concentration of about 1,000 cells per milliliter to 1,000,000 cells per milliliter.

12. The method of claim 1, further comprising enzymatically crosslinking the composition by contacting the composition with hydrogen peroxide and horseradish peroxidase and waiting for about 30 seconds to 240 seconds for the composition to gel.

13. The method of claim 12, wherein the composition reaches the gel point after administration into the eye of the subject.

14. The method of claim 12, wherein the composition is contacted with hydrogen peroxide at a concentration of about 0.5 mM to 2.5 mM, or wherein the composition is contacted with horseradish peroxidase at a concentration of about 0.1 units per milliliter (U/ml) to 0.2 U/ml.

15. The method of claim 12, wherein the composition is enzymatically crosslinked in situ.

16. The method of claim 12, wherein the enzymatically crosslinked composition has a stiffness ranging from about 500 Pa to 1500 Pa.

17. The method of claim 12, wherein the enzymatically crosslinked composition has a Young's modulus ranging from about 2300 Pa to 7000 Pa.

18. The method of claim 12, wherein the composition is administered into a vitreous of the eye of the subject.

19. The method of claim 12, wherein the inner portion of the eye is a retina, or wherein the inner portion of the eye is the inner limiting membrane of the retina.

20. The method of claim 1, wherein the composition has a cell viability of about 85% to 95%.

* * * * *